US009965035B2

(12) United States Patent
Santamaria et al.

(10) Patent No.: US 9,965,035 B2
(45) Date of Patent: May 8, 2018

(54) DEVICE, METHOD, AND GRAPHICAL USER INTERFACE FOR SYNCHRONIZING TWO OR MORE DISPLAYS

(71) Applicant: Apple Inc., Cupertino, CA (US)

(72) Inventors: Justin E. Santamaria, San Francisco, CA (US); Imran Chaudhri, San Francisco, CA (US); Donald W. Pitschel, San Francisco, CA (US); Jorge S. Fino, San Jose, CA (US); Emily Clark Schubert, San Jose, CA (US); Joshua H. Shaffer, San Jose, CA (US); Bob Bradley, San Jose, CA (US); Eric Lee, Mountain View, CA (US); Scott M. Herz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 422 days.

(21) Appl. No.: 14/291,970

(22) Filed: May 30, 2014

(65) Prior Publication Data
US 2014/0365913 A1 Dec. 11, 2014

Related U.S. Application Data

(60) Provisional application No. 61/832,842, filed on Jun. 8, 2013.

(51) Int. Cl.
G06F 3/01 (2006.01)
G06F 3/0484 (2013.01)
(Continued)

(52) U.S. Cl.
CPC ............ *G06F 3/016* (2013.01); *G06F 3/0414* (2013.01); *G06F 3/04842* (2013.01); *G06F 9/451* (2018.02); *H04L 67/1095* (2013.01)

(58) Field of Classification Search
USPC ....... 345/156, 173, 1.3, 2.2, 2.3, 4; 715/761, 715/781
See application file for complete search history.

(56) References Cited

U.S. PATENT DOCUMENTS 7,877,204 B2 * 1/2011 Sprigg ................. G01C 21/343
701/422
9,200,915 B2 12/2015 Vulcano et al.
(Continued)

FOREIGN PATENT DOCUMENTS

CN 102724329 A 10/2012
CN 102759359 A 10/2012
(Continued)

OTHER PUBLICATIONS

BMW, "BMW Supports iPod Out by Apple," https://www.youtube.com/watch?v=zjOSRzd40s4, Jul. 7, 2010, 3 pages.
(Continued)

Primary Examiner — Doon Y Chow
Assistant Examiner — Wendy Nicholas
(74) Attorney, Agent, or Firm — Morgan, Lewis & Bockius LLP

(57) ABSTRACT

A device displays a first user interface on a first display, including a plurality of objects and corresponding to a second user interface on a second display. While a first object is displayed as a selected object in the second user interface, the device: detects a first input requesting information about a second object; and in response to detecting the first input, displays information about the second object in the first user interface and maintains display of the first object as the selected object in the second user interface. After displaying the information, the device detects a second input selecting the second object. In response to detecting selection of the second input, the device: displays the second object as the selected object in the first user interface; and
(Continued)

provides, to the second display, information that enables the second user interface to display the second object as the selected object.

24 Claims, 52 Drawing Sheets

(51) Int. Cl.
*H04L 29/08* (2006.01)
*G06F 3/041* (2006.01)

(56) References Cited

U.S. PATENT DOCUMENTS

| | | | |
|---|---|---|---|
| 9,285,944 B1* | 3/2016 | Penilla | G06F 3/04842 |
| 9,318,108 B2 | 4/2016 | Raves | |
| 2005/0246095 A1 | 11/2005 | Banet et al. | |
| 2005/0281414 A1 | 12/2005 | Simon et al. | |
| 2006/0229802 A1* | 10/2006 | Vertelney | G01C 21/3617 |
| | | | 701/532 |
| 2007/0016362 A1* | 1/2007 | Nelson | G01C 21/362 |
| | | | 701/425 |
| 2007/0204232 A1* | 8/2007 | Ray | G06F 17/30905 |
| | | | 715/738 |
| 2008/0254785 A1 | 10/2008 | Lazaridis et al. | |
| 2009/0079666 A1* | 3/2009 | Yoshida | G01C 21/36 |
| | | | 345/2.1 |
| 2009/0197617 A1 | 8/2009 | Jayanthi | |
| 2009/0284476 A1 | 11/2009 | Bull et al. | |
| 2010/0064053 A1 | 3/2010 | Bull et al. | |
| 2010/0122177 A1* | 5/2010 | Yoshioka | H04L 12/282 |
| | | | 715/738 |
| 2010/0138149 A1* | 6/2010 | Ohta | G01C 21/26 |
| | | | 701/533 |
| 2010/0146546 A1 | 6/2010 | Nishimura et al. | |
| 2010/0250130 A1* | 9/2010 | Wiegand | G01C 21/3679 |
| | | | 701/469 |
| 2010/0293462 A1* | 11/2010 | Bull | G06F 9/4445 |
| | | | 715/716 |
| 2011/0006971 A1* | 1/2011 | Ebey | G06F 1/1616 |
| | | | 345/1.3 |
| 2011/0022305 A1* | 1/2011 | Okamoto | G01C 21/36 |
| | | | 701/533 |
| 2011/0239142 A1* | 9/2011 | Steeves | G06F 3/14 |
| | | | 715/764 |
| 2011/0265003 A1 | 10/2011 | Schubert et al. | |
| 2012/0016678 A1 | 1/2012 | Gruber et al. | |
| 2012/0022872 A1 | 1/2012 | Gruber et al. | |
| 2012/0259541 A1* | 10/2012 | Downey | G01C 21/3676 |
| | | | 701/433 |
| 2012/0311583 A1 | 12/2012 | Gruber et al. | |
| 2013/0275138 A1 | 10/2013 | Gruber et al. | |
| 2013/0275899 A1 | 10/2013 | Schubert et al. | |
| 2013/0326397 A1* | 12/2013 | Kim | G06F 3/0484 |
| | | | 715/781 |
| 2014/0026088 A1* | 1/2014 | Monte | G01C 21/3682 |
| | | | 715/765 |
| 2014/0129133 A1* | 5/2014 | Wang | G01C 21/362 |
| | | | 701/409 |
| 2014/0143424 A1 | 5/2014 | Rostaing et al. | |
| 2014/0164322 A1* | 6/2014 | Beaurepaire | G06F 17/30575 |
| | | | 707/610 |
| 2014/0245213 A1* | 8/2014 | Gardenfors | H04L 51/066 |
| | | | 715/778 |
| 2014/0278072 A1 | 9/2014 | Fino et al. | |
| 2014/0365124 A1 | 12/2014 | Vulcano et al. | |
| 2014/0365125 A1 | 12/2014 | Vulcano et al. | |
| 2014/0365126 A1 | 12/2014 | Vulcano et al. | |
| 2014/0365895 A1 | 12/2014 | Magahern et al. | |

FOREIGN PATENT DOCUMENTS

| | | |
|---|---|---|
| EP | 2 067 664 A2 | 6/2009 |
| JP | 2004028909 A | 1/2004 |
| JP | 20081700157 A | 7/2008 |
| JP | 2008263610 | 10/2008 |
| JP | 2009137392 | 6/2009 |
| JP | 2010514604 A | 5/2010 |
| JP | 2012255793 A | 12/2012 |
| JP | 2013053942 A | 3/2013 |
| JP | 2013108915 A | 6/2013 |
| KR | 2013-0036841 A | 4/2013 |
| WO | WO 2008/079891 A2 | 7/2008 |
| WO | WO 2009/073806 A2 | 6/2009 |
| WO | WO 2011/016879 A1 | 2/2011 |
| WO | WO 2012/141294 A1 | 10/2012 |

OTHER PUBLICATIONS

Bose et al., "Terminal Mode—Transforming Mobile Devices into Automotive Application Platforms," Proceedings of the Second International Conference on Automotive User Interfaces and Interactive Vehicular Applications (Automotive UI 2010), Pittsburgh, Pennsylvania, USA, Nov. 11-12, 2010, 8 pages.
Diewald et al., "Mobile Device Integration and Interaction in the Automotive Domain," Automotive UI 2011, Salzburg, Austria, Nov. 29-Dec. 2, 2011, 4 pages.
Gryc, "Smartphone Vehicle Integration: Making Sense of the Cacophony," QNX Software Systems, Feb. 7, 2011, 13 pages.
International Search Report, dated Nov. 21, 2014, received in International Patent Application No. PCT/US2014/040415, 7 pages.
Written Opinion of the International Searching Authority, dated Nov. 21, 2014, received in International Patent Application No. PCT/US2014/040415, which corresponds with U.S. Appl. No. 14/291,970, 12 pages.
International Preliminary Report on Patentability, dated Dec. 8, 2015, received in International Patent Application No. PCT/US2014/040415, which corresponds with U.S. Appl. No. 14/291,970, 13 pages.
Strauss, "Numberkey Transforms iPhone Into Numeric Keypad," http://technabob.com/blog/2008/11/18/numberkey-transforms-iphone-into-numeric-keypad/, Nov. 18, 2008, 9 pages.
Office Action, dated Sep. 8, 2016, received in Australian Patent Application No. 2014275224, which corresponds with U.S. Appl. No. 14/291,970, 3 pages.
Office Action, dated Sep. 26, 2016, received in Japanese Patent Application No. 2016-518365, which corresponds with U.S. Appl. No. 14/291,970, 2 pages.
Automated Driving and Collision Prevention Technology, Japan, Niikkei Business Publications, Inc., first edition, May 22, 2013, 13 pages.
Office Action, dated Feb. 13, 2018, received in Chinese Patent Application No. 201480032453.0, which corresponds with U.S. Appl. No. 14/291,970, 5 pages.
Office Action, dated Dec. 29, 2017, received in Korean Patent Application No. 2015-7036936, which corresponds with U.S. Appl. No. 14/291,970, 14 pages.

* cited by examiner

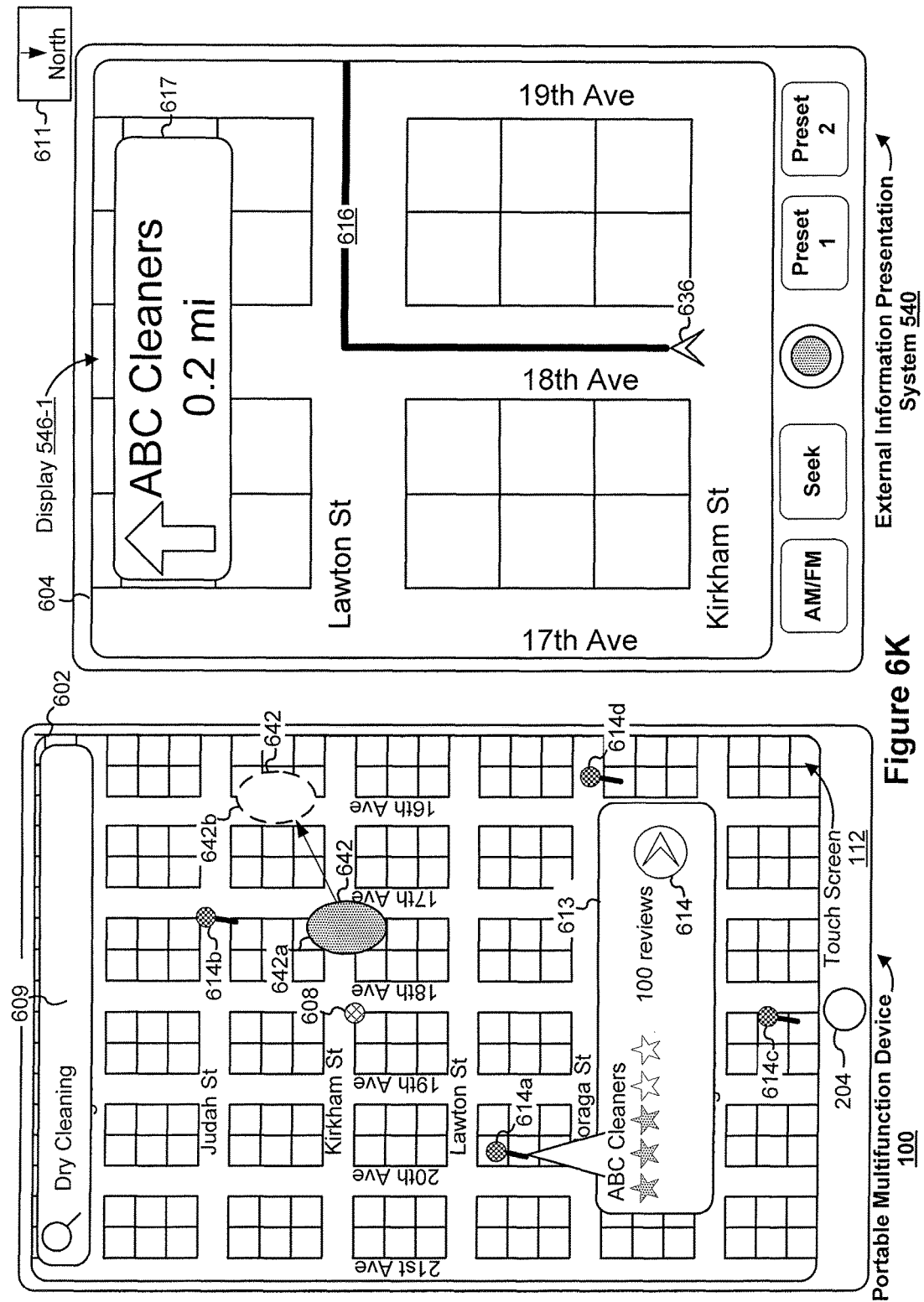

900

```
┌─────────────────────────────────────────────────────────────────────────┐
│  Receive, at an electronic device that is in communication with a plurality of  │──902
│  displays that include a first display and a second display, first input information │
│  that is indicative of a first input detected by a first input source of a plurality of │
│  input sources, where the first input information includes:                      │
│                                                                                  │
│     A first identifier for the first input source; and                           │
│                                                                                  │
│     A first input description that describes the first input                     │
└─────────────────────────────────────────────────────────────────────────┘
                                      │
                                      ▼
┌─────────────────────────────────────────────────────────────────────────┐
│  Select a first affected display from the plurality of displays based on the first │──904
│  identifier and an input-source mapping that maps input sources to               │
│  corresponding displays                                                          │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│           Selecting the first affected display includes:                         │──906
│  │                                                                       │       │
│    In accordance with a determination that the first input source is assigned    │
│  │ to the first display in the input-source mapping, selecting the first display │
│      as the first affected display that is affected by the first input; and      │
│  │                                                                       │       │
│    In accordance with a determination that the first input source is assigned    │
│  │ to the second display, different from the first display, in the input-source  │
│    mapping, selecting the second display as the first affected display that is   │
│  │           affected by the first input.                                │       │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘
                                      │
                                      ▼
  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
                      After selecting the first affected display:
  │ Determine a respective state of a user interface displayed on the first affected │──908
                                    display; and
  │                                                                                  │
    Generate the update information based on the first input description and the
  │ respective state of the user interface displayed on the first affected display   │

│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
       In accordance with a determination that the respective state of the user
  │  │ interface displayed on the first affected display is a first state, the update │  │
       information corresponds to performing a first operation for the respective     ──910
  │  │   state of the user interface displayed on the first affected display; and    │  │

│     In accordance with a determination that the respective state of the user        │
     │ interface displayed on the first affected display is a second state different │
  │     from the first state, the update information corresponds to performing a        │
     │   second operation, different from the first operation, for the respective   │
  │       state of the user interface displayed on the first affected display           │
  │  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
                                       ⓐ
  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 9A

DEVICE, METHOD, AND GRAPHICAL USER INTERFACE FOR SYNCHRONIZING TWO OR MORE DISPLAYS

CROSS-REFERENCE TO RELATED APPLICATIONS

This application claims priority to U.S. Provisional Patent Application No. 61/832,842, filed Jun. 8, 2013, and is related to the following applications: U.S. Provisional Application Ser. No. 61/793,924, filed Mar. 15, 2013, entitled "Voice and Touch User Interface"; U.S. application Ser. No. 13/032,614, filed Feb. 22, 2011, entitled Pushing a Graphical User Interface to a Remote Device with Display Rules Provided by the Remote Device"; U.S. application Ser. No. 12/683,218, filed Jan. 6, 2010, entitled "Pushing a User Interface to a Remote Device"; U.S. application Ser. No. 12/119,960, filed May 13, 2008, entitled "Pushing a User Interface to a Remote Device"; U.S. application Ser. No. 13/175,581, filed Jul. 1, 2011, entitled "Pushing a User Interface to a Remote Device"; U.S. application Ser. No. 13/161,339, filed Jun. 15, 2011, entitled Pushing a Graphical User Interface to a Remote Device with Display Rules Provided by the Remote Device"; U.S. application Ser. No. 13/250,947, filed Sep. 30, 2011, entitled "Automatically Adapting User Interfaces for Hands-Free Interaction"; U.S. application Ser. No. 12/987,982, filed Jan. 10, 2011, entitled "Intelligent Automated Assistant"; U.S. Provisional Application Ser. No. 61/295,774, filed Jan. 18, 2010, entitled "Intelligent Automated Assistant"; U.S. Provisional Application Ser. No. 61/493,201, filed Jun. 3, 2011, entitled "Generating and Processing Data Items that Represent Tasks to Perform"; U.S. Provisional Application Ser. No. 61/657,744, filed Jun. 9, 2012, entitled "Automatically Adapting User Interface for Hands-Free Interaction"; U.S. application Ser. No. 12/207,316, filed Sep. 9, 2008, entitled "Radio with Personal DJ"; U.S. Provisional Application Ser. No. 61/727,554, filed Nov. 16, 2012, entitled "System and Method for Negotiating Control of a Shared Audio or Visual Resource"; U.S. Application Ser. No. 61/832,818, filed Jun. 8, 2013, entitled "Mapping Application with Several User Interfaces,"; U.S. Provisional Application Ser. No. 61/832,841, filed Jun. 8, 2013, entitled "Device and Method for Generating User Interfaces from a Template,"; U.S. application Ser. No. 13/913,428, filed Jun. 8, 2013, entitled "Application Gateway for Providing Different User Interfaces for Limited Distraction and Non-Limited Distraction Contexts," which applications are incorporated herein by reference in their entirety.

TECHNICAL FIELD

This relates generally to electronic devices with touch-sensitive surfaces, including but not limited to electronic devices with touch-sensitive surfaces that synchronize two or more displays.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a first display associated with first electronic device.

Exemplary manipulations include adjusting the position and/or size of one or more user interface objects or activating buttons or opening files/applications represented by user interface objects or otherwise manipulating user interfaces. Exemplary user interface objects include digital images, video, text, icons, control elements such as buttons and other graphics.

Sometimes users have access to multiple different displays that are capable of displaying different content. For example, a passenger in a car or other vehicle may have access to a smart phone and its display, as well as access to a car information/entertainment system and its display(s). But when multiple different displays are available, methods for displaying content on these different displays are cumbersome and inefficient. For example, displaying the same information on the different displays generally does not provide any useful additional information to the user, while displaying unrelated information on the different displays can be confusing and inefficient for the user and sometime causes the user to spend extra time keeping relevant content displayed on both devices. In addition, these methods take longer than necessary, thereby wasting energy. This latter consideration is particularly important in battery-operated devices.

SUMMARY

Accordingly, there is a need for electronic devices with more efficient methods and interfaces for synchronizing two or more displays. Such methods and interfaces optionally complement or replace conventional methods for displaying information on two or more displays. Such methods and interfaces reduce the cognitive burden on a user and produce a more efficient human-machine interface. For battery-operated devices, such methods and interfaces conserve power and increase the time between battery charges.

Additionally, in many situations controls for use in interacting with such user interfaces displayed on the displays are often rigidly associated with a single display. This limits the flexibility of the controls, which can result in an inefficient user interface. Accordingly, there is a need for a system that seamlessly maps controls and other input sources to user interfaces displayed on different displays in a flexible manner. However, when mapping different controls to different displays, it would be easy to mistakenly associate a control with the wrong display. Moreover, taking a long time to determine which display is associated with a particular control would introduce a delay into the user's interactions with the user interface that would degrade the user experience. As such, there is a need for a fast, accurate and efficient system and method for mapping controls and other input sources to different displays of the two or more displays.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface.

In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a first electronic device that includes a first display. The method includes: displaying a first user interface on the first display, where: the first user interface enables selection between a plurality of selectable objects; the first user interface corresponds to a second user interface displayed on a second display different from the first display; and a first object from the plurality of selectable objects is displayed as a selected object in the second user interface. While the first object is displayed as the selected object in the second user interface, the method includes: detecting a first input from a user that corresponds to a request to display information about a second object in the plurality of selectable objects in the first user interface; in response to detecting the first input, updating the first user interface on the first display in accordance with the first input to display respective information about the second object while display of the first object as the selected object in the second user interface is maintained; and after updating the first user interface in accordance with the first input, detecting a second input from a user that corresponds to a request to select the second object as the selected object. In response to detecting the second input, the method further includes: updating the first user interface on the first display in accordance with the second input to display the second object as the selected object; and providing, to the second display, information that enables the second user interface on the second display to be updated to display the second object as the selected object instead of the first object.

In accordance with some embodiments, a first electronic device includes a first display unit configured to display a first user interface on the first display unit, where: the first user interface enables selection between a plurality of selectable objects; the first user interface corresponds to a second user interface displayed on a second display unit different from the first display unit; and a first object from the plurality of selectable objects is displayed as a selected object in the second user interface. The first electronic device also includes a processing unit coupled to the first display unit. While the first object is displayed as the selected object in the second user interface, the processing unit is configured to: detect a first input from a user that corresponds to a request to enable display of information about a second object in the plurality of selectable objects in the first user interface; in response to detecting the first input, update the first user interface on the first display unit in accordance with the first input to enable display of respective information about the second object while display of the first object as the selected object in the second user interface is maintained; and after updating the first user interface in accordance with the first input, detect a second input from a user that corresponds to a request to select the second object as the selected object. In response to detecting the second input, the processing unit is further configured to: update the first user interface on the first display unit in accordance with the second input to enable display of the second object as the selected object; and provide, to the second display unit, information that enables the second user interface on the second display unit to be updated to enable display of the second object as the selected object instead of the first object.

In accordance with some embodiments, a method is performed at a portable electronic device that includes a portable-device display and is in communication with a vehicle display of a vehicle. The method includes: obtaining a set of map search results that includes a plurality of candidate destinations; displaying a portable-device navigation interface on the portable-device display, where the portable-device navigation interface enables selection of a destination from the plurality of candidate destinations; and sending information to the vehicle display that enables the vehicle display to display a vehicle navigation interface, where a first destination of the plurality of candidate destinations is a selected destination in the vehicle navigation interface. While the first destination is the selected destination in the vehicle navigation interface, the method includes: detecting a first input from a user that corresponds to a request to display information about one or more candidate destinations in the plurality of candidate destinations other than the first destination; in response to detecting the first input, updating the portable-device navigation interface on the portable-device display in accordance with the first input without the vehicle navigation interface on the vehicle display being updated; and after updating the portable-device navigation interface in accordance with the first input, detecting a second input from a user that corresponds to a request to select a second destination in the plurality of candidate destinations as the selected destination. In response to detecting the second input, the method further includes: updating the portable-device navigation interface on the portable-device display in accordance with the second input to display the second destination as the selected destination; and sending information to the vehicle display that enables the vehicle display to update the vehicle navigation interface in accordance with the second input to display the second destination as the selected destination.

In accordance with some embodiments, a portable electronic device includes a portable-device display unit configured to display a portable-device navigation interface, a communications interface unit configured to communicate with a vehicle display unit of a vehicle, and a processing unit coupled to the portable-device display unit and the communications interface unit. The processing unit is configured to: obtain a set of map search results that includes a plurality of candidate destinations; enable display of the portable-device navigation interface on the portable-device display unit, where the portable-device navigation interface enables selection of a destination from the plurality of candidate destinations; and send information to the vehicle display unit that enables the vehicle display unit to enable display of the vehicle navigation interface, where a first destination of the plurality of candidate destinations is a selected destination in the vehicle navigation interface. While the first destination is the selected destination in the vehicle navigation interface, the processing unit is also configured to: detect a first input from a user that corresponds to a request to enable display of information about one or more candidate destinations in the plurality of candidate destinations other than the first destination; in response to detecting the first input, update the portable-device navigation interface on the portable-device display unit in accordance with the first input without the vehicle navigation interface on the vehicle display unit being updated; and after updating the portable-device navigation interface in accordance with the first input, detect a second input from a user that corresponds to a request to select a second destination in the plurality of candidate destinations as the selected destination. In response to detecting the second input, the processing unit is further configured to: update the portable-device navigation interface on the portable-device display unit in accordance with the second input to enable display of the second destination as the selected destination; and send information to the vehicle display unit that enables the vehicle display unit to update the vehicle navigation interface in accordance with the second input to enable display of the second destination as the selected destination.

In accordance with some embodiments, a method is performed at an electronic device that is in communication with a plurality of displays that include a first display and a second display. The method includes receiving first input information that is indicative of a first input detected by a first input source of a plurality of input sources, where the first input information includes: a first identifier for the first input source; and a first input description that describes the first input. The method also includes selecting a first affected display from the plurality of displays based on the first identifier and an input-source mapping that maps input sources to corresponding displays. The method further includes sending, to the first affected display, update information that enables the first affected display to be updated in accordance with the first input.

In accordance with some embodiments, an electronic device includes a communications interface unit configured to communicate with a plurality of display units that include a first display unit and a second display unit, and a processing unit coupled to the communications interface unit. The processing unit is configured to receive a first input information that is indicative of a first input detected by a first input source of a plurality of input sources, where the first input information includes: a first identifier for the first input source; and a first input description that describes the first input. The processing unit is also configured to select a first affected display from the plurality of displays based on the first identifier and an input-source mapping that maps input sources to corresponding displays. The processing unit is further configured to send, to the first affected display, update information that enables the first affected display to be updated in accordance with the first input.

In accordance with some embodiments, an electronic device includes a communications interface for communicating with one or more displays (e.g., a first display, a second display, a portable-device display, and/or a vehicle display), one or more processors, memory, and one or more programs; the one or more programs are stored in the memory and configured to be executed by the one or more processors and the one or more programs include instructions for performing the operations of any of the methods described herein. In accordance with some embodiments, a non-transitory computer readable storage medium has stored therein instructions which when executed by an electronic device that is in communication with one or more displays, cause the device to perform the operations of any of the methods referred described herein. In accordance with some embodiments, a graphical user interface on an electronic device that is in communication with one or more displays, a memory, and one or more processors to execute one or more programs stored in the memory including one or more of the elements displayed in any of the methods described above, which are updated in response to inputs, as described in any of the methods described herein. In accordance with some embodiments, an electronic device that is in communication with one or more displays includes means for performing the operations of any of the methods described herein. In accordance with some embodiments, an information processing apparatus, for use in an electronic device that is in communication with one or more displays, includes means for performing the operations of any of the methods described herein.

Thus, electronic devices with displays are provided with more efficient methods and interfaces for synchronizing two or more displays, thereby increasing the effectiveness, efficiency, and user satisfaction with such devices. Such methods and interfaces may complement or replace conventional methods for synchronizing two or more displays.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9C are flow diagrams illustrating a method of sending update information to an affected display in accordance with some embodiments.

DESCRIPTION OF EMBODIMENTS

Many electronic devices update a graphical user interface on a display associated with the electronic device in response to the manipulation of user interface objects displayed on the display. The first electronic device described below improves on these methods by synchronizing (in some cases) a second graphical interface on a second display with a first graphical user interface on a first display associated with the first electronic device. In some embodiments, the second display is associated with a second electronic device different from the first electronic device. In some embodiments, the first electronic device synchronizes the first display and the second display in response to manipulation of user interface objects on a first graphical user interface (e.g., manipulated with a first touch-sensitive surface or a first touch screen display associated with the first electronic device). In some other embodiments, the first electronic device synchronizes the first display and the second display in response to manipulation of user interface objects on a second graphical user interface (e.g., manipulated with a second touch-sensitive surface or a second touch screen display associated with the second electronic device).

Figure 2:
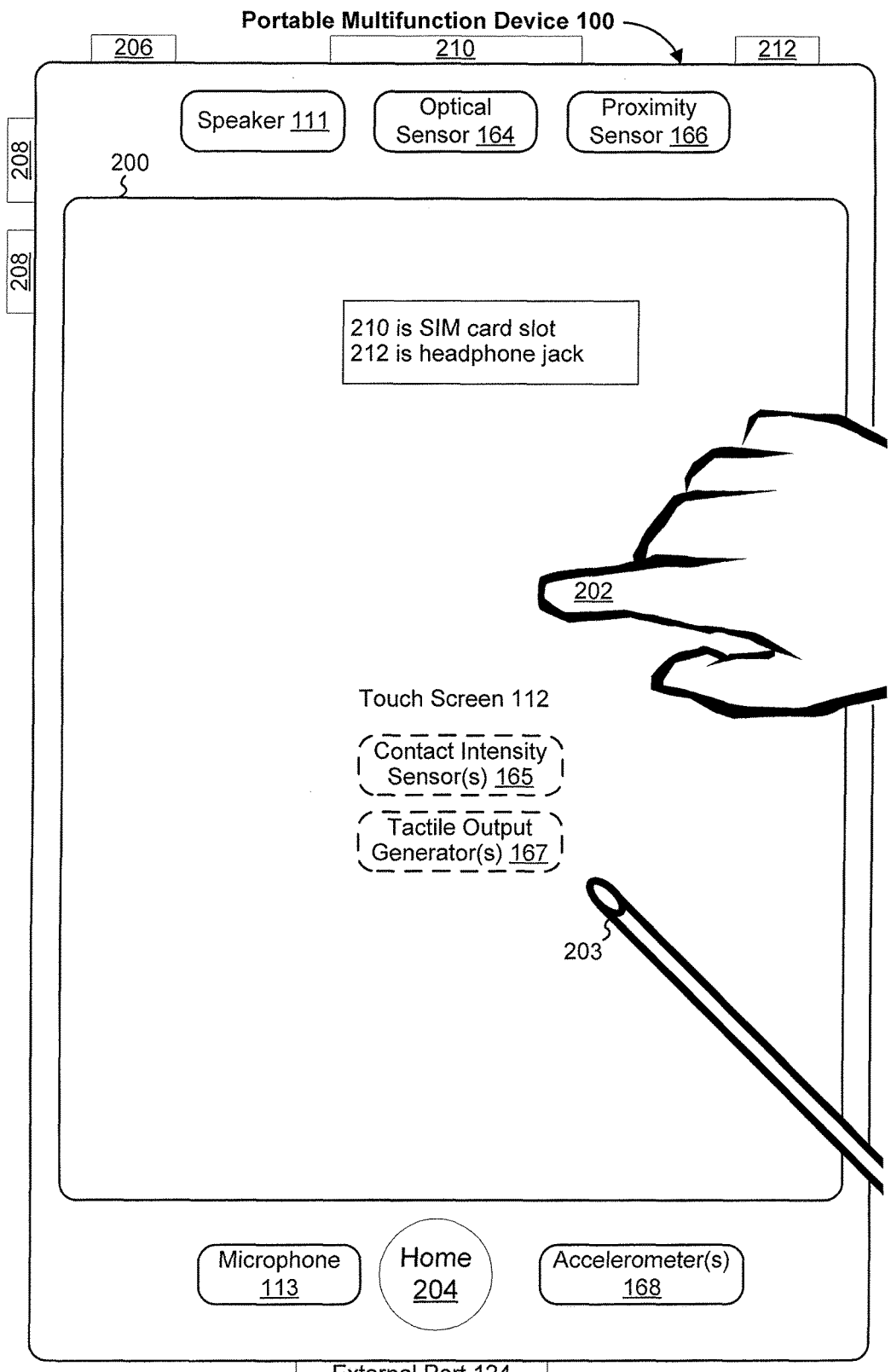
FIG. 2 illustrates a portable multifunction device having a touch screen in accordance with some embodiments.
Figure 3:
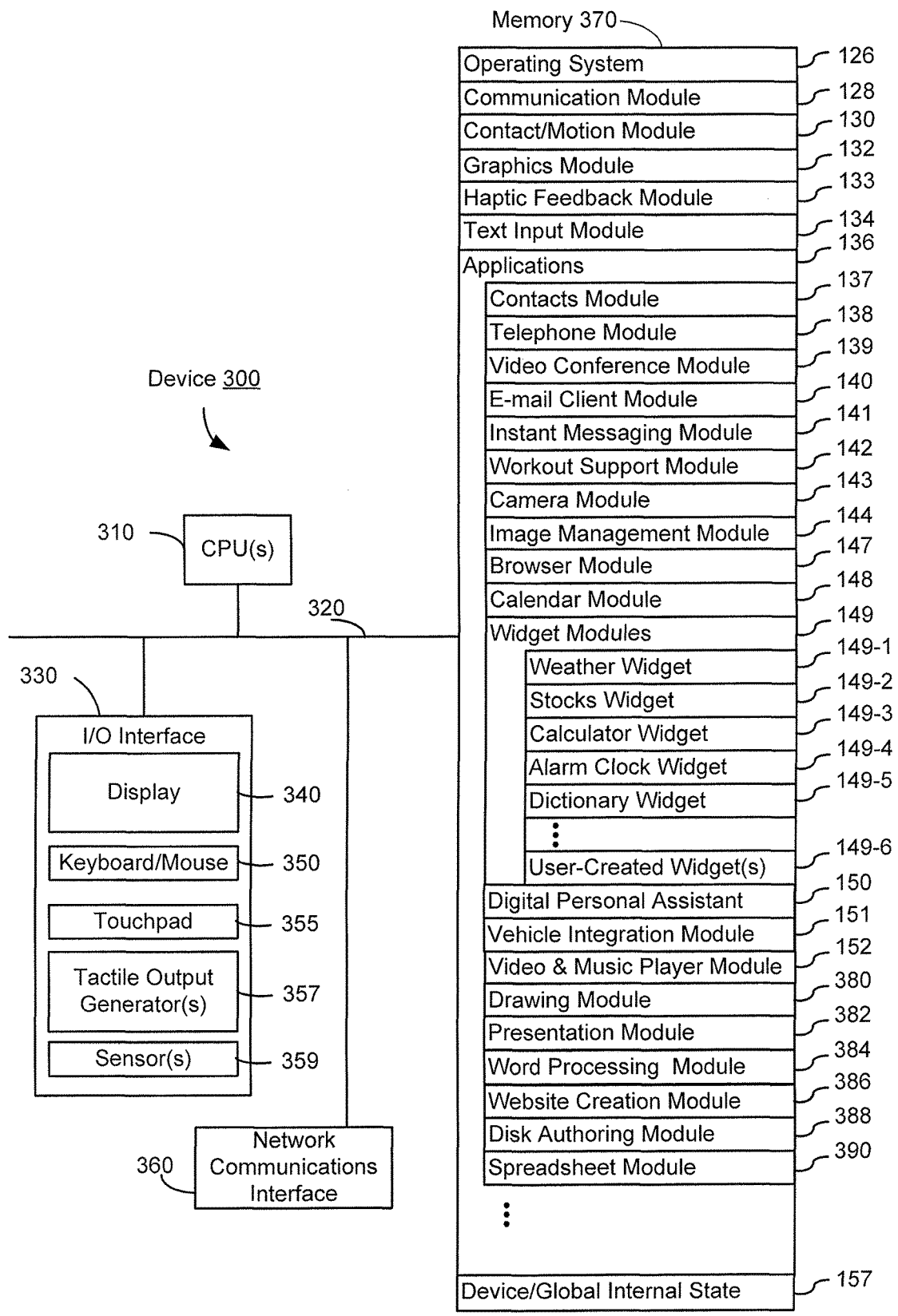
FIG. 3 is a block diagram of an exemplary multifunction device with a display and a touch-sensitive surface in accordance with some embodiments.
Figure 4A:
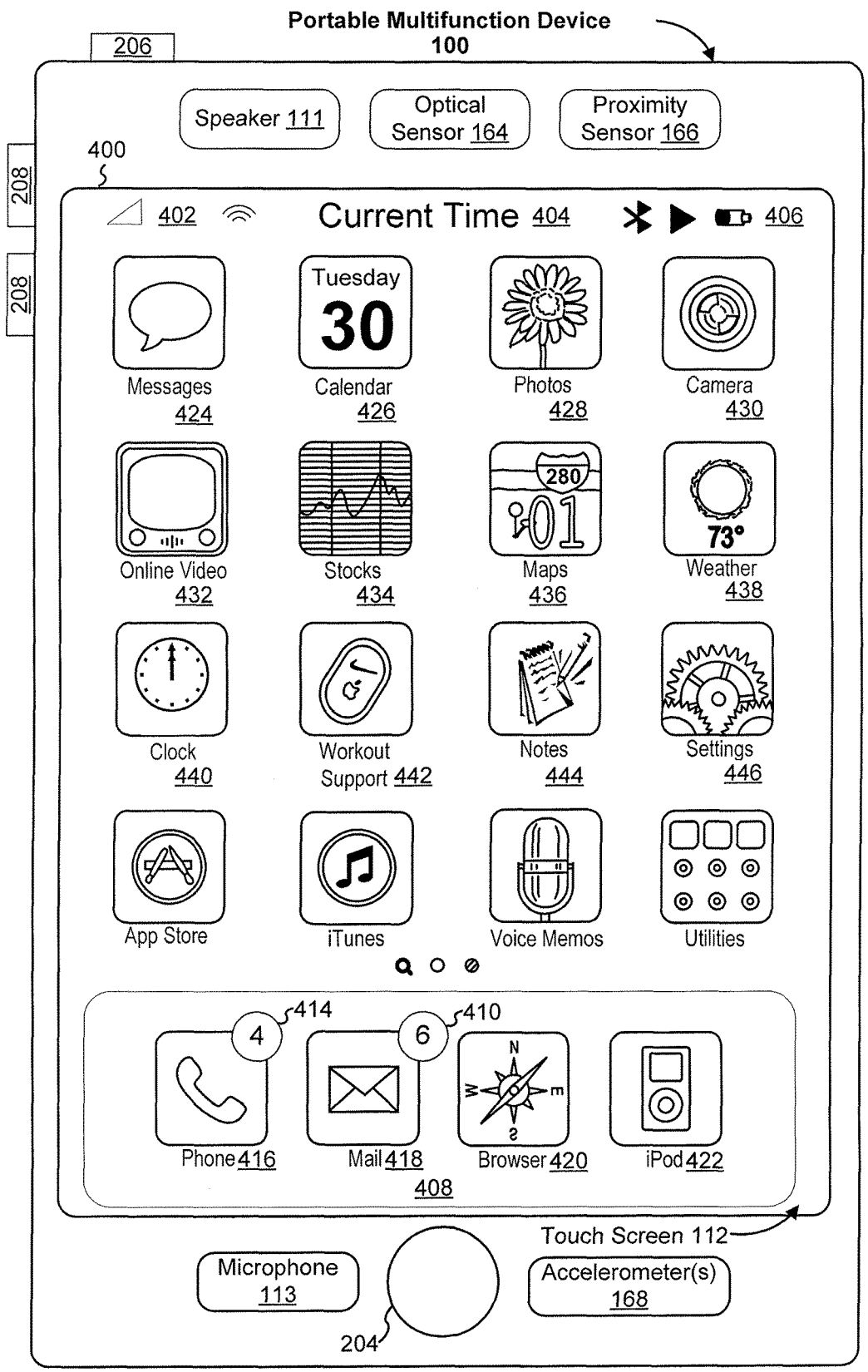
FIG. 4A illustrates an exemplary user interface for a menu of applications on a portable multifunction device in accordance with some embodiments.
Figure 4B:
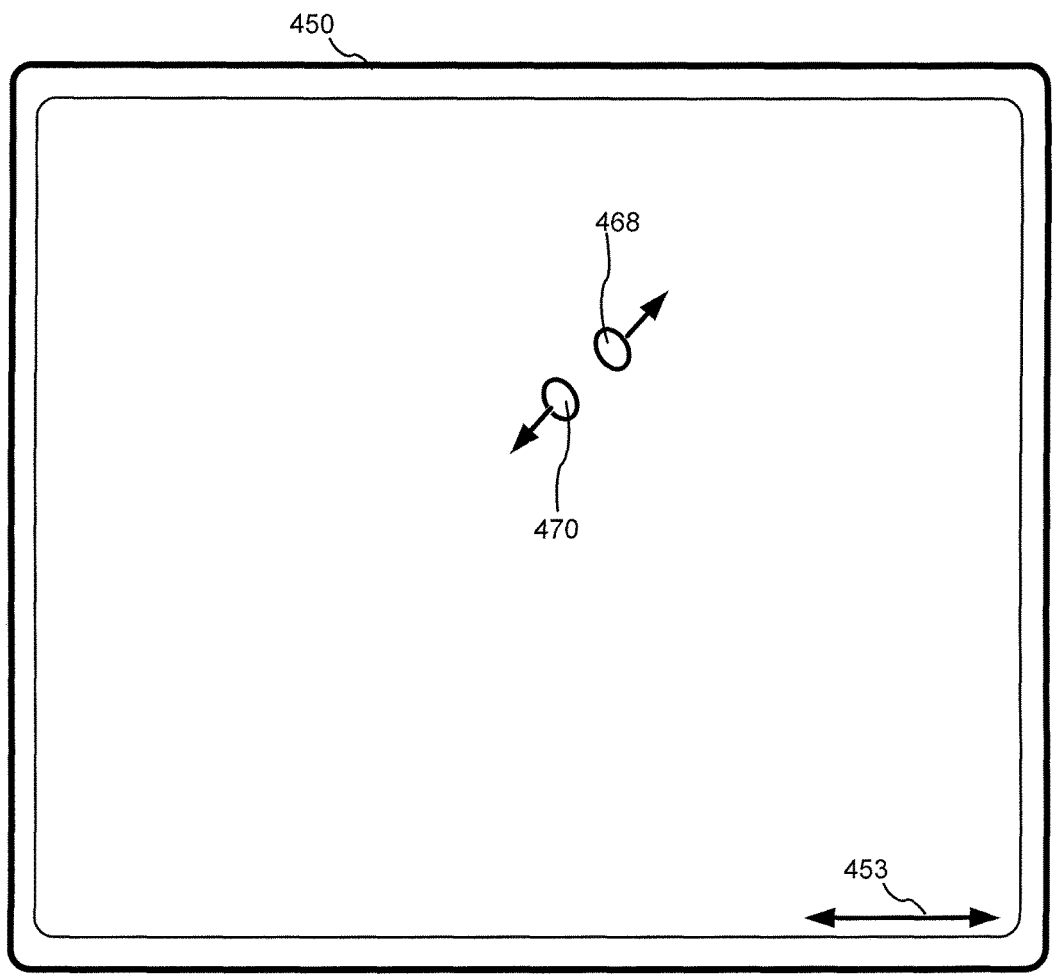
FIG. 4B illustrates an exemplary user interface for a multifunction device with a touch-sensitive surface that is separate from the display in accordance with some embodiments.
Figure 4B:
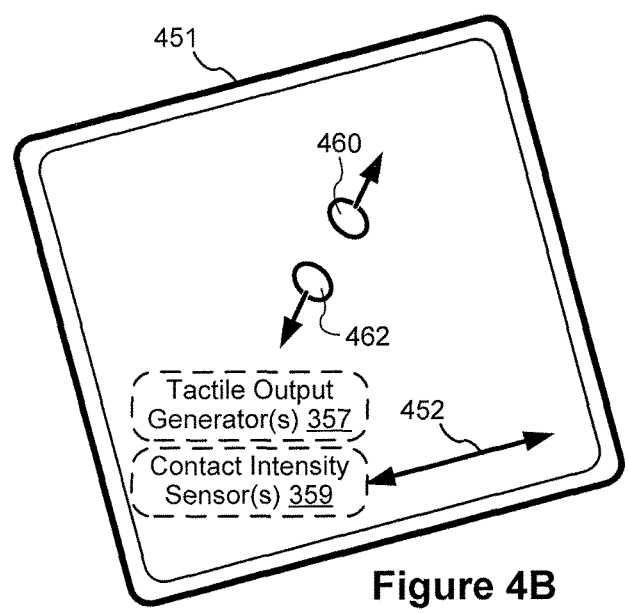
Figure 6A:
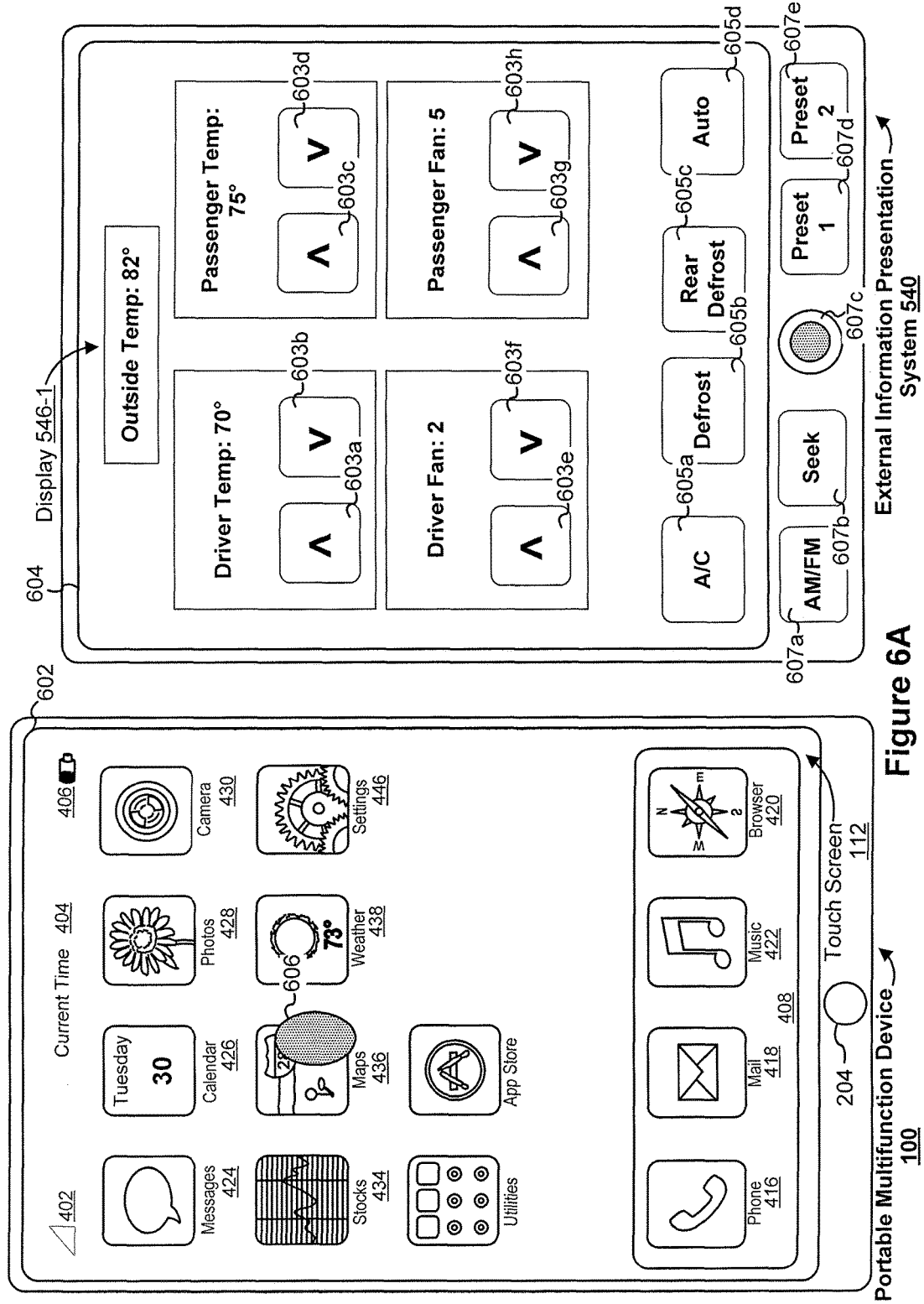
FIGS. 6A-6V illustrate exemplary user interfaces for synchronizing two or more displays in accordance with some embodiments.

Below, FIGS. 1A-1B, 2, and 3 provide a description of exemplary devices. FIGS. 4A-4B and 6A-FF illustrate exemplary user interfaces. FIGS. 7A-7D and 8A-8B are flow diagrams illustrating a method of synchronizing two or more displays. FIGS. 9A-9C are flow diagrams illustrating a method of sending update information to an affected display. The user interfaces in FIGS. 6A-6V are used to illustrate the processes in FIGS. 7A-7D and 8A-8B. The user interfaces in FIGS. 6W-6FF are used to illustrate the processes in FIGS. 9A-9C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
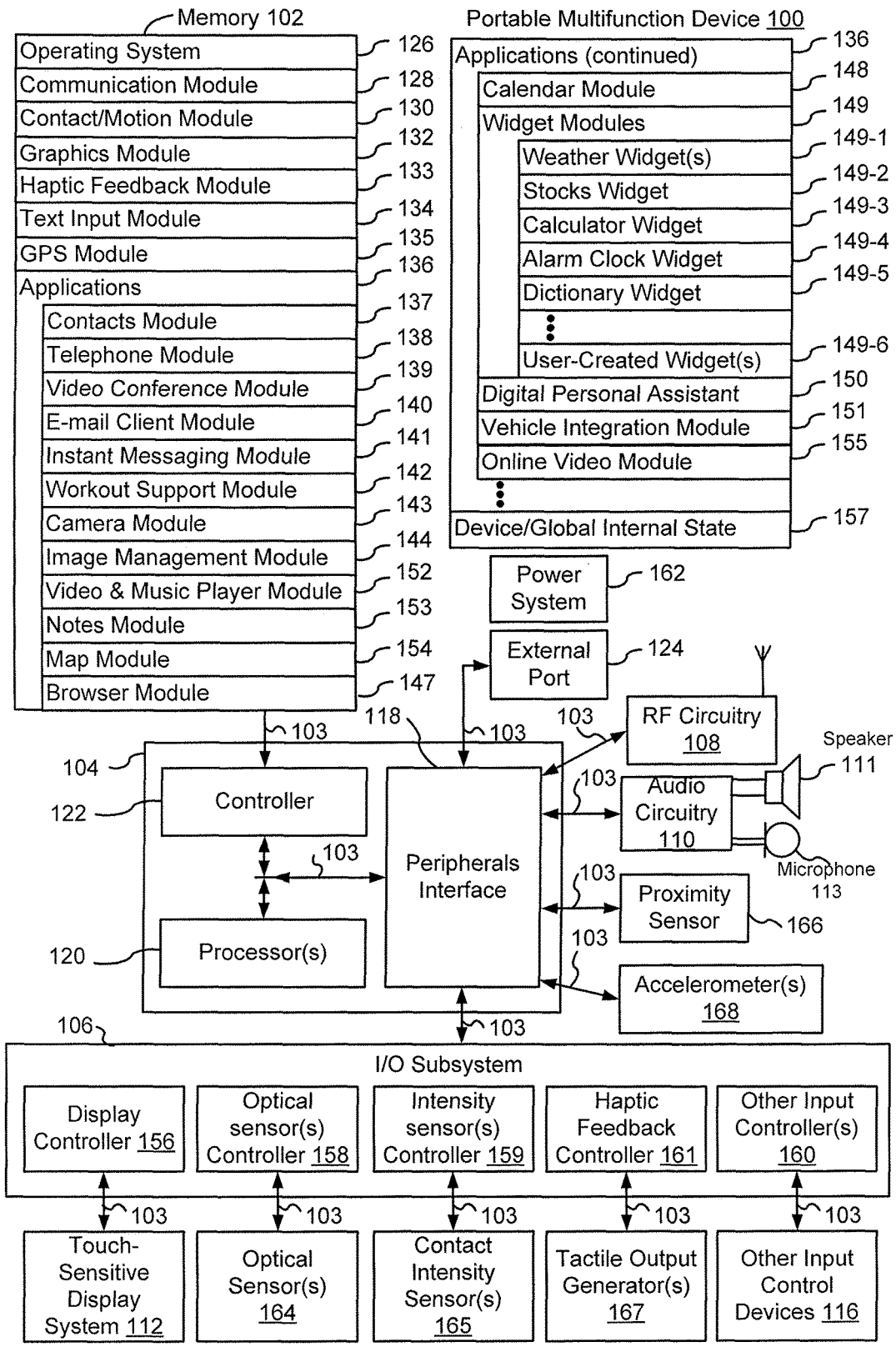
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices. In some embodiments, the external port is a multi-pin (e.g., 8-pin) connector that is the same as, or similar to and/or compatible with the 8-pin connector (e.g., Lightning connector) used on iPhone and iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  digital personal assistant module 150;
  vehicle integration module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller

158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (e.g., using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!® Widgets).

Figure 5A:
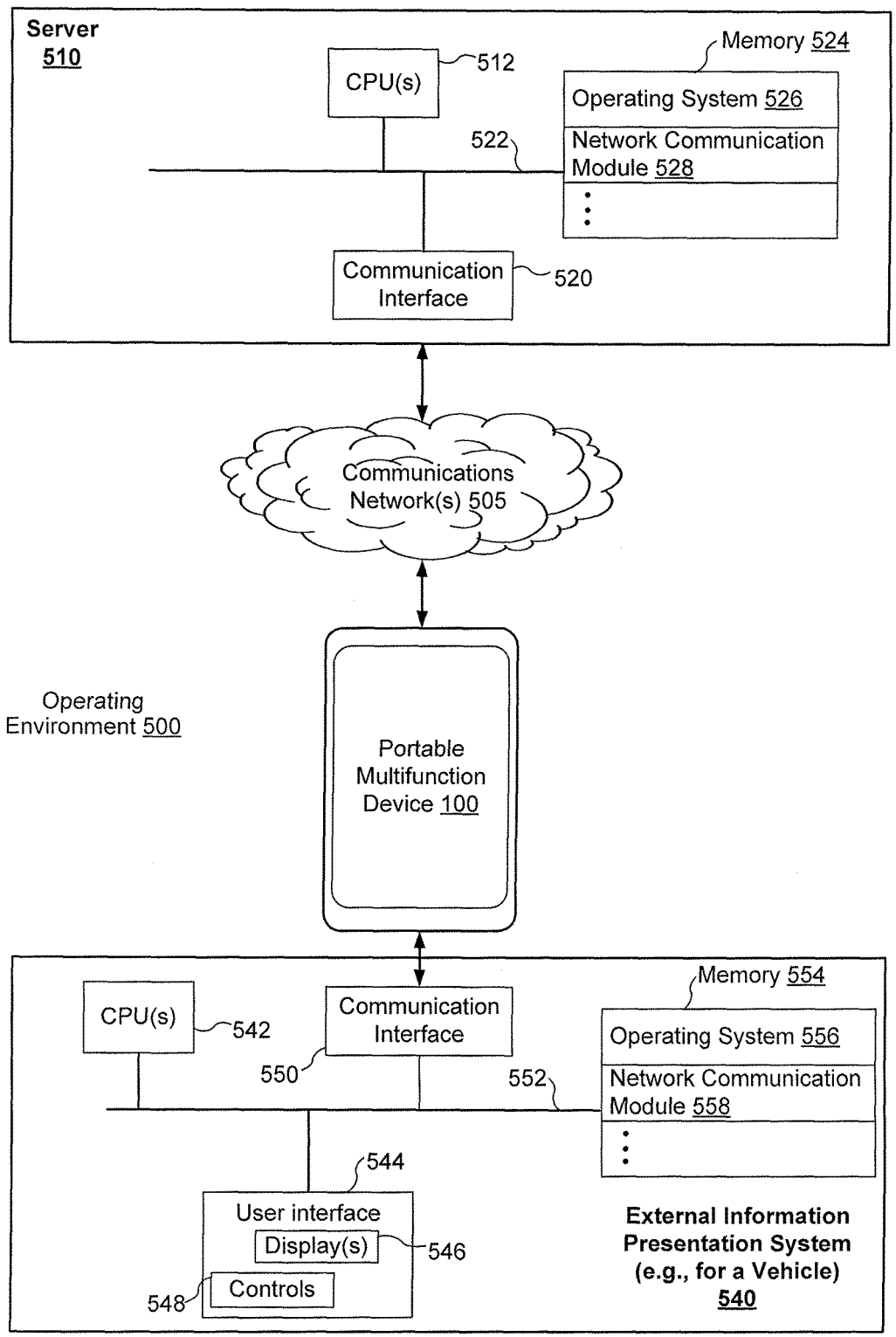
FIG. 5A is a block diagram illustrating an operating environment in which a portable multifunction device communicates with an external presentation system and/or server in accordance with some embodiments.

In conjunction with RF circuitry 108, audio circuitry 110, speaker 111, microphone 113, touch screen 112, display controller 156, contact module 130, graphics module 132, and text input module 134, digital personal assistant module 150 records voice commands and sends information representative of the recorded voice commands to a server such as server 510 in FIG. 5A for analysis, and responds to the voice commands based on a response from the server.

Vehicle integration module 151 includes executable instructions for one or more intermediation processes that control a vehicle information display system in a vehicle (e.g., a car, a truck, a van, etc.) that provides a user interface on a respective display of the vehicle information display system (e.g., display 546 of external information presentation system 540 in FIG. 5A), such as for a mapping application or a music application. The vehicle integration application converts information from third-party applications into content for display by the vehicle integration application on the respective display of the vehicle information display system.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
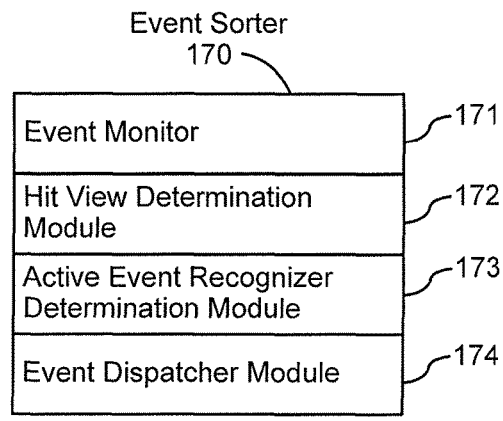
FIG. 1B is a block diagram illustrating exemplary components for event handling in accordance with some embodiments.
Figure 1B:
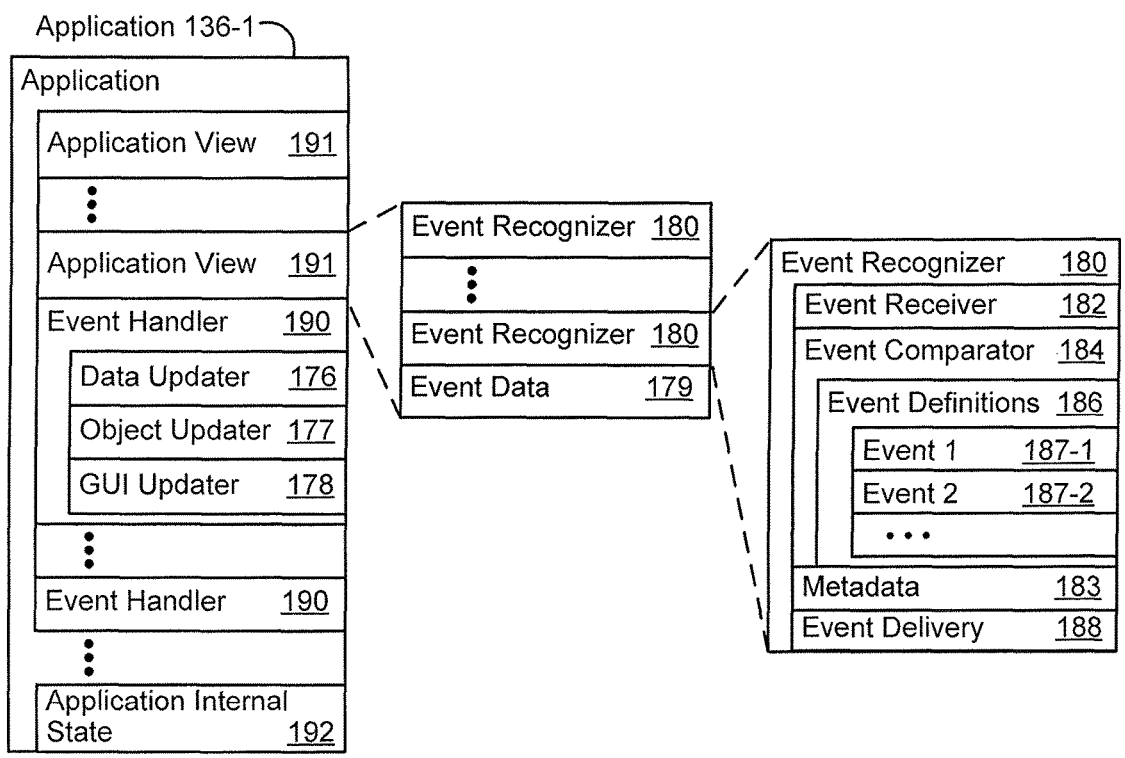

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physic allocation of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display (e.g., touch screen display 112). I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod."
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

FIG. 5A illustrates a block diagram of an operating environment 500 in accordance with some embodiments. Operating environment 500 includes a server 510, one or more communications networks 505, portable multifunction device 100, and external information presentation system 540. In some embodiments, external information presentation system 540 is an entertainment and/or navigation system that is implemented in a vehicle. In some embodiments, external information presentation system 540 includes one or more displays. In some embodiments, a vehicle includes a plurality of external information presentation system 540 communicatively coupled to device 100 in operating environment 500 each with a respective display.

Server 510 typically includes one or more processing units (CPUs) 512 for executing modules, programs and/or instructions stored in memory 524 and thereby performing processing operations, one or more network or other communications interfaces 520, memory 524, and one or more communication buses 522 for interconnecting these components. Communication buses 522 optionally include circuitry (sometimes called a chipset) that interconnects and controls communications between system components. Memory 524 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 524 optionally includes one or more storage devices remotely located from the CPU(s) 512. Memory 524, or alternately the non-volatile memory device(s) within memory 524, comprises a non-transitory computer readable storage medium. In some embodiments, memory 524, or the computer readable storage medium of memory 524 stores the following programs, modules, and data structures, or a subset thereof:
- an operating system 526 that includes procedures for handling various basic system services and for performing hardware dependent tasks; and
- a network communication module 528 that is used for connecting (wired or wireless) server 510 to other computing devices via the one or more communication network interfaces 520 and one or more communication networks 505, such as the Internet, other wide area networks, local area networks, metropolitan area networks, and so on.

Portable multifunction device 100 (sometimes herein also called "device 100") typically includes the components described with reference to FIGS. 1A-1B and/or 3.

External information presentation system 540 (sometimes herein also called "system 540") typically includes one or more processing units (CPUs) 542 for executing modules, programs and/or instructions stored in memory 554 and thereby performing processing operations, one or more network or other communications interfaces 550, memory 554, and one or more communication buses 552 for interconnecting these components. External information presentation system 540, optionally, includes a user interface 544 comprising one or more display devices 546 and a plurality of controls 548 (e.g., jog dials, knobs, buttons, switches, a touch-sensitive surface such as a touch screen display, or other input sources). In some embodiments, the one or more displays 546 include a primary display 546-1 (e.g., a dashboard or vehicle navigation display) and an auxiliary display 546-2 (e.g., a rear-seat or entertainment display). In some embodiments, a respective display of the one or more displays 546 is a touch screen display that is capable of receiving user touch inputs (e.g., detecting finger contacts and gestures that correspond to the detection and movement of finger contacts). In some embodiments, a respective display of the one or more displays 546 is associated with one or more controls of the plurality of controls 548 (e.g., jog dials, knobs, buttons, switches, a touch-sensitive surface such as a touch screen display, or other input sources.). Communication buses 552 optionally include circuitry (sometimes called a chipset) that interconnects and controls communications between system components. Memory 554 includes high-speed random access memory, such as DRAM, SRAM, DDR RAM or other random access solid state memory devices, and, optionally, includes non-volatile memory, such as one or more magnetic disk storage devices, optical disk storage devices, flash memory devices, or other non-volatile solid state storage devices. Memory 554 optionally includes one or more storage devices remotely located from the CPU(s) 542. Memory 552, or alternately the non-volatile memory device(s) within memory 552, comprises a non-transitory computer readable storage medium. In some embodiments, memory 552, or the computer readable storage medium of memory 552 stores the following programs, modules, and data structures, or a subset thereof:
- an operating system 556 that includes procedures for handling various basic system services and for performing hardware dependent tasks; and
- a network communication module 558 that is used for connecting (wired or wireless) server 510 to other computing devices via the one or more communication network interfaces 550 and one or more communication networks 505, such as the Internet, other wide area networks, local area networks, metropolitan area networks, and so on.

In some embodiments, device 100 drives the one or more displays 546 of system 540. For example, device 100 sends a video signal to system 540, and CPU 542 of system 540 renders the video signal on the one or more displays 546. In some embodiments, device 100 sends a video signal directly to the one or more displays 546 and CPU 542 is not used to render the video signal (e.g., device 100 uses display 546 as an auxiliary display). In some embodiments, the user interface displayed on touch screen 112 of device 100 is synchronized with the user interface displayed on the one or more displays 546 of system 540, and, in some other embodiments, the user interface displayed on touch screen 112 of device 100 is not continuously synchronized with the user interface displayed on the one or more displays 546 of system 540 and at times (e.g., while a user of device 100 is viewing information about possible driving destinations but has not yet selected a driving destination) touchscreen 112 of device 100 displays different information from that displayed on display 546 of system 540 (e.g., touch screen 112 and display 546 are intermittently synchronized with periods in between the intermittent synchronization events where they are not synchronized).

In some embodiments, in response to detecting a user input (e.g., a user touch input associated with a respective display of the one or more displays 546 or a user input associated with a respective control of the plurality of controls 548), system 540 (or the respective display of the one or more displays 546, or the respective control of the plurality of controls 548) sends input information (e.g., an identifier for the input source and an input description describing the user input) corresponding to the user input to device 100. In turn, device 100 updates the user interface displayed on the respective display of the one or more displays 546 and/or touch screen 112 of device 100 in accordance with the received input information and/or the display state of the user interface displayed on the respective display of the one or more displays 546 at or before the user input.

Figure 5B:
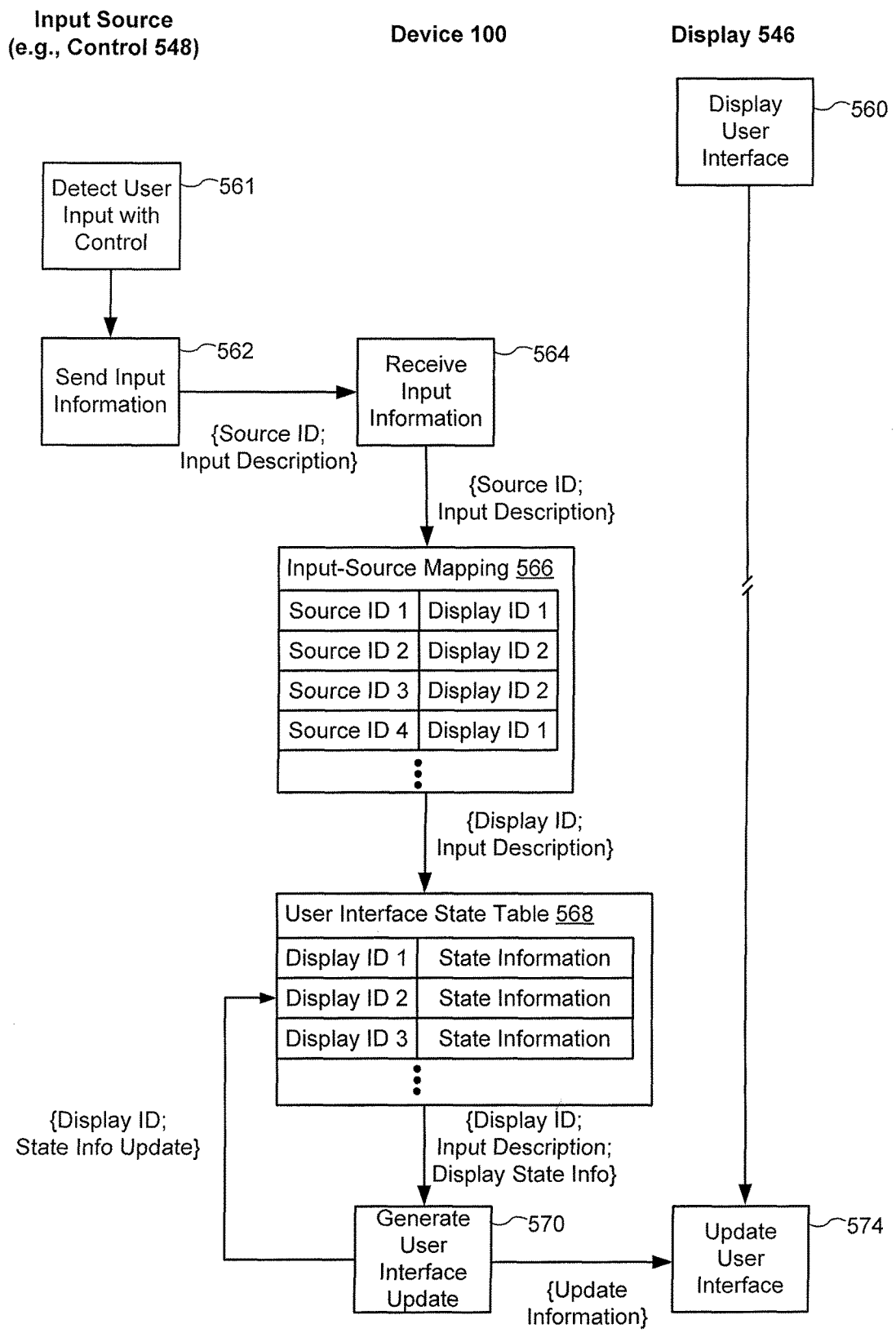
FIG. 5B is a flow diagram illustrating a method of sending update information to an affected display in accordance with some embodiments.

FIG. 5B is a flow diagram illustrating a process of selecting an affected display and sending update information to the affected display. The affected display (e.g., primary display 546-1) displays (560) a user interface. A respective input source (e.g., jog dial 675 shown in FIGS. 6W-6FF) that is a control of system 540 detects (561) a user input (e.g., rotation of jog dial 675). In some embodiments, the respective input source is one of controls 548 and the user input is an interaction with one of controls 548. For example, controls 548 include buttons, switches, dials, knobs, other mechanical affordances, touch-sensitive surfaces, or other input sources. For example, the user input is rotation of a knob or dial, depression of an affordance or knob, a touch input detected on a touch-sensitive surface or touch screen, or other user interaction with controls 548.

In response to detecting the user input, the respective input source sends (562) input information (e.g., {Source ID; Input Description}) to device 100. In some embodiments, the input information includes a unique identifier for the input source and input description information that describes the user input. For example, the input description information is raw input data such as the magnitude and direction of rotation of a jog dial, contact locations and movement amounts/directions detected on a touch-sensitive surface and/or gesture data describing a type of gesture that was performed on the touch-sensitive surface.

Device 100 receives (564) the input information from the respective input source. Device 100 selects an affected display by correlating the unique identifier (e.g., source ID) included in the input information with a display identifier tag (e.g., a display ID) based at least in part on input-source mapping 566. In some embodiments, the input-source mapping 566 is stored in memory of device 100. For example, device 100 associates rotation of jog dial 675 with a first display (e.g., display 546-1 in FIGS. 6W-6CC) based on input-source mapping 566 when jog dial 675 is associated with the first display. Alternatively, when jog dial 675 is associated with a second display (e.g., display 546-2 in FIGS. 6DD-6FF), device 100 associates rotation of jog dial 675 with the second display. In some embodiments, multiple inputs sources are mapped to a same display. However, in some embodiments, each input source is mapped no more than a single display. In some embodiments, input-source mapping 566 is updated by device 100 in response to detecting input-source-mapping update events (e.g., a vehicle associated with the first display starting to back up and taking control of the first display, or an input associating a jog dial with the second display instead of the first display) and/or in accordance with a predetermined schedule.

After selecting the affected display, device 100 determines a respective state of the user interface displayed on the affected display by correlating the display ID (determined based on input-source mapping 566) for the affected display with display state information (e.g., what kind of user interface is displayed in the display, what user interface elements are displayed, and/or which controls are associated with which functions such as volume control or scrolling) based at least in part on user interface state table 568. In some embodiments, the user interface state table 568 is stored in memory of device 100. After determining the respective state of the user interface displayed on the affected display, device 100 generates (570) an updated user interface for the affected display in accordance with the respective state of the user interface displayed on the affected display and the input description information, and device 100 sends the updated user interface (or information for generating an updated user interface) to the affected display. In some embodiments, device 100 also updates user interface state table 568 so that the state information associated with the display ID corresponding to the affected display reflects the updated user interface (e.g., for use in responding to subsequent input information received from the input source).

In response to receiving the updated user interface (e.g., update information) from device 100, the affected display updates (574), the user interface displayed on the affected displayed so as to display the updated user interface (e.g., by replacing an image of a user interface previously provided by device 100 with an updated image of the user interface provided by device 100 in the update information).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 6A-6V illustrate exemplary user interfaces for synchronizing two or more displays in accordance with some embodiments. The user interfaces in these figures are used to illustrate the processes described below, including the processes in FIGS. 7A-7D and 8A-8B.

FIG. 6A illustrates user interface 602 displayed on touch screen 112 of portable multifunction device 100 (sometimes herein also called "device 100"). User interface 602 includes a plurality of user interface objects (e.g., application icons 424, 426, 428, 430, 434, 436, 438, 446, 416, 418, 420, and 422). FIG. 6A also illustrates detecting user touch input 606 over the maps application icon 436 on touch screen 112.

FIG. 6A further illustrates user interface 604 displayed on display 546-1 of external information presentation system 540 (sometimes herein also called "system 540"). In some embodiments, system 540 is included in a vehicle (e.g., in the dashboard or steering wheel of the vehicle). In some embodiments, display 546-1 is a primary display of a plurality of displays associated with system 540. In some embodiments, display 546-1 is implemented in the dashboard of the vehicle and is visually accessible to the driver and/or passenger of the vehicle. In some embodiments, display 546-1 is a touch screen display configured to detect one or more user touch inputs. FIG. 6A illustrates display 546-1 displaying a plurality of climate controls in user interface 604 including the outside temperature (e.g., 82°), the temperature in the driver's zone of the vehicle (e.g., 70°), the temperature in the passenger's zone of the vehicle (e.g., 75°), the fan intensity in the driver's zone of the vehicle (e.g., 2 on a 0-10 scale), and the fan intensity in the passenger's zone of the vehicle (e.g., 5 on a 0-10 scale). FIG. 6A also illustrates display 546-1 displaying a plurality of user interface objects (sometimes herein called "affordances" or "selectable user interface objects") enabled to adjust the temperature in a respective zone of the vehicle (e.g., affordances 603a, 603b, 603c, and 603d), a plurality of user interface objects enabled to adjust the fan intensity in a respective zone of the vehicle (e.g., affordances 603e, 603f, 603g, and 603h), and a plurality of user interface objects enabled to adjust other vehicle climate control settings (e.g., affordances 605a related to air conditioning, 605b related to windshield defrost, 605c related to rear window defrost, and 605d related to automatic climate control). FIG. 6A further illustrates a plurality of mechanical affordances configured to control the volume of the sound system of the vehicle or to scroll one or more user interface objects on display 546-1 (e.g., knob or jog dial 607c), and the radio tuner of the vehicle (e.g., affordances 607a, 607b, 607d, and 607e).

Figure 6B:
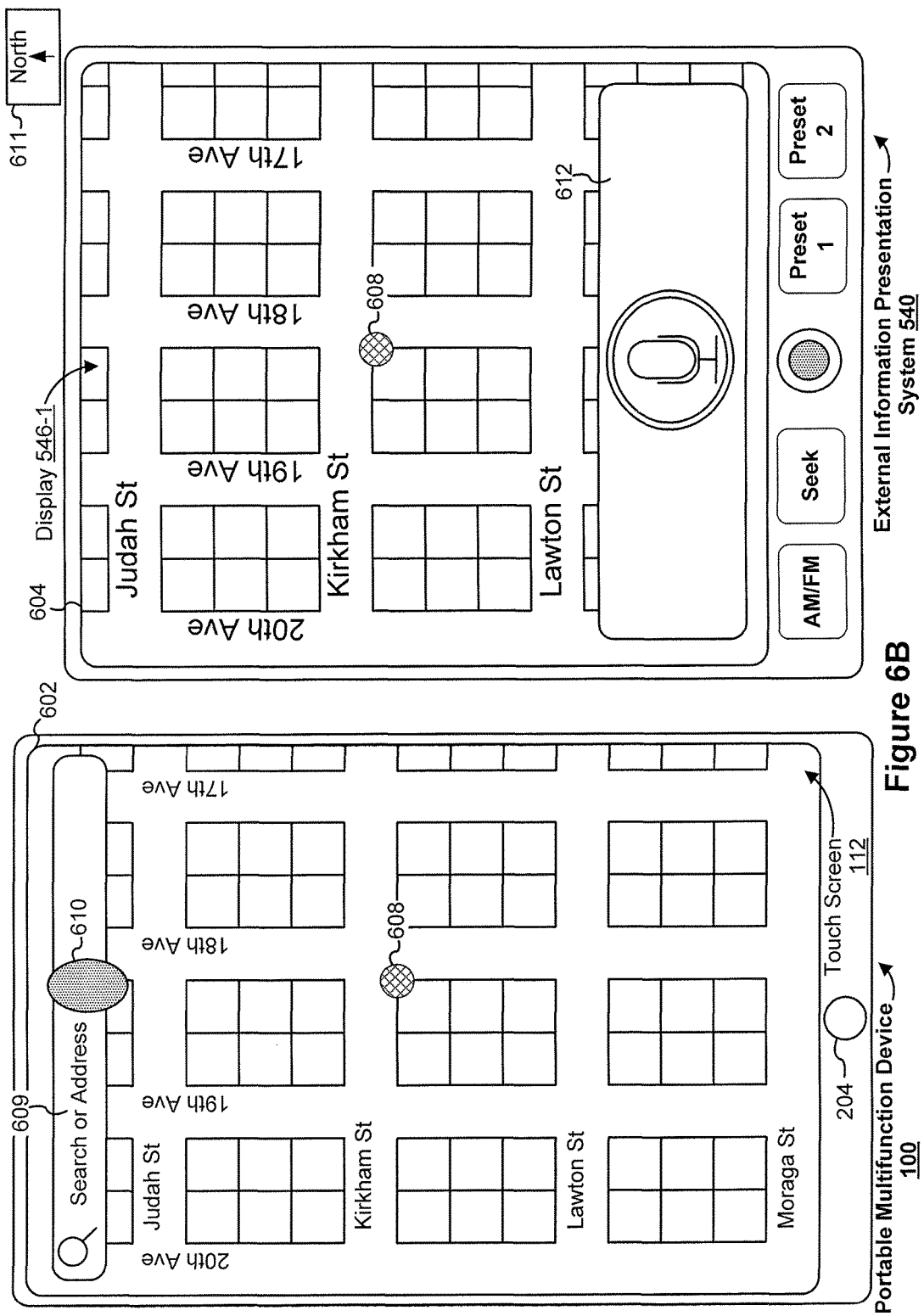
FIGS. 6W-6FF illustrate exemplary user interfaces for sending update information to an affected display in accordance with some embodiments.

FIG. 6B illustrates touch screen 112 displaying current location 608 of device 100 in a map application in user interface 602 of touch screen 112 in response to detecting user touch input 606 over the maps application icon 436 in FIG. 6A. In some embodiments detecting a user touch input over a respective affordance corresponds to detecting a tap gesture on the respective affordance, where the tap gesture includes detecting a contact at a location that corresponds to the respective affordance and detecting liftoff of the contact within a predetermined time period (e.g., 0.05. 0.1, 0.2, 03, 0.4 or 0.5 seconds). In some embodiments, the map displayed in user interface 602 is not to scale. FIG. 6B also illustrates detecting user touch input 610 over search box 609 on touch screen 112.

FIG. 6B further illustrates displaying, on display 546-1, a current location 608 of device 100 in a map displayed in user interface 604 in response to detecting user touch input 606 over the maps application icon 436 in FIG. 6A. In some embodiments, the map displayed in user interface 604 is not to scale. Affordance 612, also displayed in user interface 604, when activated, causes the device to invoke a digital assistant (e.g., Siri from Apple Inc. of Cupertino, Calif.). FIG. 6B also illustrates compass 611 indicating the orientation of the map displayed in user interface 604 (e.g., the map is oriented with the top of display 546-1 being north). In some implementations, the font size of information displayed in user interface 604 of display 546-1 is larger than the font size of information displayed in user interface 602 of touch screen 112. For example, when system 540 is located in a vehicle, the text on display 546-1 is generated so as to be larger than on touch screen 112 of device 100 to enable greater readability while the driver and passenger(s) of the vehicle are at arm's length of display 546-1.

Figure 6C:
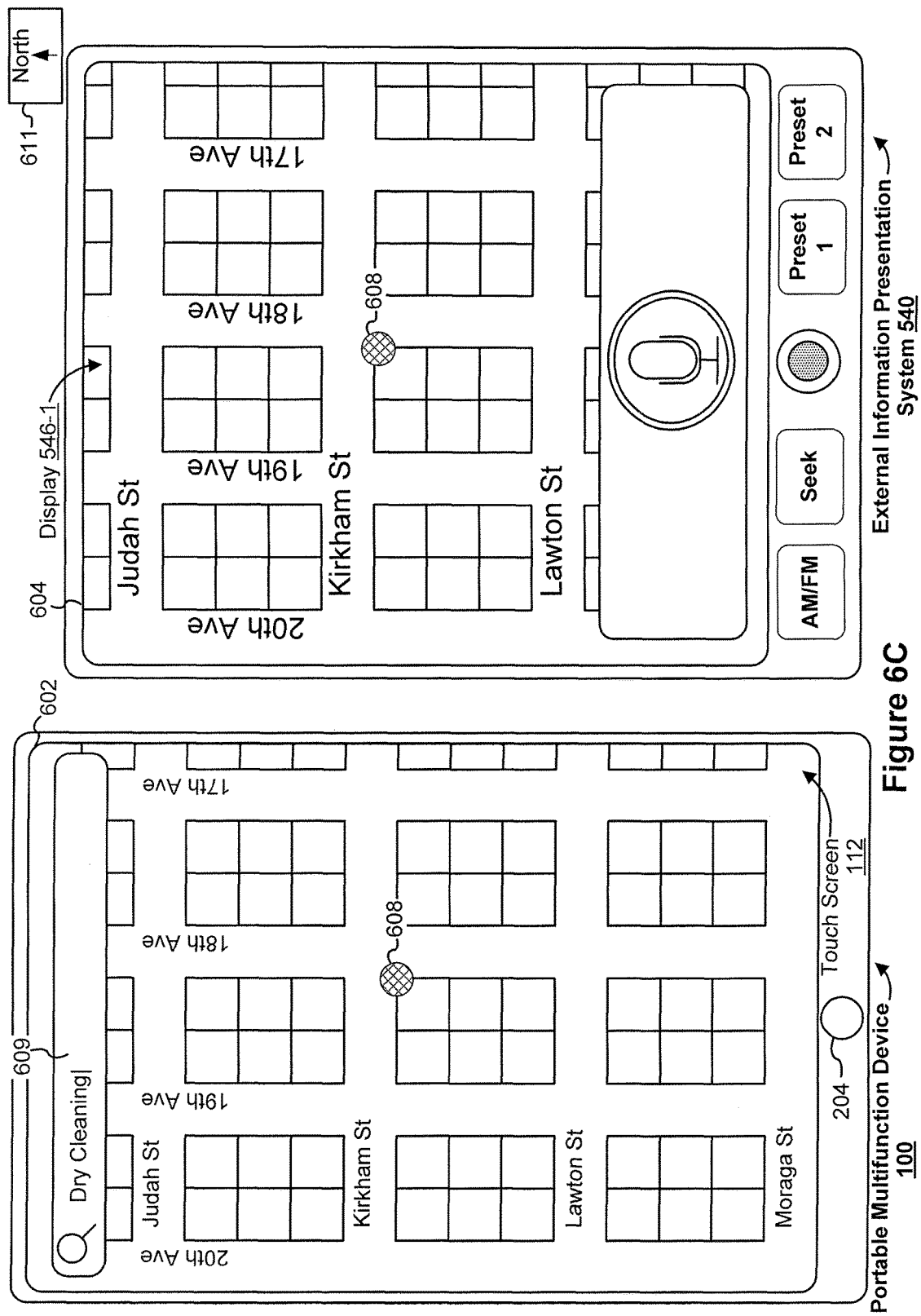

FIG. 6C illustrates displaying a user search query (e.g., dry cleaning) input in search box 609 of user interface 602. In one example, the user manually inputs the search query with a virtual keyboard in user interface 602 of device 100. In another example, the search query is a speech input received from the user of device 100. FIG. 6C further illustrates maintaining display of user interface 604 from FIG. 6B on display 546-1.

Figure 6D:
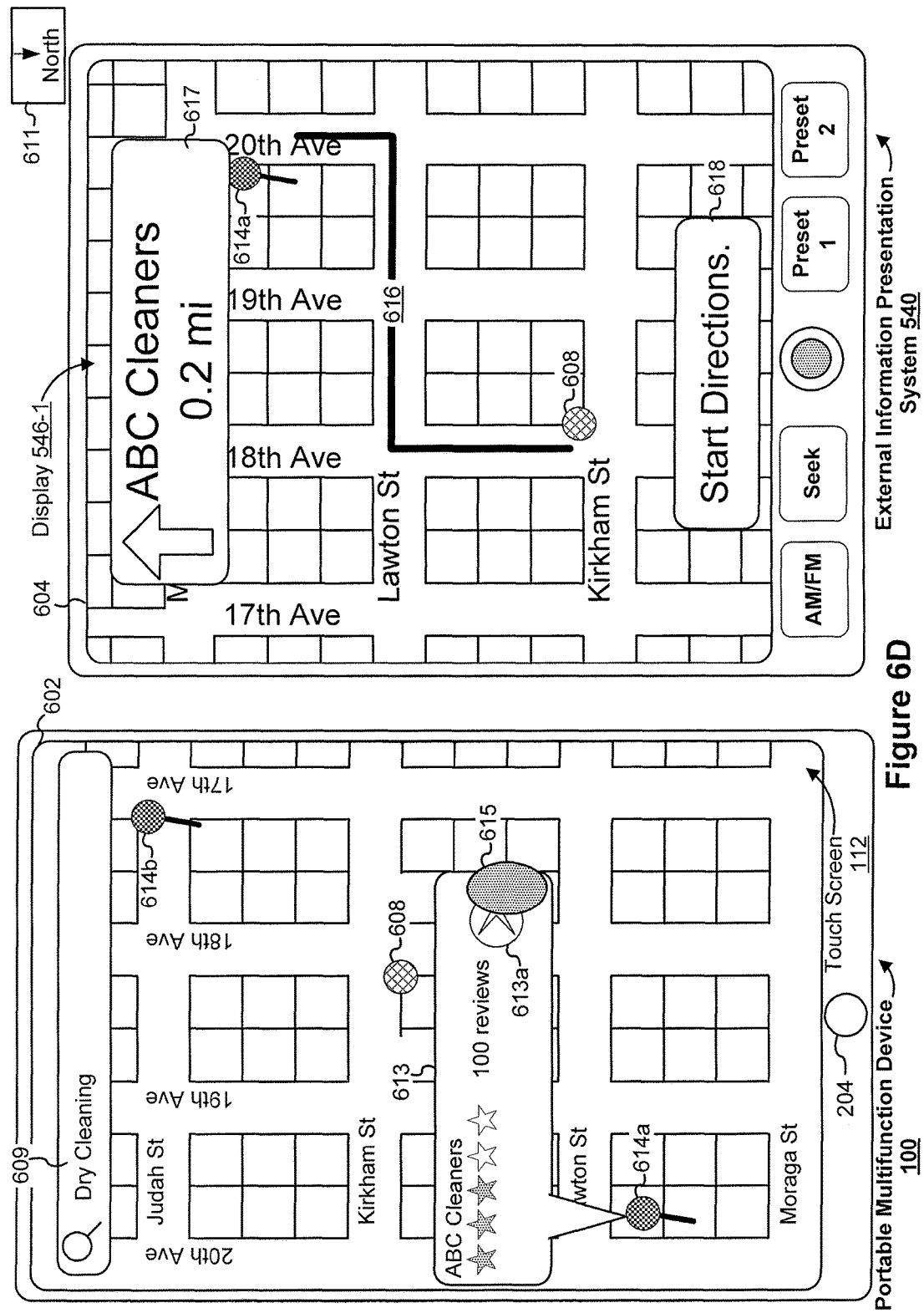

FIG. 6D illustrates displaying user interface objects (e.g., pins) associated with the dry cleaners represented by pins 614a and 614b nearby current location 608 of device 100 in user interface 602 in response to input of the search query in FIG. 6C. In some embodiments, a search result (or establishment) matching the user's search query is automatically selected (e.g., ABC Cleaners) based on proximity, the establishment's ratings, the amount of reviews, the amount of times the user has frequented the establishment, and/or other factors. In FIG. 6D, information box 613 corresponding to automatically selected dry cleaner represented by pin 614a is also displayed in user interface 602. Information box 613 includes the dry cleaning establishment's name (e.g., ABC Cleaners), the rating of the establishment (e.g., 3 out of 5 stars), the amount of user reviews for the establishment (e.g., 100 reviews), and affordance 613a configured to display additional information corresponding to the establishment. In some embodiments, information box 613, when activated, causes the device to display additional information corresponding to the establishment in response to a user touch input anywhere in information box 613. In some other embodiments, information box 613, when activated, causes the device to display additional information corresponding to the establishment in response to a user touch input over affordance 613a. FIG. 6D also illustrates detecting user touch input 615 over affordance 613a on touch screen 112.

FIG. 6D further illustrates displaying suggested route 616 from current location 608 of device 100 to the automatically selected search result (e.g., dry cleaner represented by pin 614a corresponding to ABC cleaners) in user interface 604 in response to input of the search query in FIG. 6C. In FIG. 6D, user interface 604 includes route 616, turn-by-turn directions box 617 indicating the user's first direction (or turn) on route 616 and the name of the destination (e.g., ABC Cleaners), and "start directions" affordance 618 configured to initiate a turn-by-turn direction mode in which the device would provide turn-by-turn directions to ABC Cleaners using visual and/or spoken prompts. FIG. 6D also illustrates compass 611 indicating the orientation of the map displayed in user interface 604 (e.g., the map is oriented with the top of display 546-1 being south, so that the direction that the vehicle is instructed to drive in the turn-by-turn directions is oriented toward a top of display 546-1).

Figure 6E:
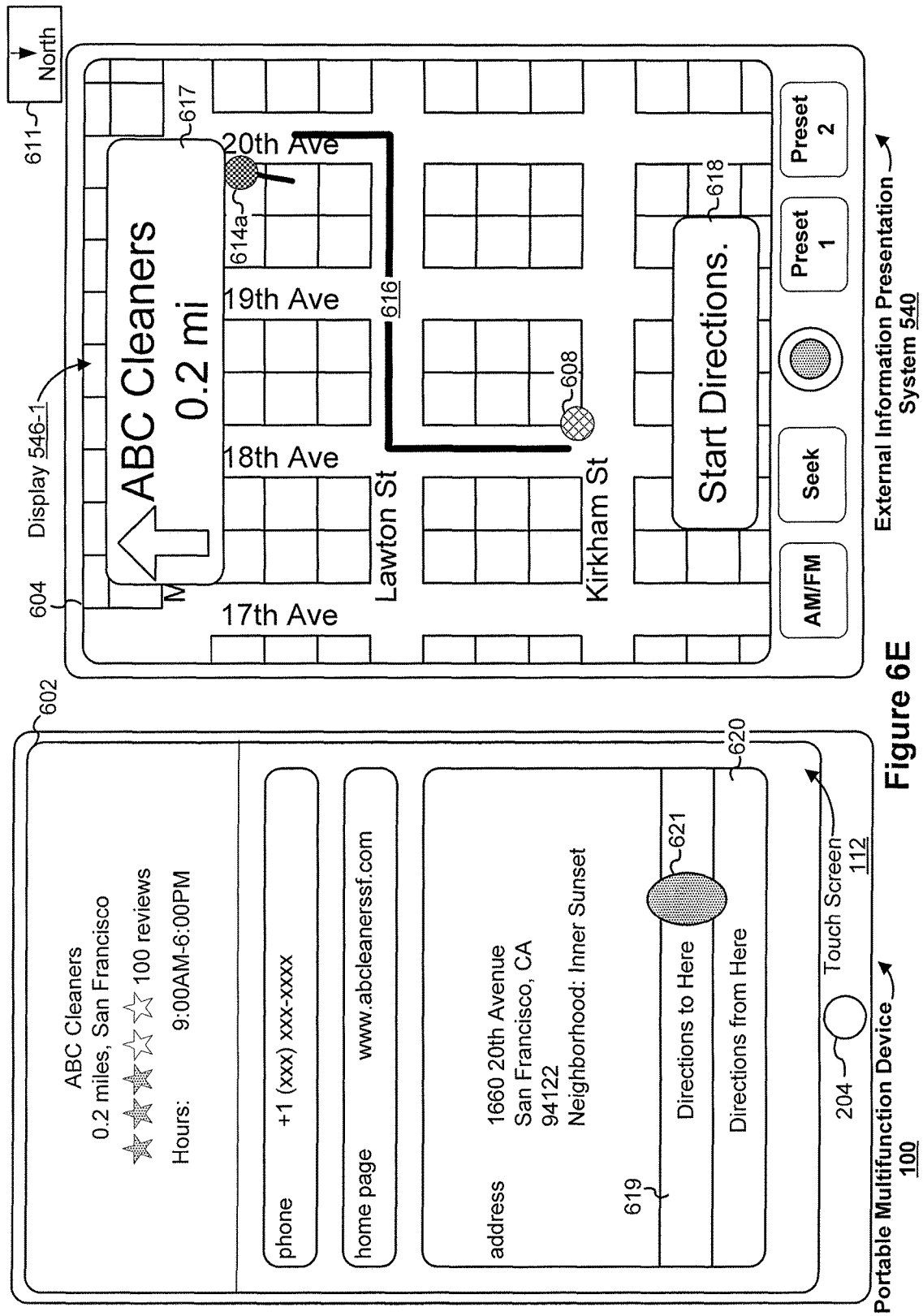

FIG. 6E illustrates displaying additional information corresponding to ABC Cleaners in user interface 602 in response to detecting user touch input 615 over affordance 613a in FIG. 6D. In FIG. 6E, user interface 602 includes information identifying the hours of operation of ABC Cleaners, the home page (or website) for ABC Cleaners, the phone number for ABC Cleaners, and the address for ABC Cleaners. In FIG. 6E, user interface 602 also includes affordance 619 configured to display directions from the device's current location to ABC Cleaners and affordance 620 configured to display directions from ABC Cleaners to the device's current location. FIG. 6E also illustrates detecting user touch input 621 over affordance 619 on touch screen 112. FIG. 6E further illustrates maintaining display of user interface 604 from FIG. 6D on display 546-1.

Figure 6F:
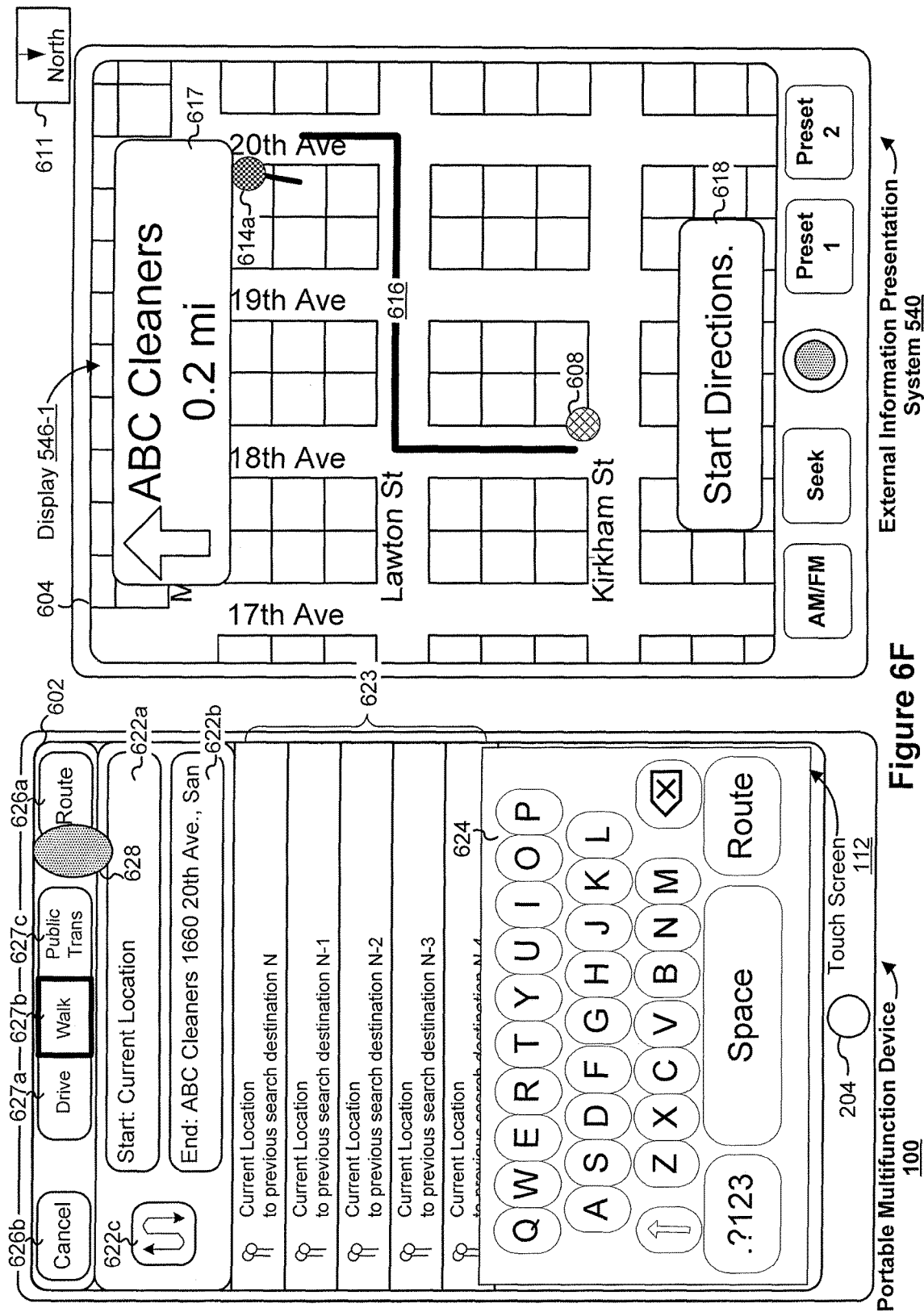

FIG. 6F illustrates displaying an interface in user interface 602 for inputting a start point and an end point for a route in response to detecting user touch input 621 over affordance 619 on touch screen 112 in FIG. 6E. In FIG. 6F, user interface 602 includes the address of the start point of the route in box 622a (e.g., the current location of device 100) and the address of the end point of the route in box 622b (e.g., ABC Cleaners, 1660 40th Avenue, San Francisco, Calif.). In FIG. 6F, box 622a and/or box 622b are enabled to be edited with virtual keyboard 624 displayed in user interface 602 or, alternatively, with a speech input. Affordance 622c, when activated, causes the device to replace the location entered in box 622a with the location in box 622b and to replace the location entered in box 622b with the location in box 622a. In FIG. 6F, user interface 602 includes selectable routes 623 from device 100's current location to previously entered destinations. In FIG. 6F, user interface 602 further includes affordances 627a, 627b, and 627c configured to select different modes of transportation for route calculation. For example, in FIG. 6F, the "walk" mode of transportation is currently selected as shown by the highlighted frame around affordance 627b. FIG. 6F also illustrates displaying a "route" affordance 626a configured to calculate one or more routes from the start point in box 622a to the end point in box 622b and a "cancel" affordance 626b configured to clear the locations entered in boxes 622a and 622b or to redisplay user interface 602 displayed in FIG. 6D. FIG. 6F further illustrates detecting user touch input 628 over "route" affordance 626a on touch screen 112. FIG. 6F further illustrates maintaining display of user interface 604 from FIG. 6D on display 546-1.

Figure 6G:
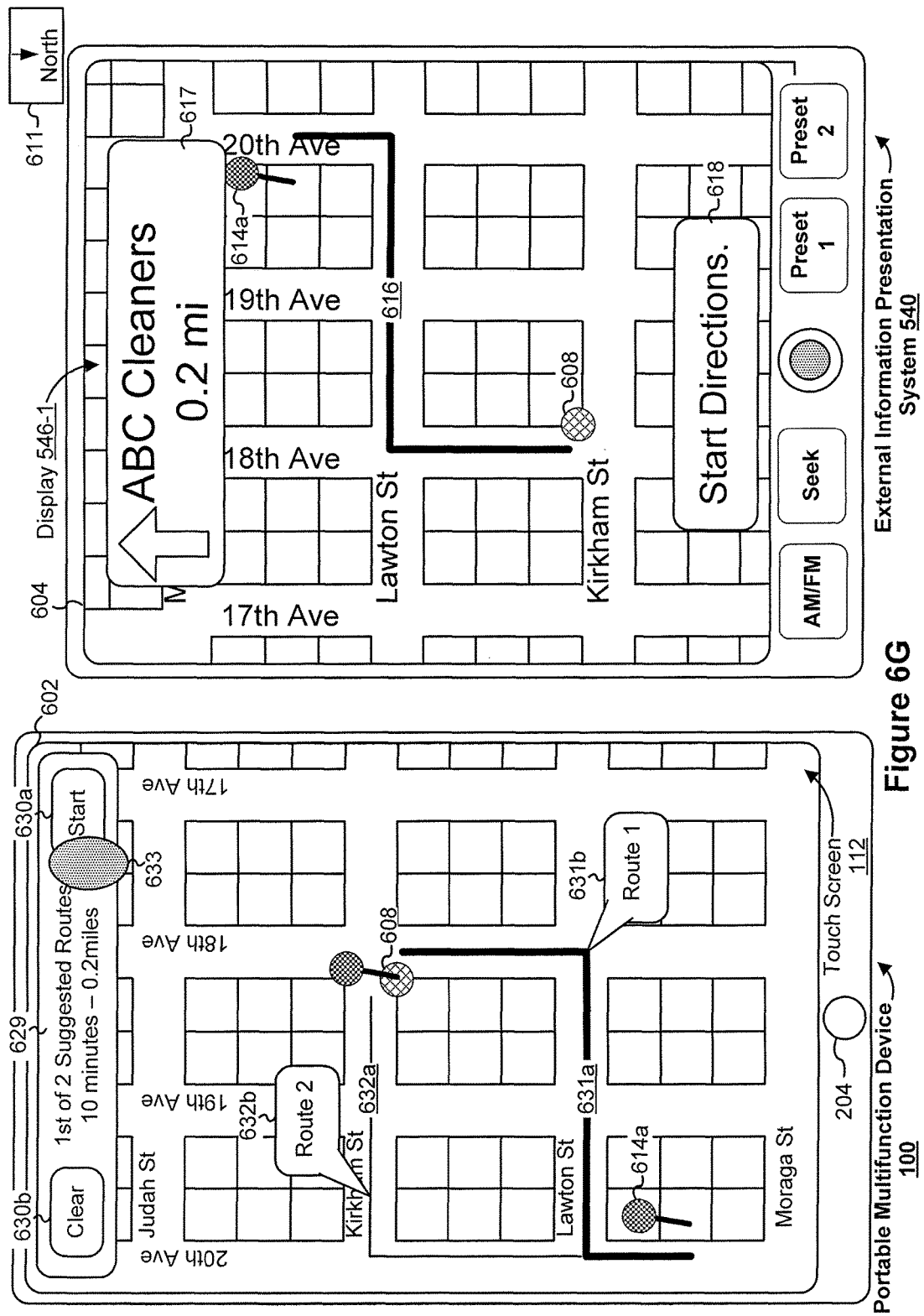

FIG. 6G illustrates displaying two suggested routes from current location 608 of device 100 to the dry cleaner represented by pin 614a in user interface 602 in response to detecting user touch input 628 over "route" affordance 626a on touch screen 112 in FIG. 6F. In FIG. 6G, dialogue box 629 indicates that the currently selected, first of two suggested routes will take 10 minutes and 0.2 miles for the user to walk from the current location 608 of device 100 to the dry cleaner represented by pin 614a. In FIG. 6G, the first route 631a is highlighted in user interface 602, and "route 1" affordance 631b, when activated, causes the device to select (and highlight) route 631a. In FIG. 6G, route 631a displayed in user interface 602 is the same as route 616 displayed in user interface 604 but in a different orientation. FIG. 6G also illustrates displaying route 632a in user interface 602 and "route 2" affordance 632b configured to select (and highlight) route 632a. In FIG. 6G, "start" affordance 630a, when activated, causes the device to start turn-by-turn directions to the currently selected (or highlighted) route (e.g., route 631a), and "clear" affordance 630b, when activated, causes the device to clear the displayed routes (e.g., routes 631a and 632a) from user interface 602 and to display search box 609 in user interface 602. FIG. 6G further illustrates detecting user touch input 633 over "start" affordance 630a on touch screen 112. FIG. 6G further illustrates maintaining display of user interface 604 from FIG. 6D on display 546-1. In some embodiments, when device 100 is connected to display 546-1 and display 546-1 is a vehicle display, device 100 displays driving directions rather than walking directions on both touch screen 112 and on display 546-1.

Figure 6H:
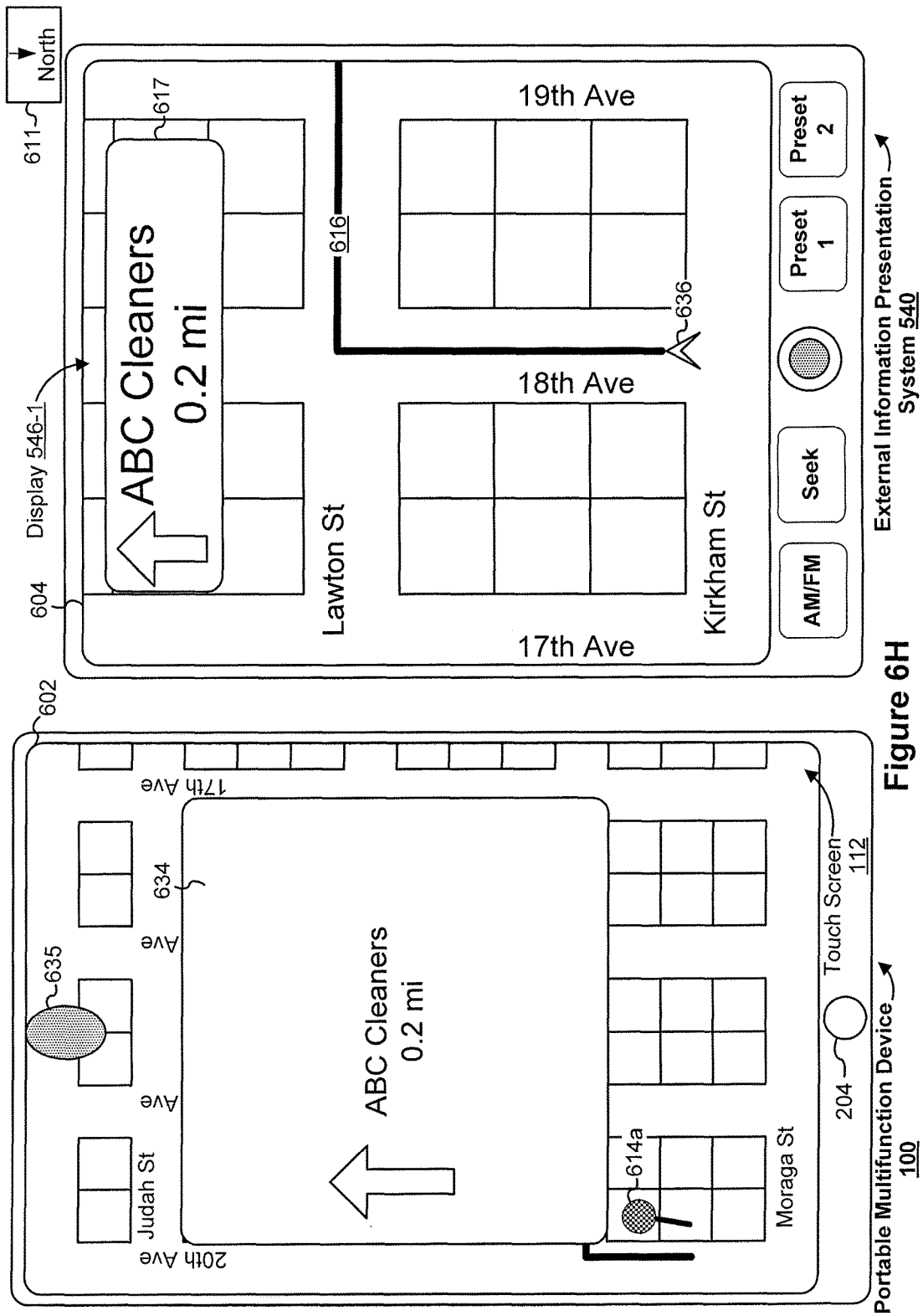

FIG. 6H illustrates displaying turn-by-turn directions box 634 indicating the user's first direction (or turn) on route 631a and the name of the destination (e.g., ABC Cleaners) in user interface 602 in response to detecting user touch input 633 over "start" affordance 630a in FIG. 6G. In some embodiments, turn-by-turn directions box 634 occupies the entirety of touch screen 112. FIG. 6H also illustrates detecting user touch input 635 on touch screen 112.

FIG. 6H further illustrates displaying a turn-by-turn direction mode in user interface 604 in response to device 100 detecting user touch input 633 over start affordance 630a in FIG. 6G. In FIG. 6H, while in the turn-by-turn mode, the current location of device 100 is displayed as marker 636 in user interface 604. In some embodiments, the turn-by-turn direction mode displayed in FIG. 6H is further zoomed into the map displayed in user interface 604 in comparison to the map displayed in FIGS. 6D-6G (e.g., the map displayed on touch screen 112 is at a lower magnification level than the map displayed on display 546-1).

Figure 6I:
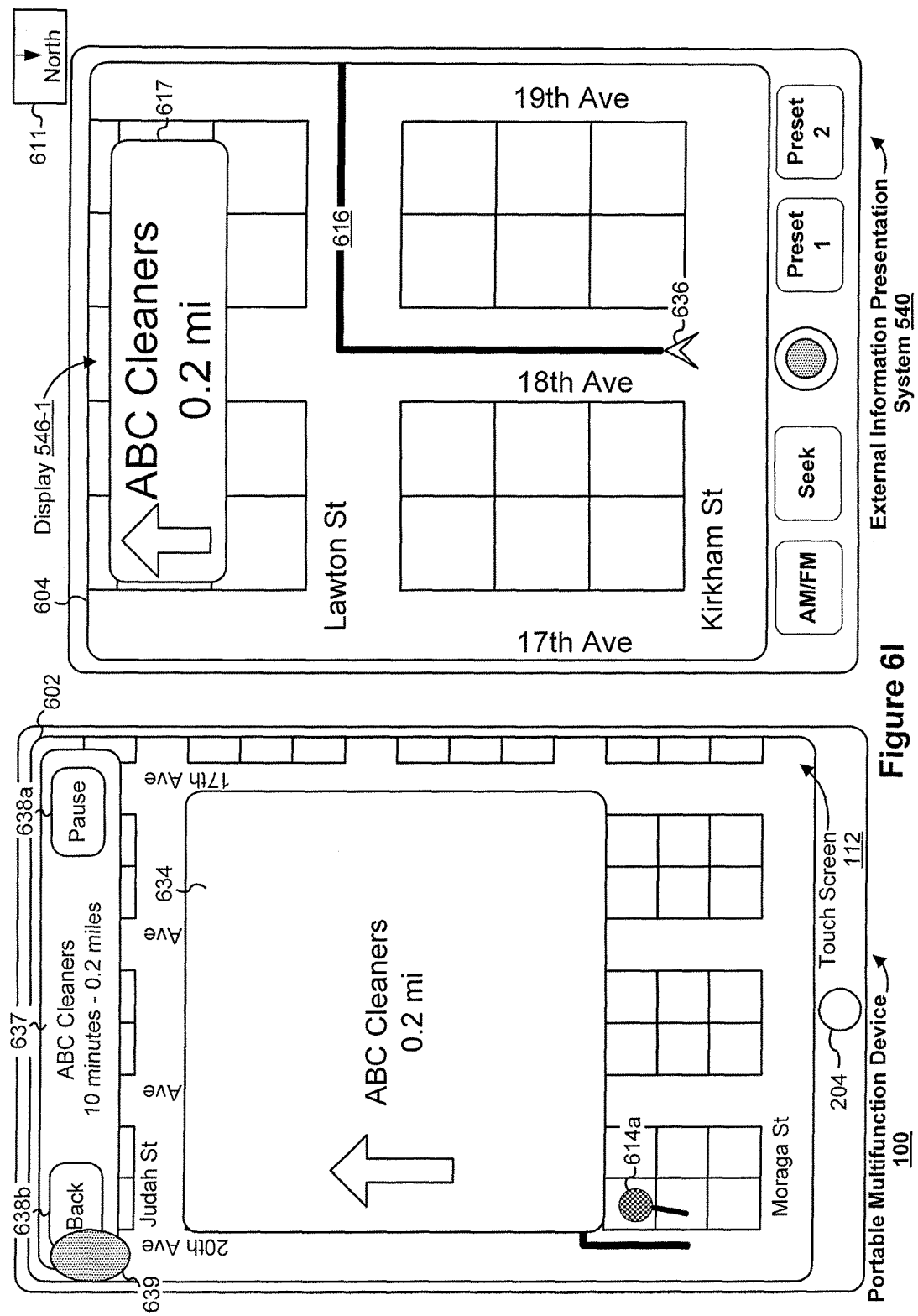

FIG. 6I illustrates displaying dialogue box 637 in user interface 602 in response to detecting user touch input 635 on touch screen 112 in FIG. 6H. In FIG. 6I, dialogue box 637 includes "pause" affordance 638a configured to pause turn-by-turn directions and "back" affordance 638b configured to display the results from the most recent search query (e.g., dry cleaners nearby device 100's current location) within maps application 436. FIG. 6I also illustrates detecting user touch input 639 over "back" affordance 638b. FIG. 6I further illustrates maintaining display of user interface 604 from FIG. 6H on display 546-1.

Figure 6J:
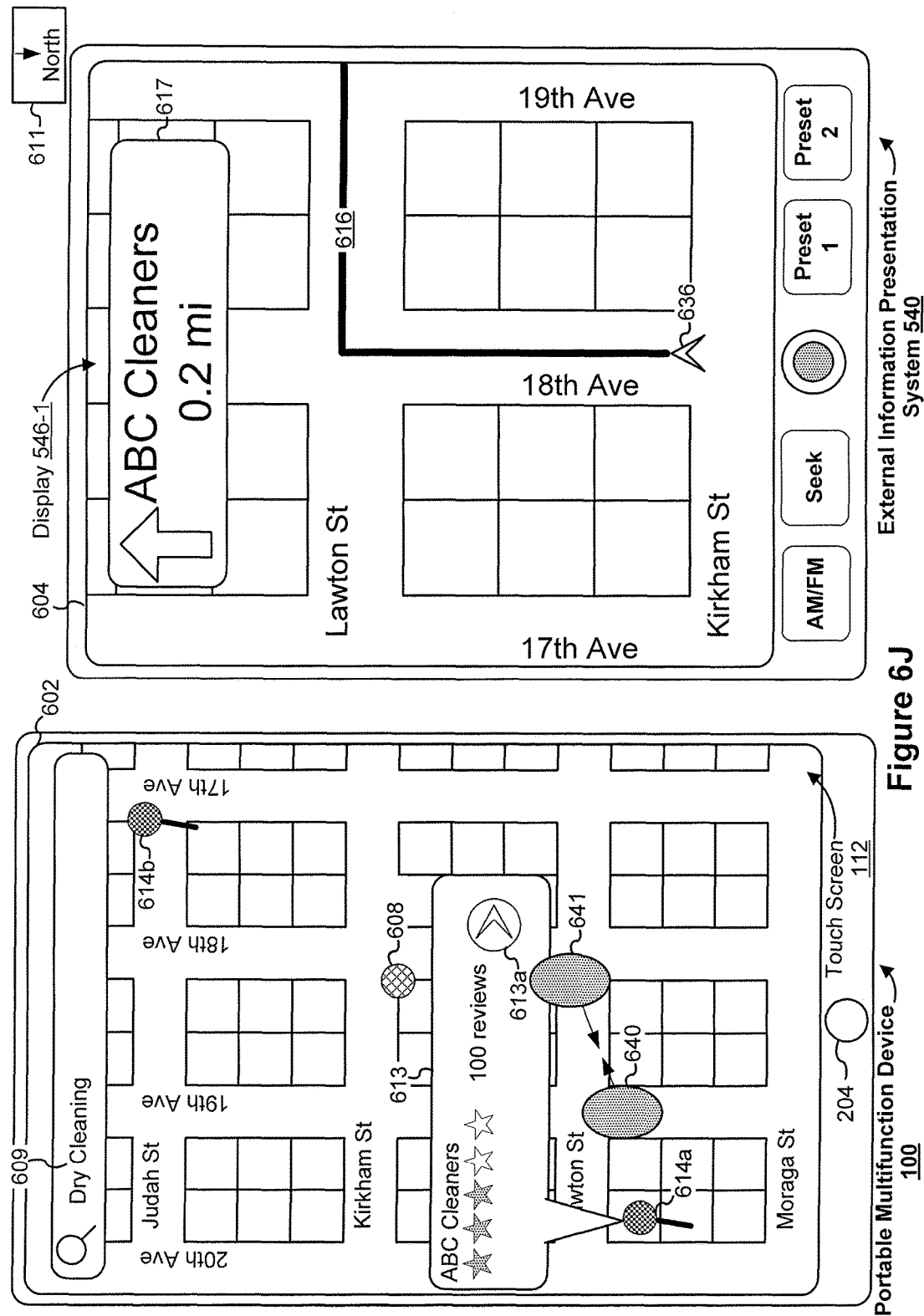

FIG. 6J illustrates displaying user interface objects (e.g., pins) associated with the dry cleaners represented by pins 614a and 614b nearby current location 608 of device 100 in user interface 602 (e.g., corresponding to the most recent search query in maps application 436 from FIG. 6C) in response to user touch input 639 (e.g., a tap input) over "back" affordance 638b in FIG. 6I. FIG. 6J also illustrates detecting a pinch gesture that includes movement of contacts 640 and 641 on touch screen 112. FIG. 6J further illustrates maintaining display of user interface 604 from FIG. 6H on display 546-1.

FIG. 6K illustrates displaying user interface objects (e.g., pins) associated with the dry cleaners represented by pins 614a, 614b, 614c, and 614d nearby current location 608 of device 100 in user interface 602 in response to detecting the pinch gesture in FIG. 6J. For example, in FIG. 6K, the map is zoomed out (e.g., displayed at a lower magnification level) in response to the pinch gesture, and a larger area of the map is displayed in user interface 602. FIG. 6K also illustrates detecting a swipe gesture (sometimes herein also called a "drag gesture") with user touch input 642 moving from position 642a to position 642b on touch screen 112. FIG. 6K further illustrates maintaining display of user interface 604 from FIG. 6H on display 546-1 (e.g., user interface 604 is not zoomed out in response to detecting the pinch gesture on touch screen display 112).

Figure 6L:
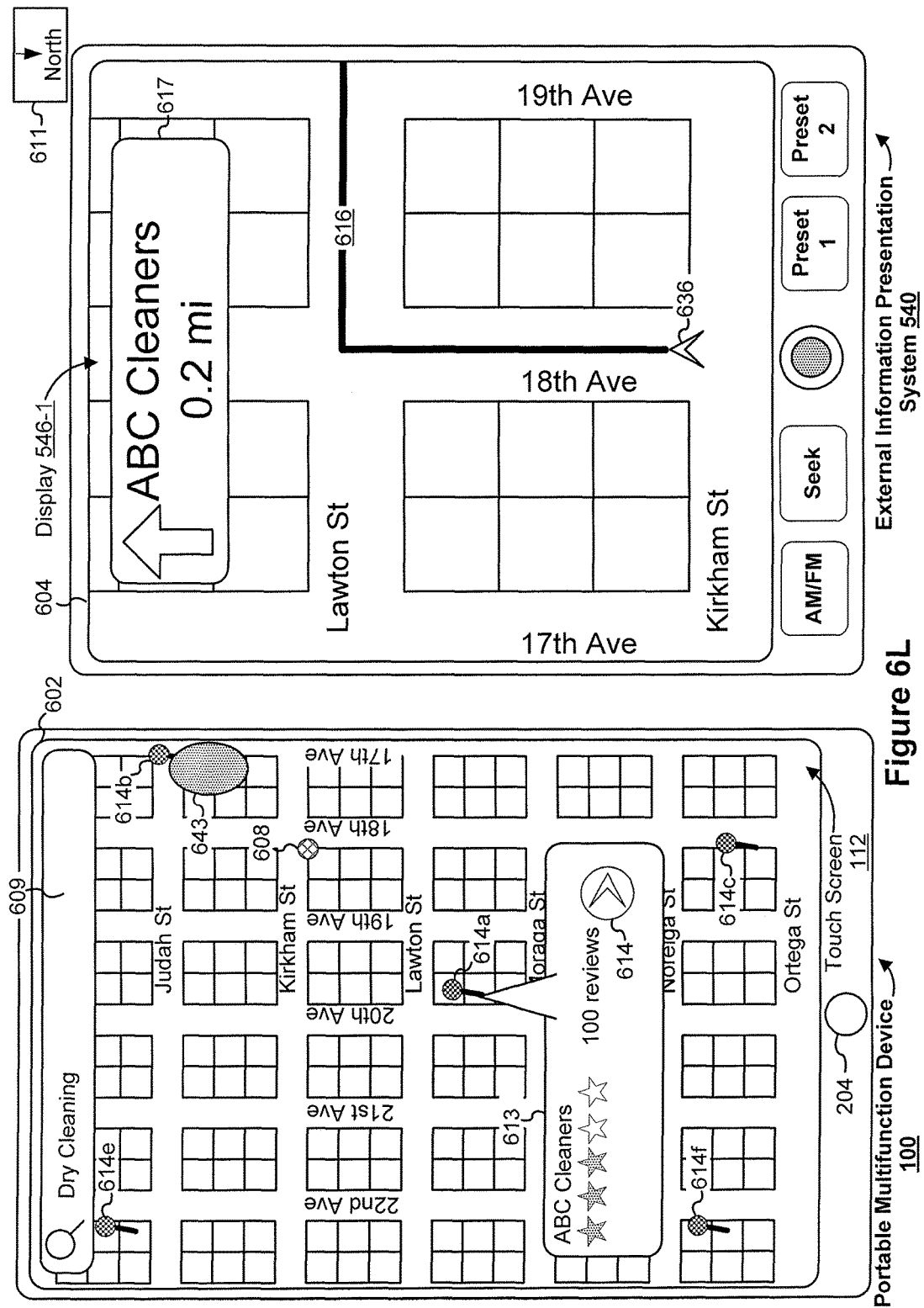

FIG. 6L illustrates displaying user interface objects (e.g., pins) associated with the dry cleaners represented by pins 614a, 614b, 614c, 614e and 614f nearby current location 608 of device 100 in user interface 602 in response to detecting the swipe gesture in FIG. 6K. For example, the map is translated in a north-eastward direction in response to the swipe gesture in FIG. 6K. FIG. 6L also illustrates detecting user touch input 643 over the user interface object (e.g., the pin) associated with the dry cleaners represented by pins 614b on touch screen 112. FIG. 6L further illustrates maintaining display of user interface 604 from FIG. 6H on display 546-1 (e.g., user interface 604 is not scrolled in response to detecting the swipe gesture on touch screen display 112).

Figure 6M:
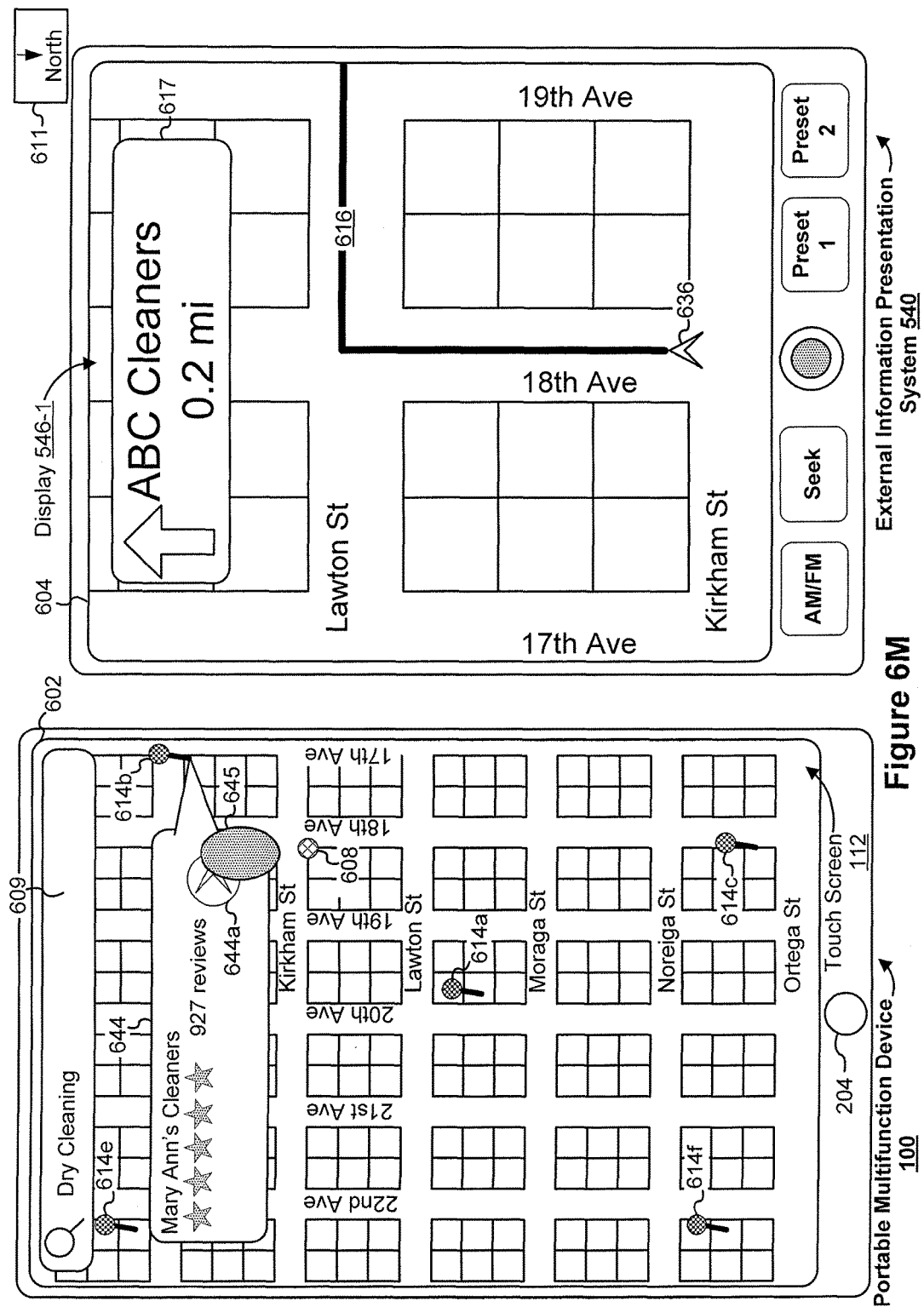

FIG. 6M illustrates displaying information box 644 corresponding to the dry cleaner represented by pin 614b in user interface 602 in response to detecting user touch input 643 over the user interface object (e.g., the pin) associated with the dry cleaners represented by pins 614b in FIG. 6L. In FIG. 6M, information box 644 includes the dry cleaning establishment's name (e.g., Mary Ann's Cleaners), the rating of the establishment (e.g., 5 out of 5 stars), the amount of user reviews for the establishment (e.g., 927 reviews), and affordance 644a optionally includes additional information corresponding to the establishment. FIG. 6M also illustrates detecting user touch input 645 over affordance 644a on touch screen 112. FIG. 6M further illustrates maintaining display of user interface 604 from FIG. 6H on display 546-1.

Figure 6N:
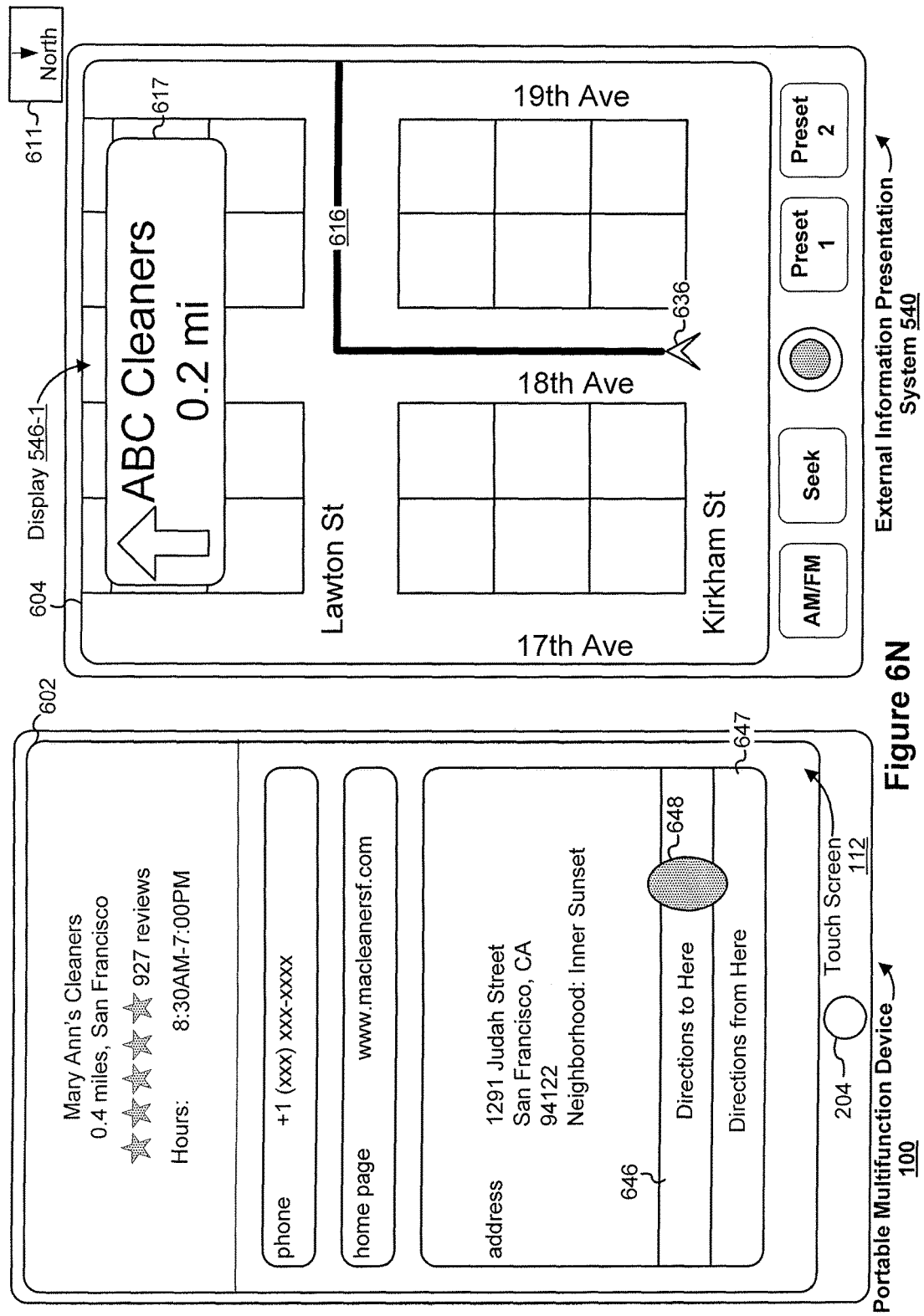

FIG. 6N illustrates displaying additional information corresponding to Mary Ann's Cleaners in user interface 602 in response to detecting user touch input 645 over affordance 644a in FIG. 6M. In FIG. 6N, user interface 602 includes information identifying the hours of operation of Mary Ann's Cleaners, the home page (or website) for Mary Ann's Cleaners, the phone number for Mary Ann's Cleaners, and the address for Mary Ann's Cleaners. In FIG. 6N, user interface 602 also includes affordance 646 configured to display directions from the device's current location to Mary Ann's Cleaners and affordance 647 configured to display directions from Mary Ann's Cleaners to the device's current location. FIG. 6N also illustrates detecting user touch input 648 over affordance 646 on touch screen 112. FIG. 6N further illustrates maintaining display of user interface 604 from FIG. 6H on display 546-1.

Figure 6O:
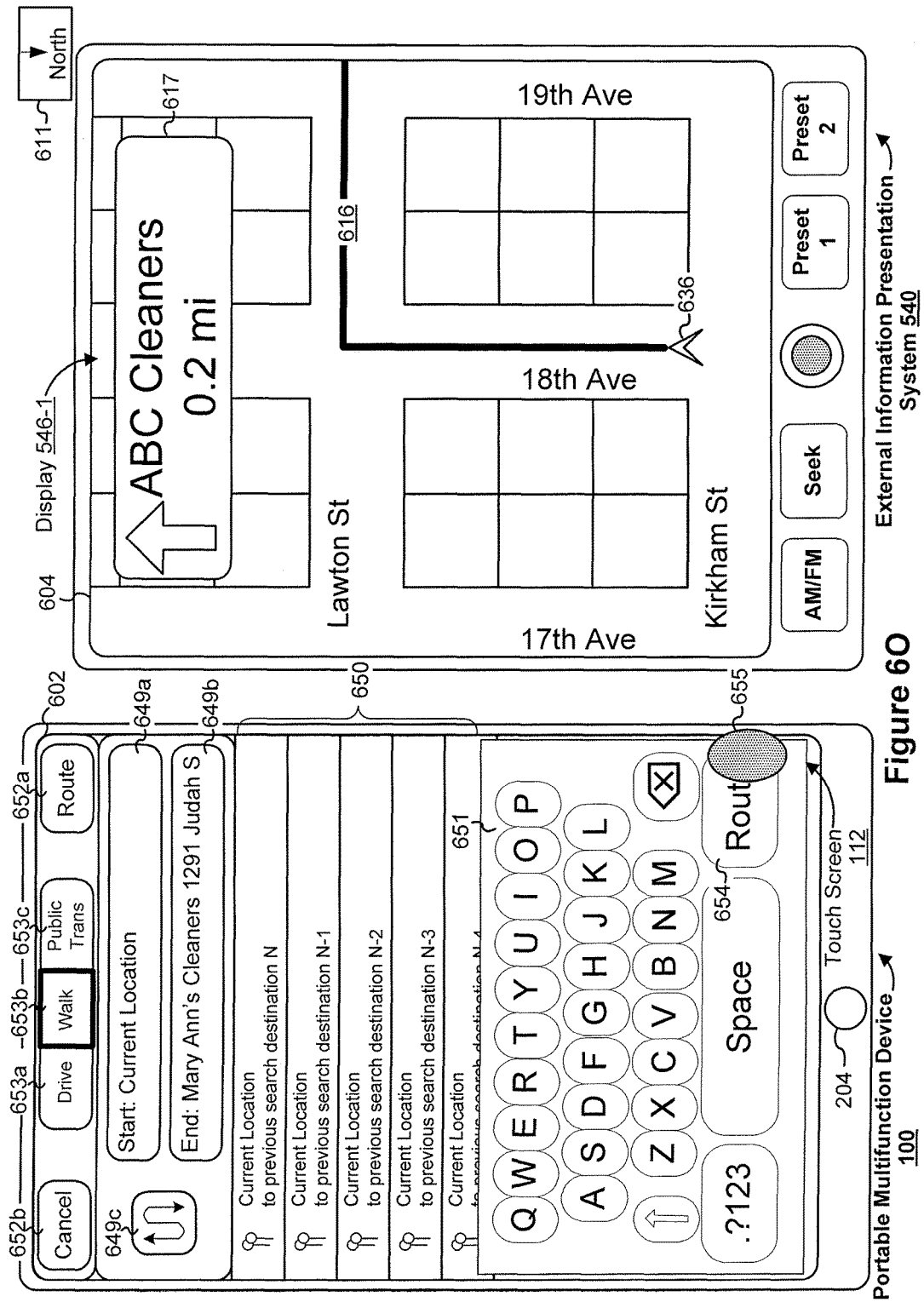

FIG. 6O illustrates displaying an interface in user interface 602 for inputting a start point and an end point for a route in response to detecting user touch input 648 over affordance 646 on touch screen 112 in FIG. 6N. In FIG. 6O, user interface 602 includes the address of the start point of the route in box 649a (e.g., the current location of device 100) and the address of the end point of the route in box 649b (e.g., Mary Ann's Cleaners, 1291 Judah Street, San Francisco, Calif.). In FIG. 6O, box 649a and/or box 649b are enabled to be edited with virtual keyboard 651 displayed in user interface 602 or, alternatively, with a speech input. Affordance 649c, when activated, causes the device to replace the location entered in box 649a with the location in box 649b and to replace the location entered in box 649b with the location in box 649a. In FIG. 6O, user interface 602 includes selectable routes 650 from the device's current location to previously entered destinations. In FIG. 6O, user interface 602 further includes affordances 653a, 653b, and 653c configured to select different modes of transportation for route calculation. For example, in FIG. 6O, the "walk" mode of transportation is currently selected as shown by the highlighted frame around affordance 653b. FIG. 6O also illustrates displaying a "route" affordance 652a configured to calculate one or more routes from the start point in box 649a to the end point in box 649b and a "cancel" affordance 652b configured to clear the locations entered in boxes 649a and 649b or to redisplay user interface 602 displayed in FIG. 6M. FIG. 6O further illustrates detecting user touch input 655 over "route" affordance 654 (e.g., an affordance included in virtual keyboard 651) on touch screen 112. In some embodiments, "route" affordance 654, when activated, causes the device to calculate and/or display one or more routes from the start point in box 649a to the end point in box 649b (e.g., "route" affordance 654 functions similarly to "route" affordance 652a). FIG. 6O further illustrates maintaining display of user interface 604 from FIG. 6H on display 546-1.

Figure 6P:
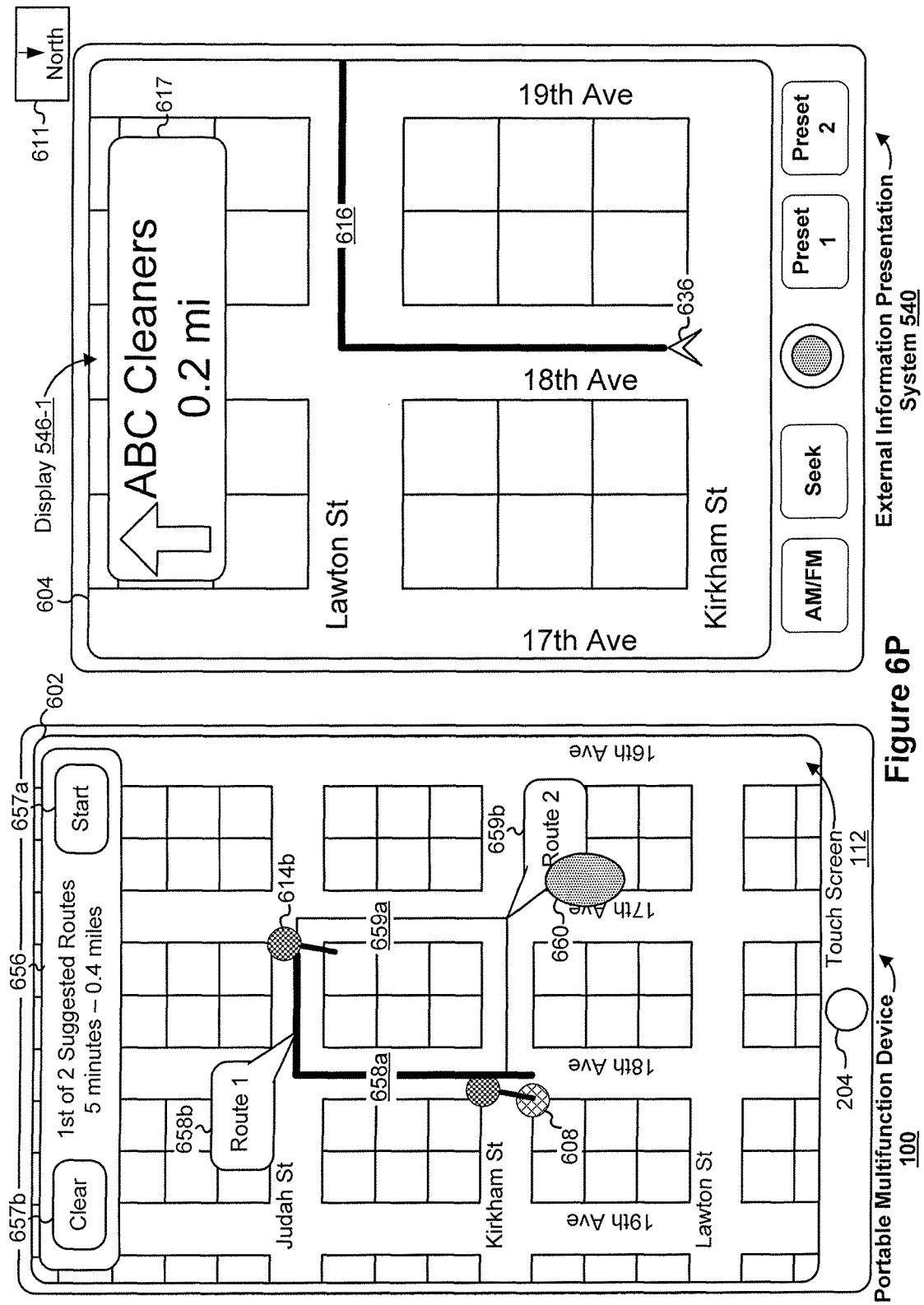

FIG. 6P illustrates displaying two suggested routes from current location 608 of device 100 to the dry cleaner represented by pin 614b in user interface 602 in response to detecting user touch input 655 over "route" affordance 654 on touch screen 112 in FIG. 6O. In FIG. 6P, user interface 602 dialogue box 656 indicating that the automatically selected, first of two suggested routes will take 5 minutes and 0.4 miles for the user to walk from current location 608 of device 100 to the dry cleaner represented by pin 614b. In FIG. 6P, the first route 658a is highlighted in user interface 602, and "route 1" affordance 658b, when activated, causes the device to select (and highlight) route 658b. In FIG. 6P, "start" affordance 657a, when activated, causes the device to start turn-by-turn directions to the currently selected (or highlighted) route (e.g., route 658a), and "clear" affordance 657b, when activated, causes the device to clear the displayed routes (e.g., routes 658a and 659a) from user interface 602 and to display search box 609 in user interface 602. FIG. 6P further illustrates detecting user touch input 660 over "route 2" affordance 659b on touch screen 112. FIG. 6P further illustrates maintaining display of user interface 604 from FIG. 6H on display 546-1.

Figure 6Q:
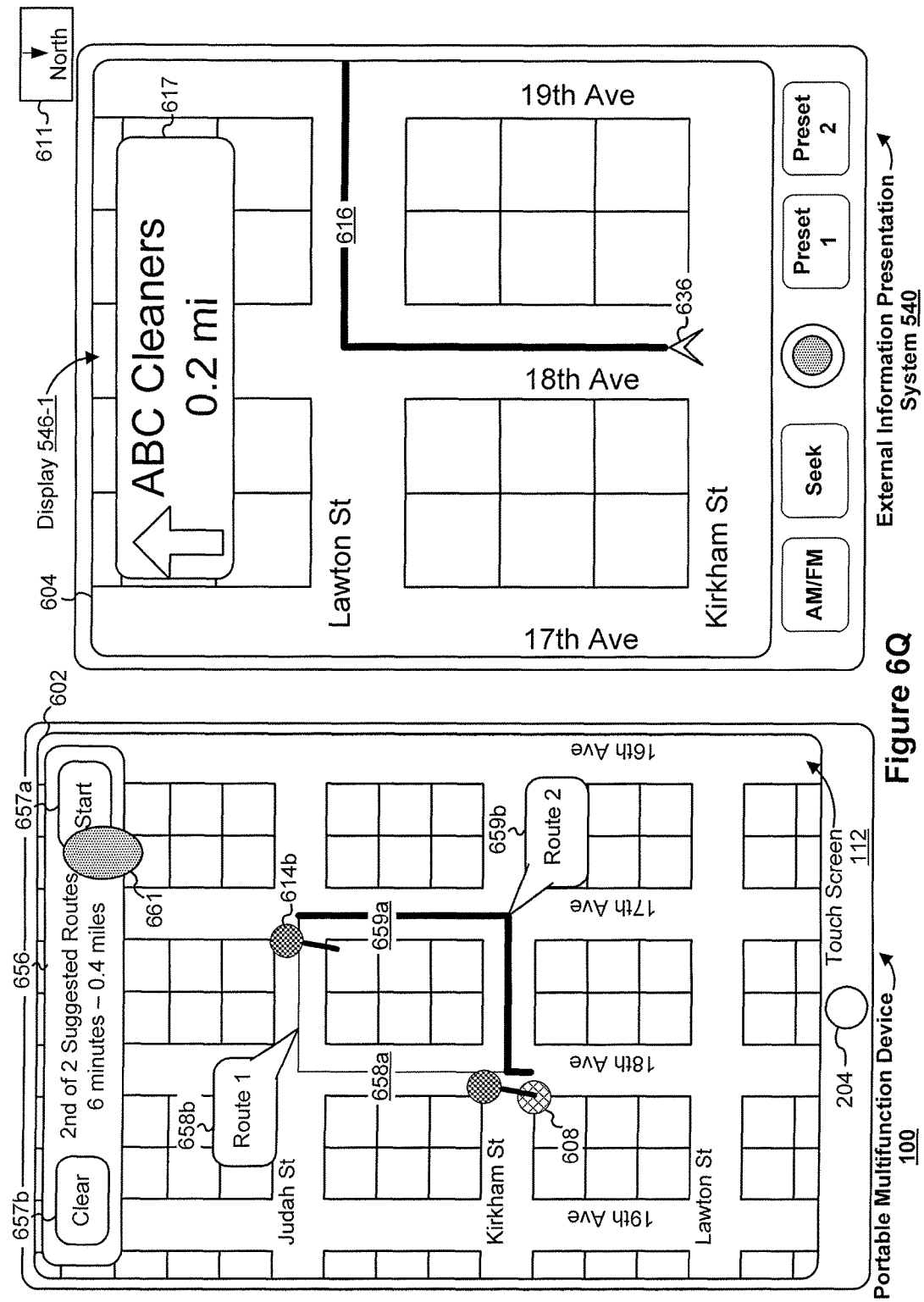

FIG. 6Q illustrates displaying route 659a (route 2) as the selected (or highlighted) route in response to detecting touch input 660 over "route 2" affordance 659b in FIG. 6P. In FIG. 6Q, user interface 602 includes dialogue box 656 indicating that the second of the two suggested routes will take 6 minutes and 0.4 miles for the user to walk from current location 608 of device 100 to the dry cleaner represented by pin 614b. FIG. 6Q further illustrates detecting user touch input 661 over "start" affordance 657a on touch screen 112. FIG. 6Q further illustrates maintaining display of user interface 604 from FIG. 6H on display 546-1.

Figure 6R:
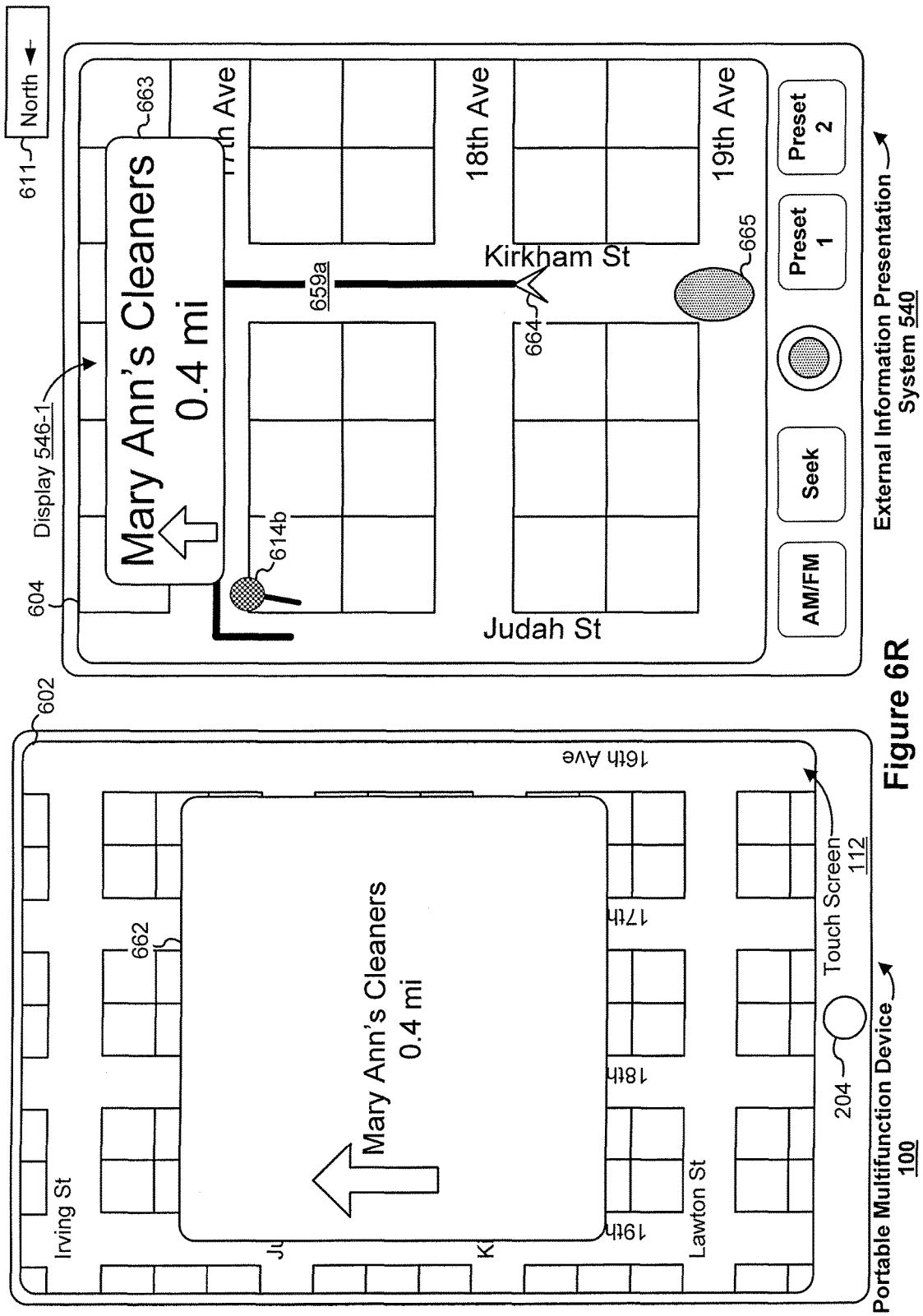

FIG. 6R illustrates displaying turn-by-turn directions box 662 indicating the user's first direction (or turn) on route 659a and the name of the destination (e.g., Mary Ann's Cleaners) in user interface 602 in response to detecting user touch input 661 over "start" affordance 657a in FIG. 6Q. In some embodiments, turn-by-turn directions box 662 occupies the entirety of touch screen 112.

FIG. 6R further illustrates displaying a turn-by-turn direction mode in user interface 604 in response to detecting user touch input 661 over "start" affordance 657a in FIG. 6Q (e.g., even though user interface 604 was not previously synchronized with user interface 602 in response to prior inputs, when a destination and route are selected and turn-by-turn directions commence, the device synchronizes user interface 602 and user interface 604 so that both user interfaces show directions to the same destination using the same route). In FIG. 6R, user interface 604 includes route 659a, turn-by-turn directions box 663 indicating the user's first direction (or turn) on route 659a and the name of the destination (e.g., Mary Ann's Cleaners), and marker 654 indicating the current location of device 100. FIG. 6R also illustrates compass 611 indicating the orientation of the map displayed in user interface 604 (e.g., the map is oriented with the top of display 546-1 being east). FIG. 6R further illustrates detecting user touch input 665 on display 546-1.

Figure 6S:
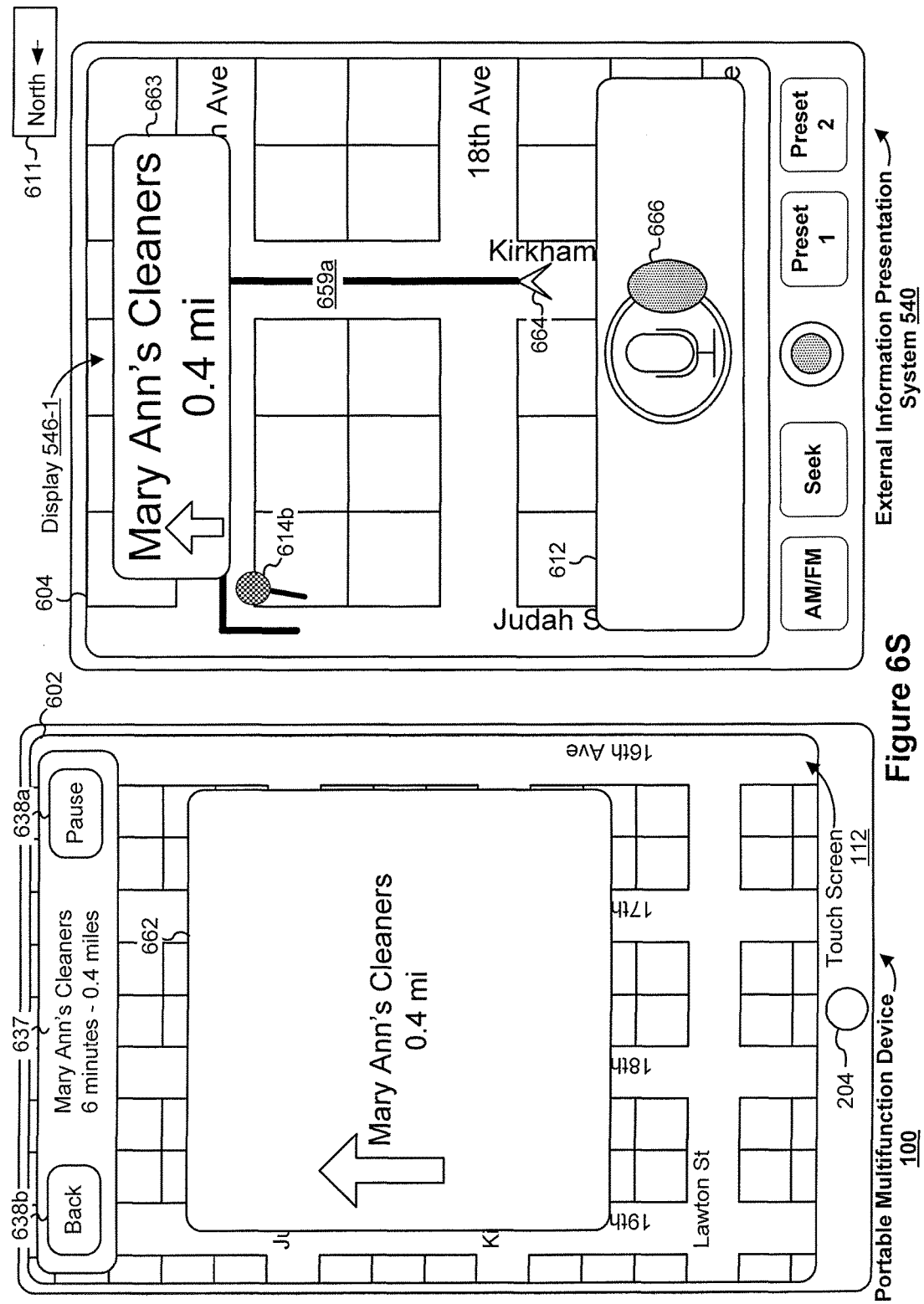

FIG. 6S illustrates displaying dialogue box 637 in user interface 602 in response to detecting user touch input 665 on display 546-1 in FIG. 6R. In FIG. 6S, dialogue box 637 includes "pause" affordance 638a configured to pause turn-by-turn directions and "back" affordance 638b configured to display the results from the most recent search query (e.g., dry cleaners nearby device 100's current location) within maps application 436.

FIG. 6S further illustrates displaying affordance 612 in user interface 604 in response to detecting user touch input 665 on display 546-1 in FIG. 6R. Affordance 612, when activated, causes the device to invoke a digital assistant (e.g., Siri from Apple Inc. of Cupertino, Calif.). FIG. 6S also illustrates detecting user touch input 666 over affordance 612 on display 546-1. In response to detecting user touch input 666 over affordance 612, a digital assistant is invoked, and the digital assistant audibly prompts the user asking, "What may I help you with?" In response to the prompt, the user audibly, for example, asks the digital assistant, "Show me nearby coffee houses." Alternatively, in some embodiments, the digital assistant is invoked by a predetermined audible command (e.g., "Hey, Siri").

Figure 6T:
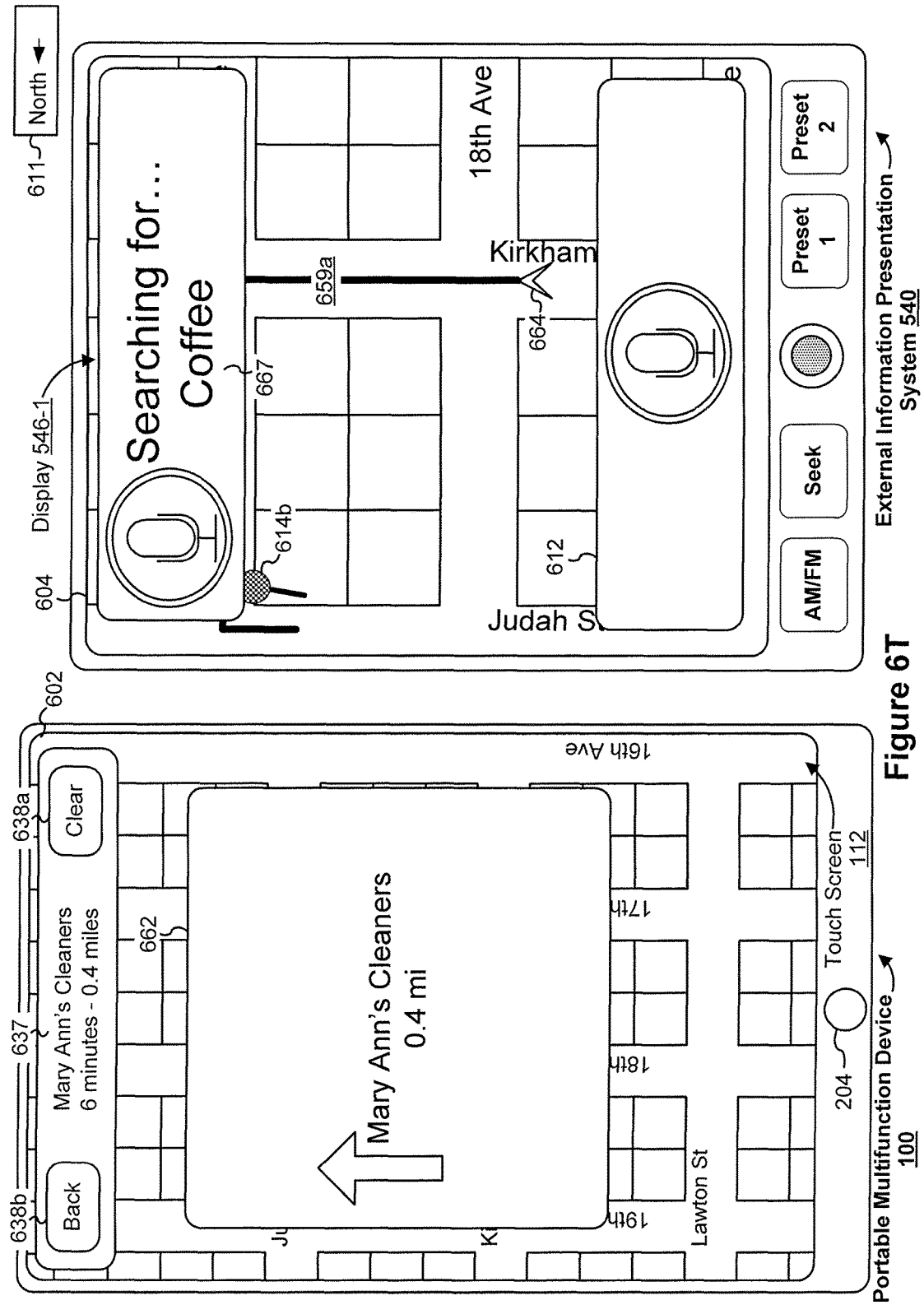

FIG. 6T illustrates maintaining display of user interface 602 from FIG. 6S on touch screen 112. FIG. 6T further illustrates displaying digital assistant dialogue box 667 in user interface 604. digital assistant dialogue box 667 indicates that the digital assistant is searching for coffee houses in response to the user's audible request (e.g., "Show me nearby coffee houses.").

Figure 6U:
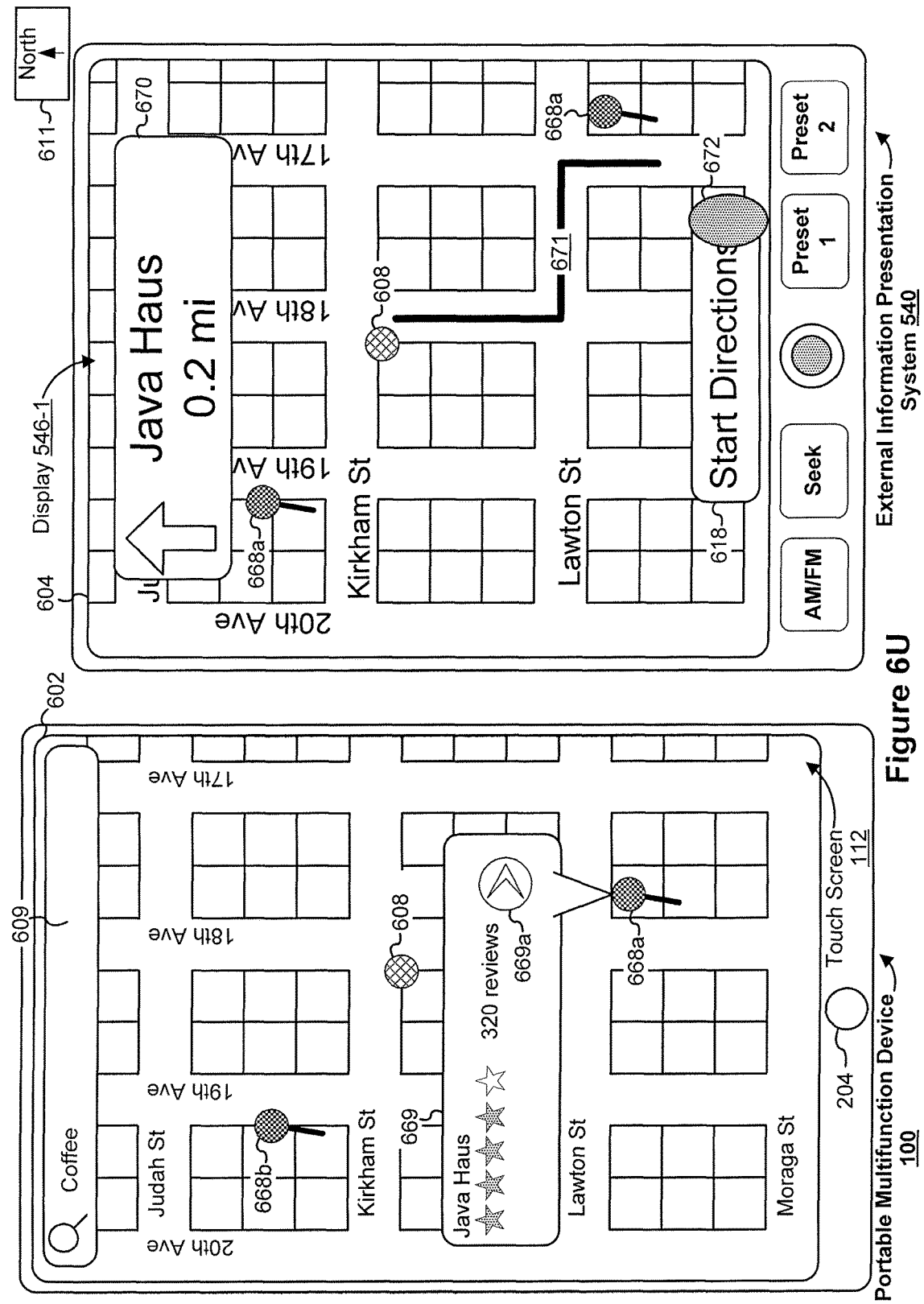
Figure 6V:
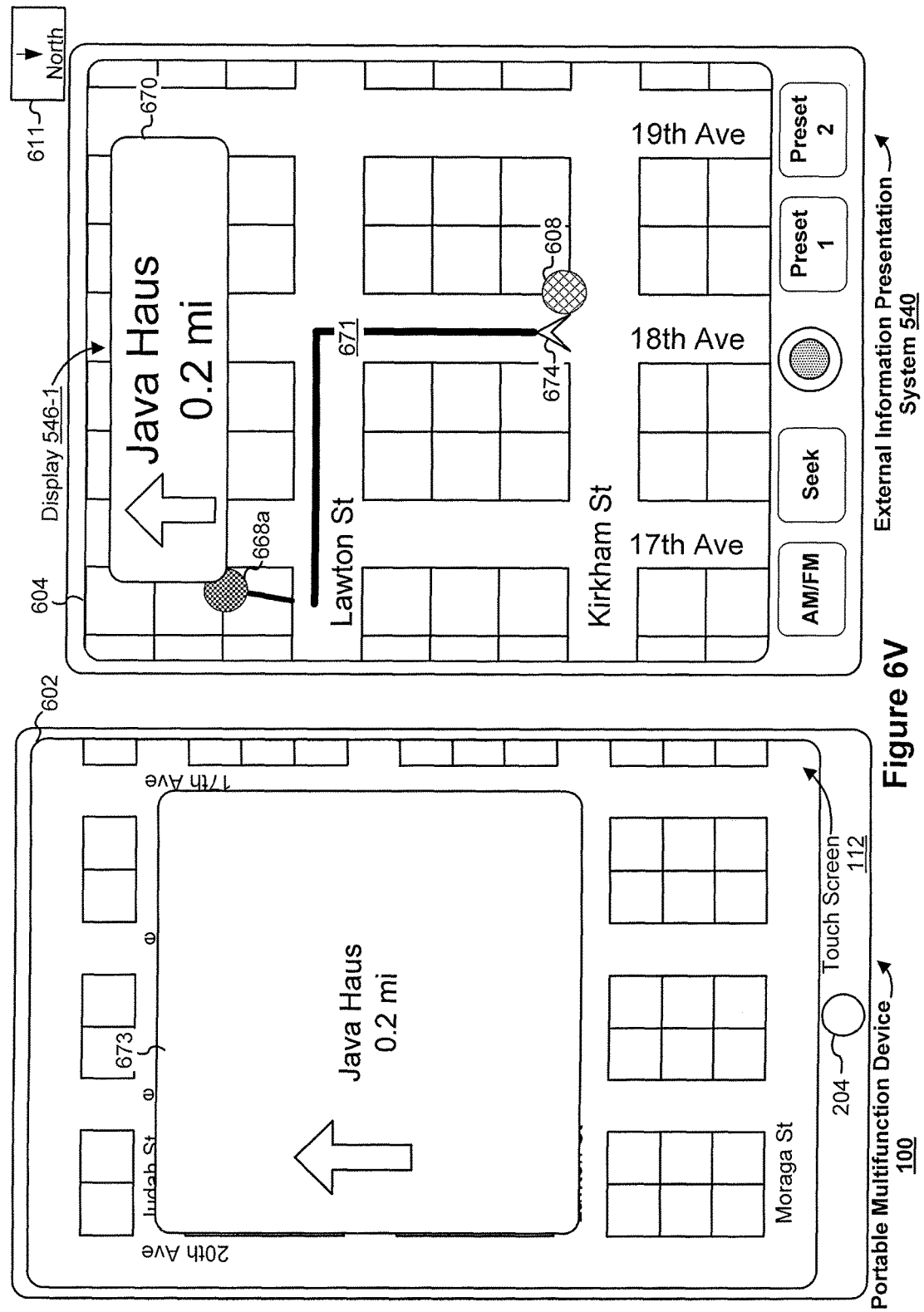

FIG. 6U illustrates displaying user interface objects (e.g., pins) associated with coffee houses 668a and 668b nearby current location 608 of device 100 in user interface 602 in response to the user's audible request (e.g., "Show me nearby coffee houses."). In some embodiments, a search result (or establishment) matching the audible request is automatically selected (e.g., Java Haus) based on proximity, the establishment's ratings, the amount of reviews, the amount of times the user has frequented the establishment, and/or other factors. In FIG. 6U, information box 669 corresponding to automatically selected coffee house 668a is also displayed in user interface 602. Information box 669 includes the coffee house's name (e.g., Java Haus), the rating of the establishment (e.g., 4 out of 5 stars), the amount of user reviews for the establishment (e.g., 320 reviews), and affordance 669a configured to display additional information corresponding to the establishment. Providing additional information in user interface 602 enables a passenger of a vehicle who is operating device 100 to provide additional information to a driver of the vehicle and/or select a destination based on the additional information provided in user interface 602.

FIG. 6U further illustrates displaying suggested route 671 from the current location 608 of device 100 to coffee house 668a (e.g., Java Haus) in user interface 604 in response to the user's audible request (e.g., "Show me nearby coffee houses."). In some embodiments, a route for the automatically selected search result is displayed in user interface 604. In FIG. 6U, user interface 604 includes route 671, turn-by-turn directions box 670 indicating the user's first direction (or turn) on route 671 and the name of the destination (e.g., Java Haus), and "start directions" affordance 618 configured to initiate a turn-by-turn mode. FIG. 6U also illustrates compass 611 indicating the orientation of the map displayed in user interface 604 (e.g., the map is oriented with the top of display 546-1 being north). FIG. 6U further illustrates detecting user touch input 672 over "start directions" affordance 618 on display 546-1.

FIG. 6V illustrates displaying turn-by-turn directions box 673 indicating the user's first direction (or turn) on route 671 and the name of the destination (e.g., Java Haus) in user interface 602 in response to detecting user touch input 672 over "start directions" affordance 662 on display 546-1 in FIG. 6U. In some embodiments, turn-by-turn directions box 673 occupies the entirety of touch screen 112.

FIG. 6V further illustrates displaying a turn-by-turn direction mode in user interface 604 in response detecting user touch input 672 over "start directions" affordance 662 on display 546-1 in FIG. 6U. In FIG. 6V, while in the turn-by-turn mode, the current location of device 100 is displayed as marker 674 in user interface 604. In some embodiments, the turn-by-turn direction mode displayed in FIG. 6V is further zoomed into the map displayed in user interface 604 in comparison to the map displayed in FIG. 6U.

Figure 6W:
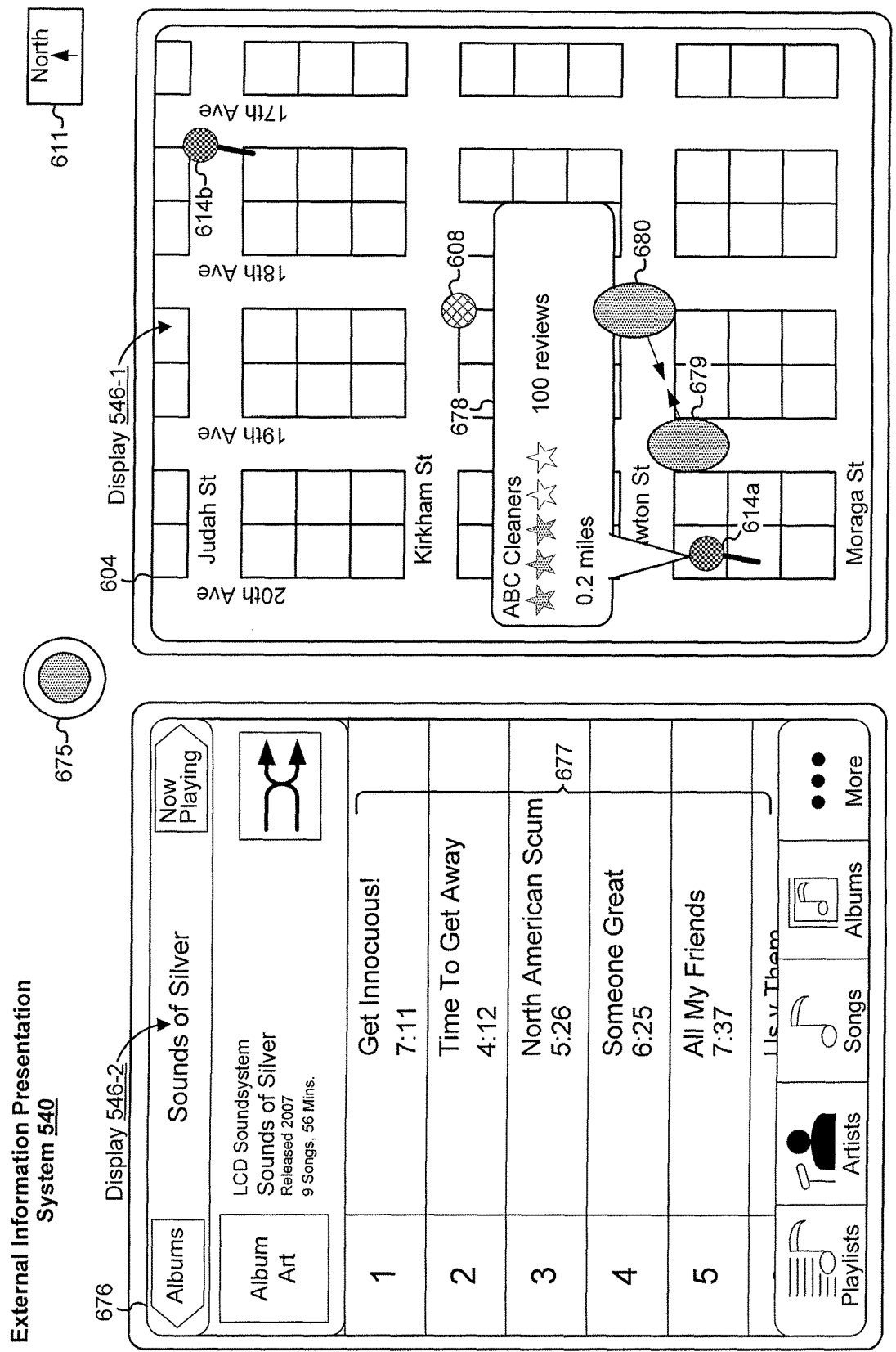

FIGS. 6W-6FF illustrate exemplary user interfaces for sending update information to an affected display in accordance with some embodiments. The user interfaces in these figures are used to illustrate the processes described below, including the processes in FIGS. 9A-9C.

FIG. 6W illustrates two displays included in an external information presentation system 540 (sometimes herein also called "system 540") that is communicatively coupled to portable multifunction device 100 (sometimes herein also called "device 100") in accordance with some embodiments. In some embodiments, external information presentation system 540 is an entertainment and/or navigation system that is implemented in a vehicle. In some embodiments, display 546-1 is associated with a first external information presentation system 540-1, and display 546-2 is associated with a second external information presentation system 540-2. In some embodiments, display 546-1 is a primary display (e.g., a dashboard or vehicle navigation display), and display 546-2 is an auxiliary display (e.g., a rear-seat or entertainment display). In some embodiments, display 546-1 and display 546-2 are touch-sensitive displays with touch-sensitive surfaces on the displays and are configured to receive one or more touch inputs. FIG. 6W also illustrates jog dial 675 (e.g., a depressible and/or rotatable mechanical knob or dial) associated with system 540 configured to control one or both of display 546-1 and display 546-2.

FIG. 6W illustrates displaying user interface objects (e.g., pins) associated with the dry cleaners represented by pins 614a and 614b nearby current location 608 of device 100 in a map/navigation application in user interface 604 of display 546-1. For example, the pins are displayed in user interface 604 in response a search query (e.g., "dry cleaning" input into search box 609 in user interface 602 of device 100 in FIG. 6C). In some embodiments, a search result (or establishment) matching the user's search query is automatically selected (e.g., ABC Cleaners) based on proximity, the establishment's ratings, the amount of reviews, the amount of times the user has frequented the establishment, and other factors. In FIG. 6W, destination information 678 corresponding to automatically selected the dry cleaner represented by pin 614a is also displayed in user interface 604. Destination information 678 includes the dry cleaning establishment's name (e.g., ABC Cleaners), the rating of the establishment (e.g., 3 out of 5 stars), the amount of user reviews for the establishment (e.g., 100 reviews), and the mileage from current location 608 of device 100 to the establishment. In some embodiments, turn-by-turn directions to the currently selected search result (e.g., the dry cleaner represented by pin 614a) are displayed in user interface 604 in response to a touch input anywhere inside of the dialogue box associated with destination information 678 corresponding to dry cleaner 514a. In some other embodiments, turn-by-turn directions to the currently selected search result (e.g., the dry cleaner represented by pin 614a) are displayed in user interface 604 in response to depression of jog dial 675. FIG. 6W also illustrates compass 611 indicating the orientation of the map displayed in user interface 604 (e.g., the map is oriented with the top of display 546-1 being north).

FIG. 6W illustrates detecting a pinch gesture with user touch inputs 679 and 680 on display 546-1. In response to detecting user touch inputs 679 and 680 (or the pinch gesture), display 546-1 (or system 540) sends input information indicative of user touch inputs 679 and 680 (or the pinch gesture) to device 100. The input information includes an identifier associated with the touch-sensitive surface of display 546-1 (e.g., a unique identifier associated with the touch-sensitive surface of display 546-1) and input description information describing user touch inputs 679 and 680 (or the pinch gesture). In some embodiments, input description information includes raw data describing user touch inputs 679 and 680 such as the location of user touch inputs 679 and 680, the magnitude of the movement of user touch inputs 679 and 680, the length of time that user touch inputs 679 and 680 were detected, the surface area of user touch inputs 679 and 680, and/or other information describing user touch inputs 679 and 680. In some other embodiments, input description information includes data describing the pinch gesture such as the type of gesture performed, the location of the gesture, the magnitude of the movement of the gesture, and/or other information describing the gesture.

In response to receiving the input information associated with user touch inputs 679 and 680 (or the pinch gesture), device 100 determines that the identifier included in the input information is associated with display 546-1 (e.g., associating the touch event (or the gesture) with the touch-sensitive surface of display 546-1) based on an input-source to display mapping. After determining that the touch event detected in FIG. 6W is associated with display 546-1 (e.g., the affected display), device 100 also determines the display state of display 546-1 shown in FIG. 6W (e.g., user interface 604 is in a search results or destination selection mode). In some embodiments, device 100 determines the display state of a display based on information included in the input information. In some other embodiments, device 100 determines the display state of a display by querying system 540 for such information.

FIG. 6W further illustrates displaying a list of songs 677 corresponding to an album in a media player application in user interface 676 of display 546-2.

Figure 6X:
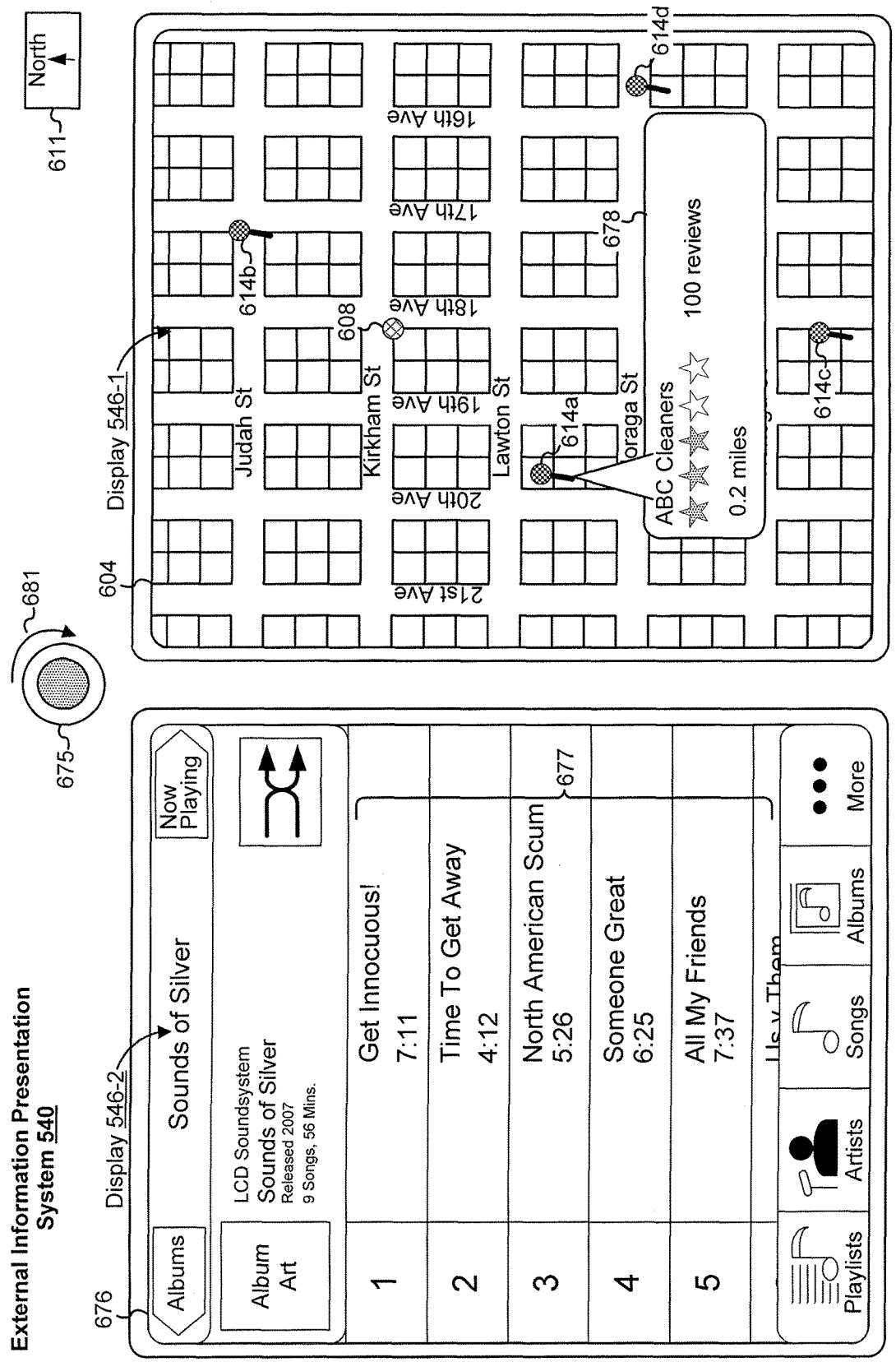

FIG. 6X illustrates displaying user interface objects (e.g., pins) associated with the dry cleaners represented by pins 614a, 614b, 614c, and 614d nearby current location 608 of device 100 in user interface 604 of display 546-1. For example, the map displayed in user interface 604 in FIG. 6X is a zoomed out version of the map displayed in user interface 604 in FIG. 6W. Display 546-1 displays a zoomed out map in user interface 604 in FIG. 6X in response to receiving update information from device 100 including an updated user interface corresponding to the pinch gesture detected on display 546-1 in FIG. 6W and the display state of user interface 604 in FIG. 6W (e.g., the search results or destination selection mode).

FIG. 6X also illustrates detecting turn 681 (e.g., an approximately 90 degree clockwise turn) of jog dial 675. In response to detecting turn 681, jog dial 675 (or system 540) sends input information indicative of turn 681 to device 100. The input information includes an identifier associated with jog dial 675 (e.g., a unique identifier associated with jog dial 675) and input description information describing turn 681. For example, the input description information includes raw data describing turn 681 such as the magnitude (90 degrees) and direction (clockwise) of the turn. In response to receiving the input information associated with turn 681, device 100 determines that the identifier included in the input information is associated with display 546-1 (e.g., associating the turn event with jog dial 675 which is currently mapped to display 546-1) based on the input-source to display mapping. After determining that the turn event detected in FIG. 6X is associated with display 546-1, device 100 also determines the display state of display 546-1 shown in FIG. 6X (e.g., user interface 604 is in a search results or destination selection mode). FIG. 6X further illustrates maintaining display of the list of songs 677 in user interface 676 from FIG. 6W on display 546-2 (e.g., user interface 676 is not updated in response to rotation of jog dial 675 when jog dial 675 is not associated with the display on which user interface 676 is displayed).

Figure 6Y:
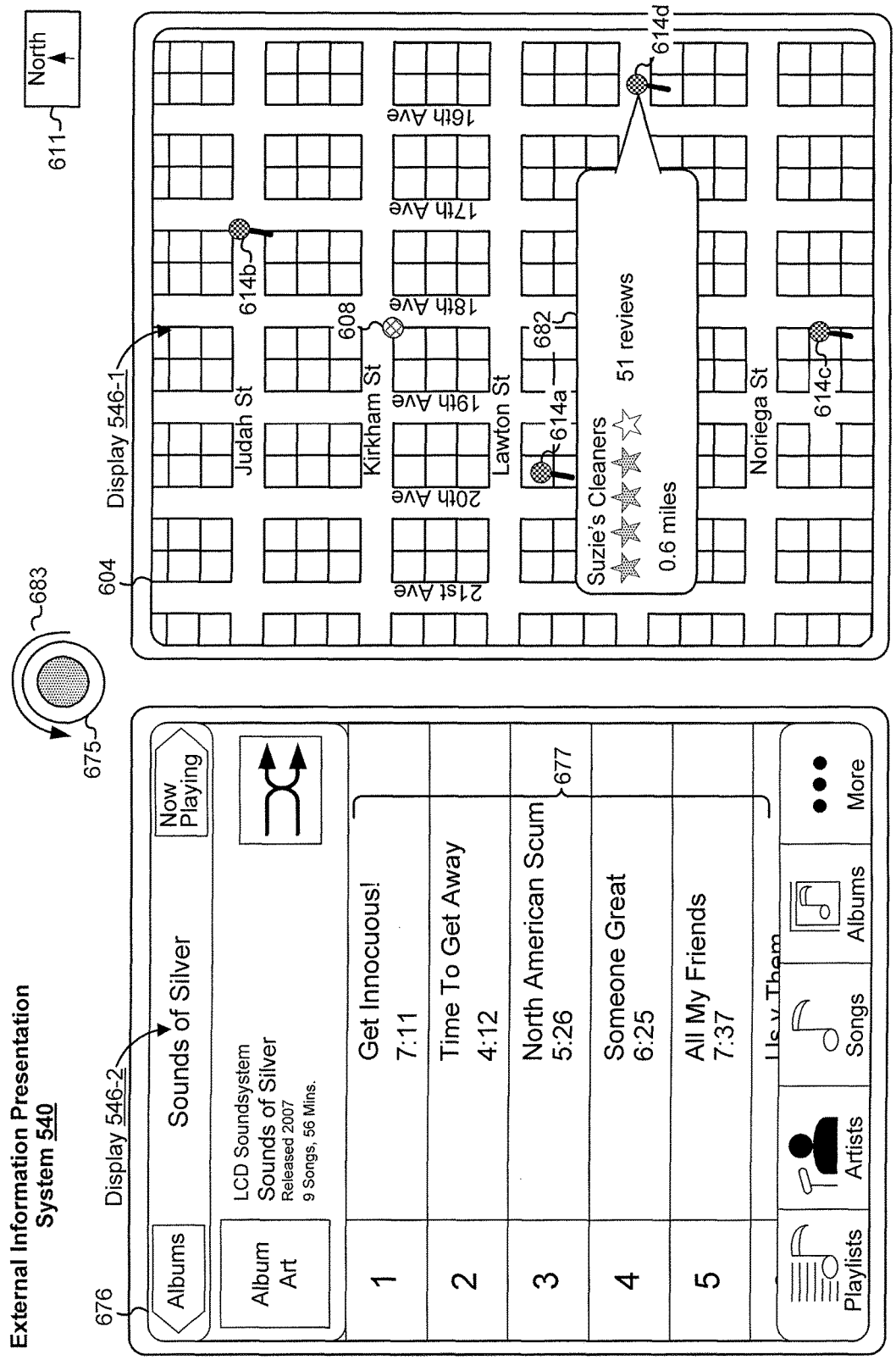

FIG. 6Y illustrates displaying destination information 682 corresponding to selected the dry cleaner represented by pin 614d in user interface 604 of display 546-1. In FIG. 6Y, display 546-1 displays destination information 682 corresponding to selected the dry cleaner represented by pin 614d (e.g., Suzie's Cleaners) in response to receiving update information from device 100 including an updated user interface corresponding to turn 681 detected by jog dial 675 in FIG. 6X and the display state of user interface 604 in FIG. 6X (e.g., the search results or destination selection mode). In some embodiments, the destination information (and hence the selected destination) is scrolled in accordance with the direction and magnitude of the turn of jog dial 675. For example, when search results or a destination selection mode is displayed, a 90 degree turn of jog dial 675 selects a next search result, a clockwise turn scrolls the search results north-to-south, and a counter-clockwise turn scrolls the search results south-to-north. In FIG. 6Y, in response to detecting turn 681 (e.g., a 90 degree clockwise turn) of jog dial 675 in FIG. 6X, the dry cleaner represented by pin 614d is selected (or scrolled to) and destination information 682 corresponding to the dry cleaner represented by pin 614d (e.g., the next dry cleaner south of the dry cleaner represented by pin 614a displayed in FIG. 6X) is displayed in user interface 604.

FIG. 6Y also illustrates detecting turn 683 (e.g., an approximately 180 degree counter-clockwise turn) of jog dial 675. In some embodiments, in response to detecting turn 683, jog dial 675 (or system 540) sends input information indicative of turn 683 to device 100. The input information includes an identifier associated with jog dial 675 (e.g., a unique identifier associated with jog dial 675) and input description information describing turn 683. For example, the input description information includes raw data describing turn 683 such as the magnitude (180 degrees) and direction (counter-clockwise) of the turn. In response to receiving the input information associated with turn 683, device 100 determines that the identifier included in the input information is associated with display 546-1 (e.g., associating the turn event with jog dial 675 which is currently mapped to display 546-1) based on the input-source to display mapping. After determining that the turn event detected in FIG. 6Y is associated with display 546-1, device 100 also determines the display state of display 546-1 shown in FIG. 6Y (e.g., user interface 604 is in a search results or destination selection mode). FIG. 6Y further illustrates maintaining display of the list of songs 677 in user interface 676 from FIG. 6W on display 546-2.

Figure 6Z:
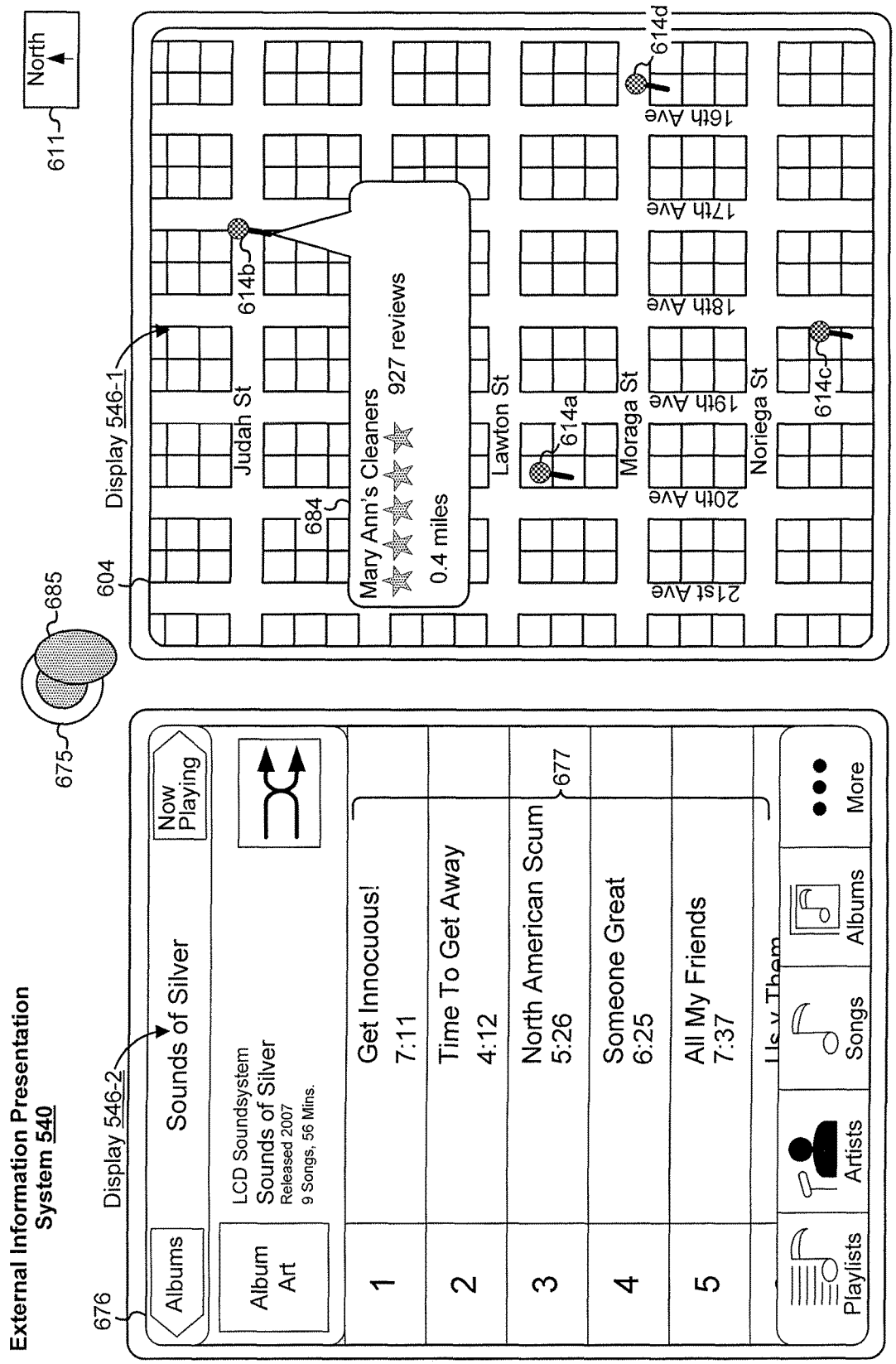
Figure 6A:
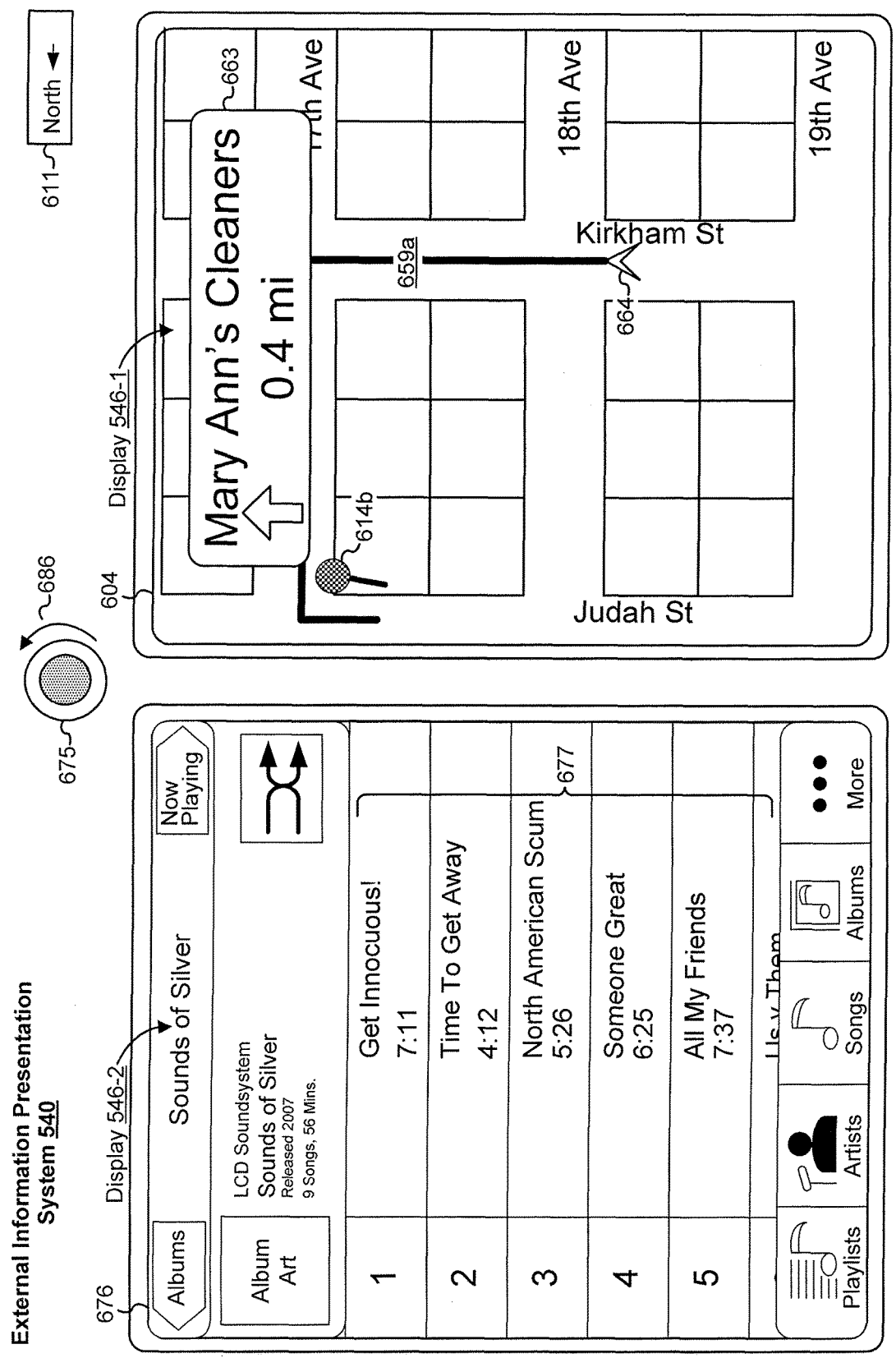
Figure 6B:
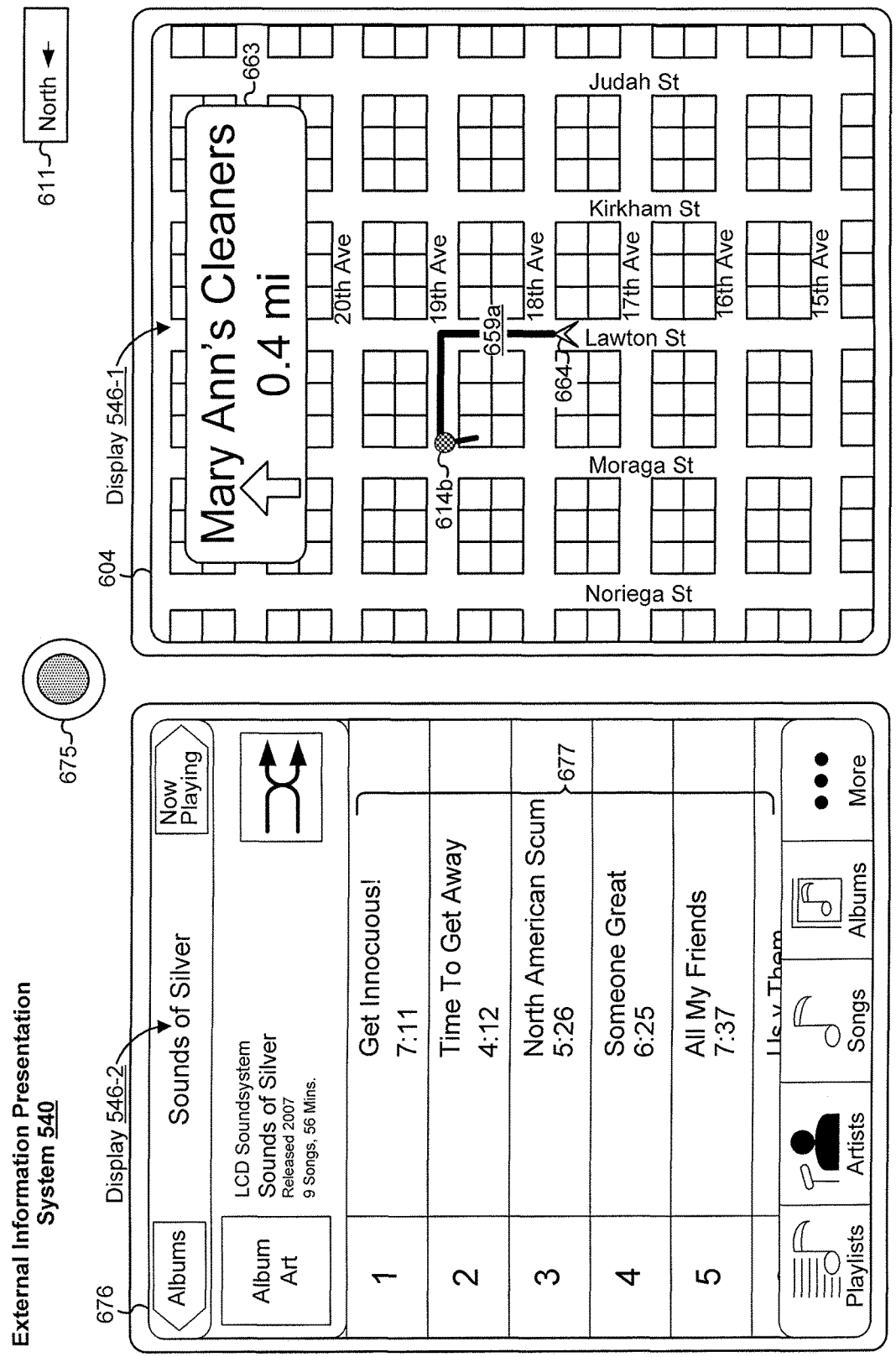
Figure 6C:
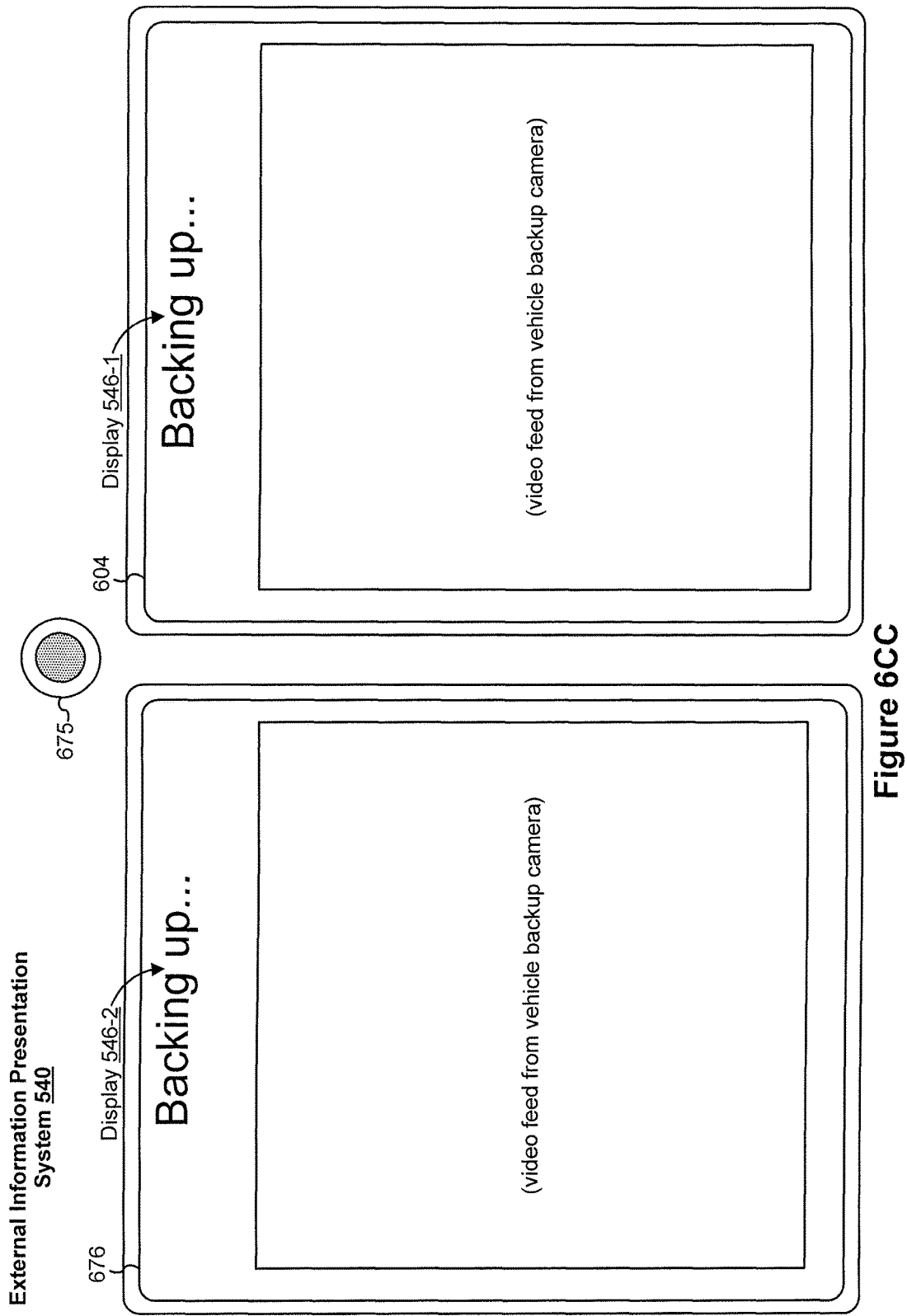
Figure 6D:
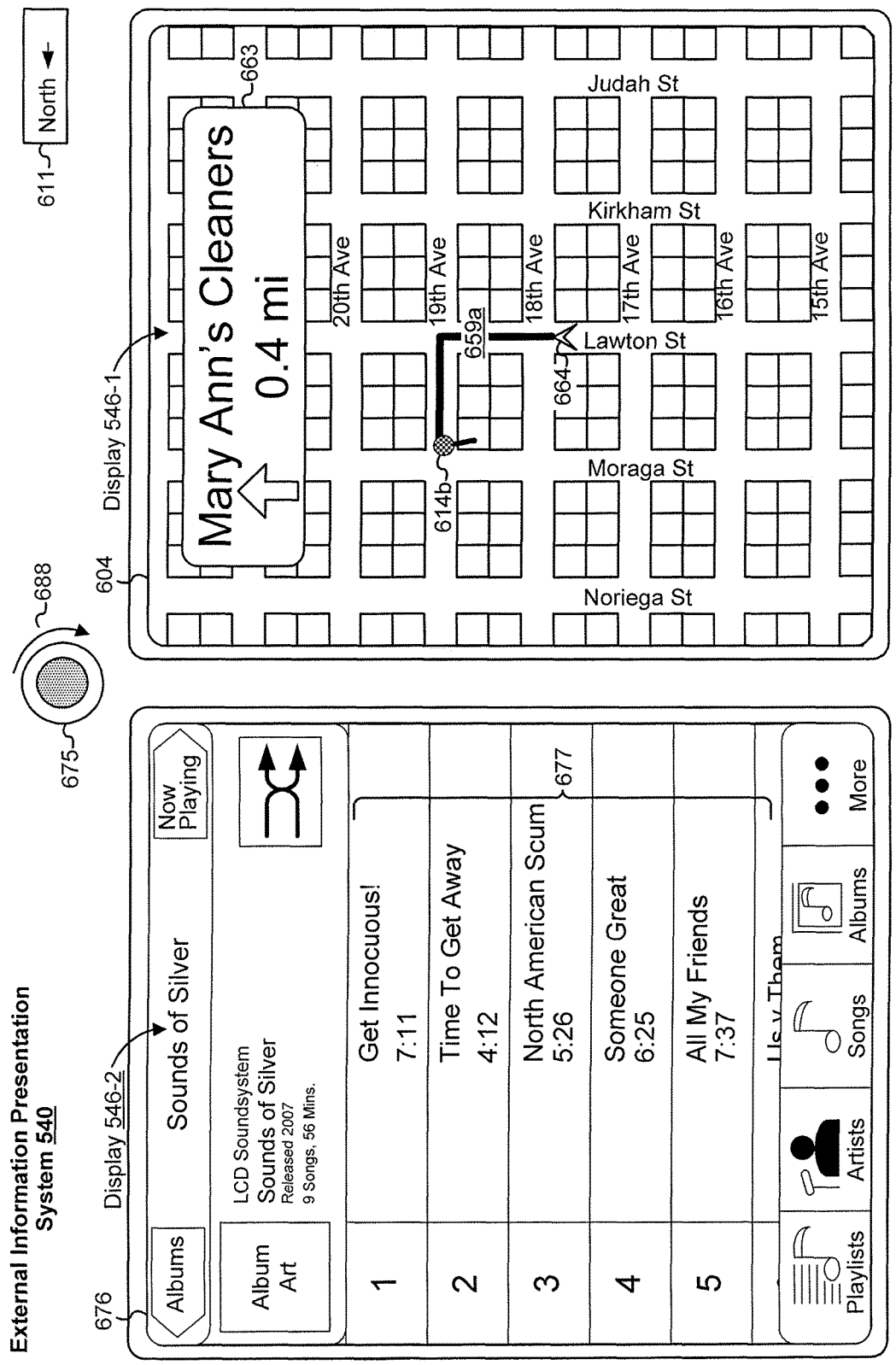
Figure 6E:
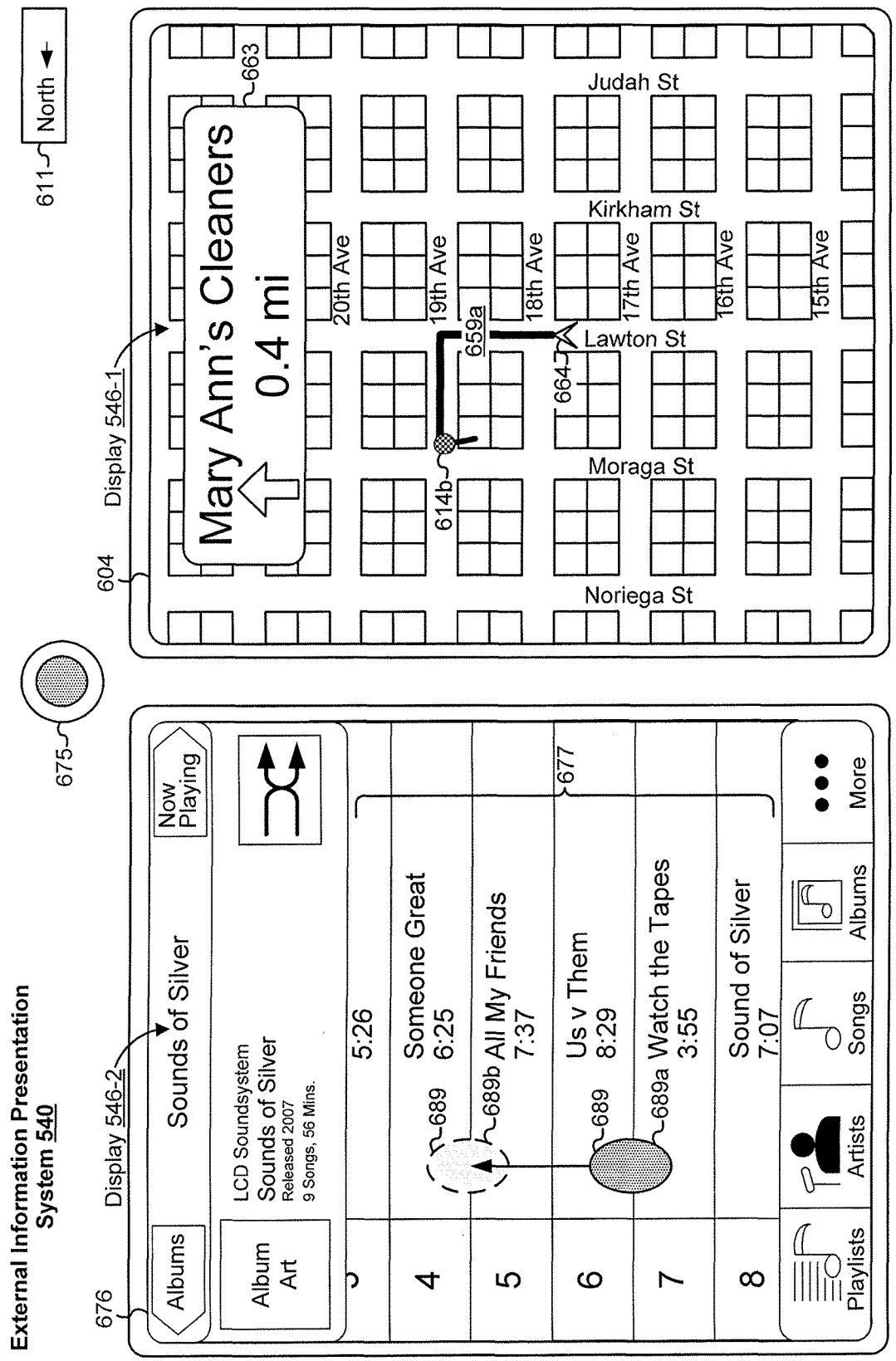
Figure 6F:
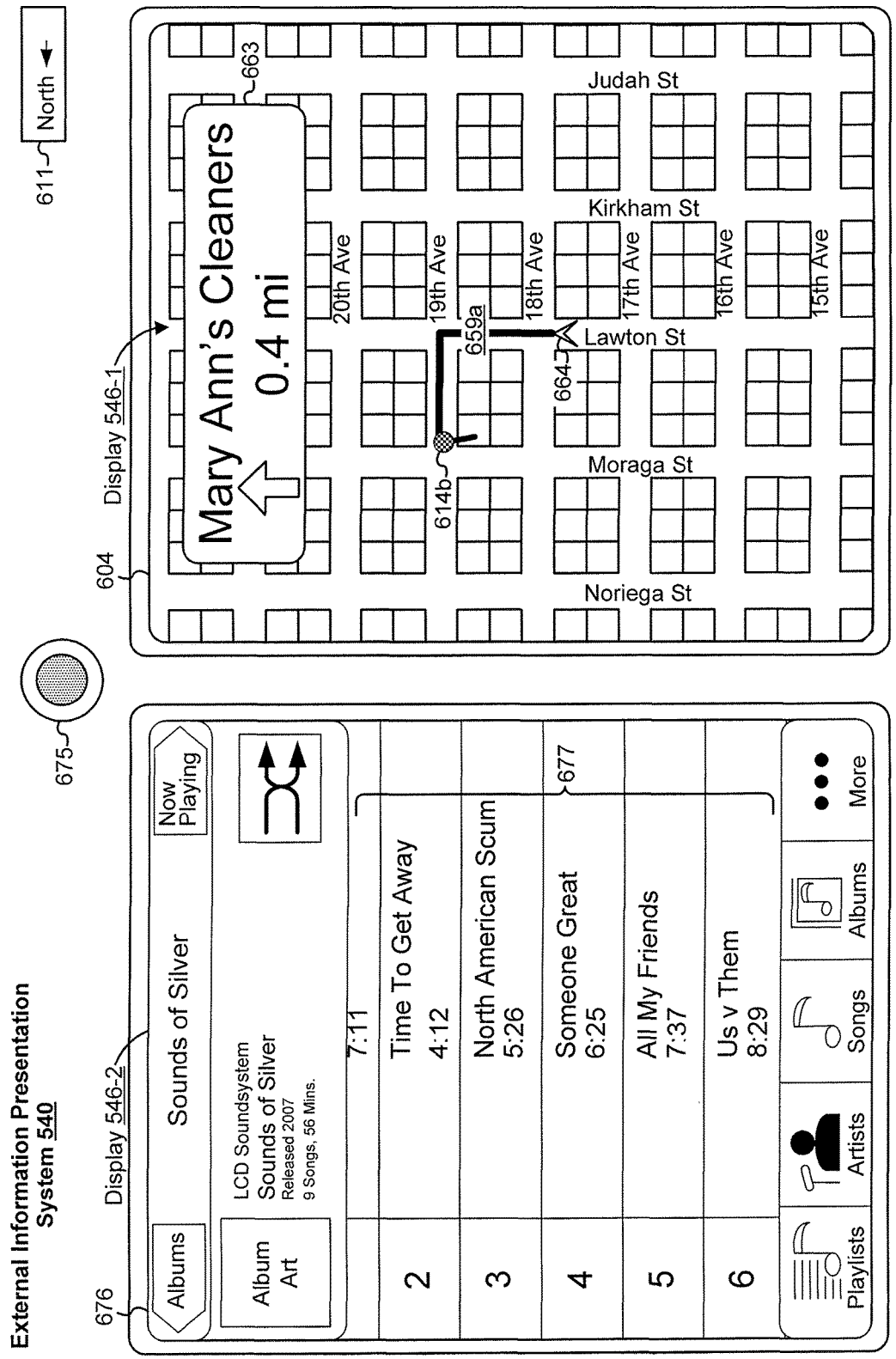
Figure 7A:
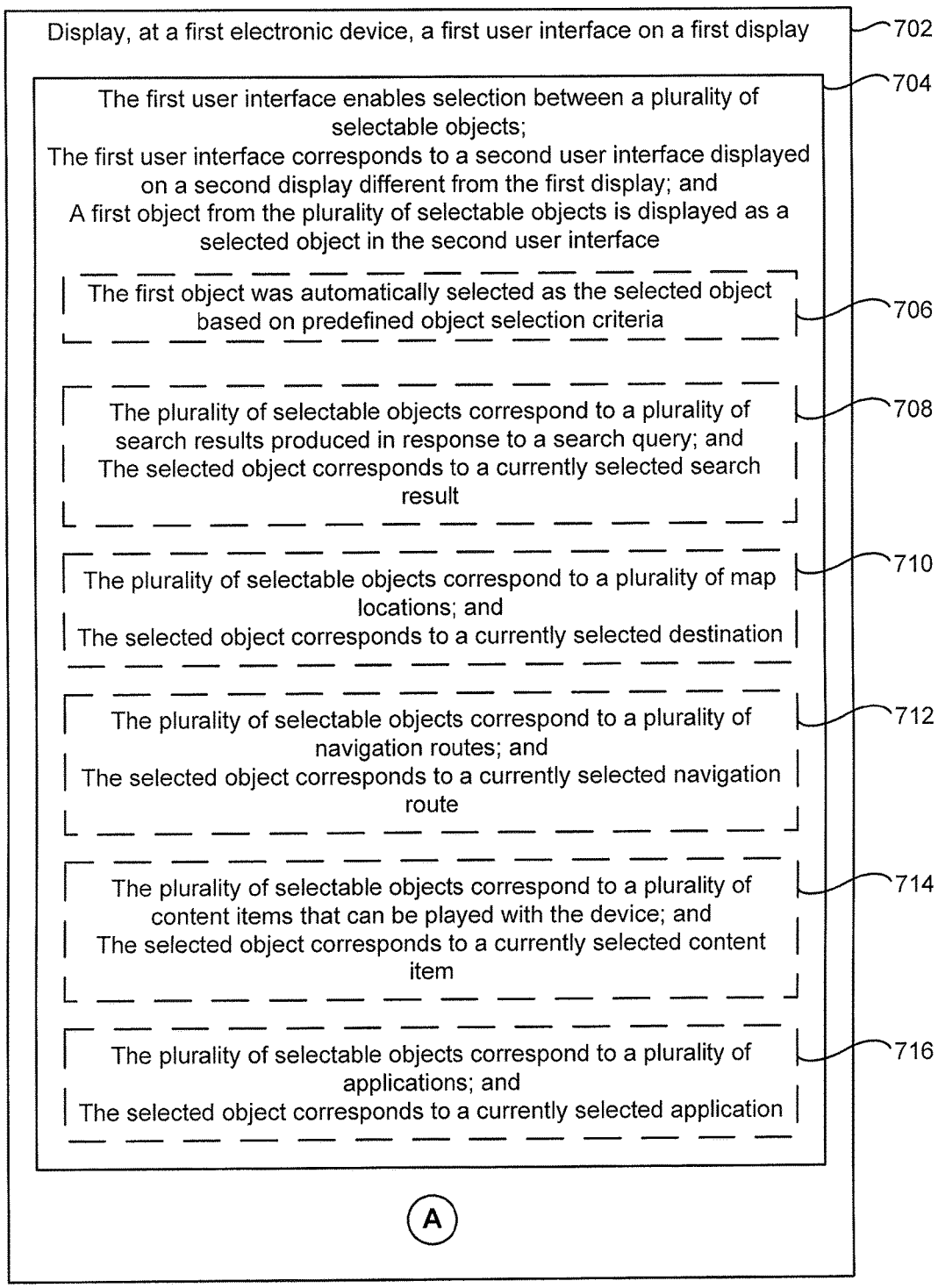
FIGS. 7A-7D are flow diagrams illustrating a method of synchronizing two or more displays in accordance with some embodiments.
Figure 7B:
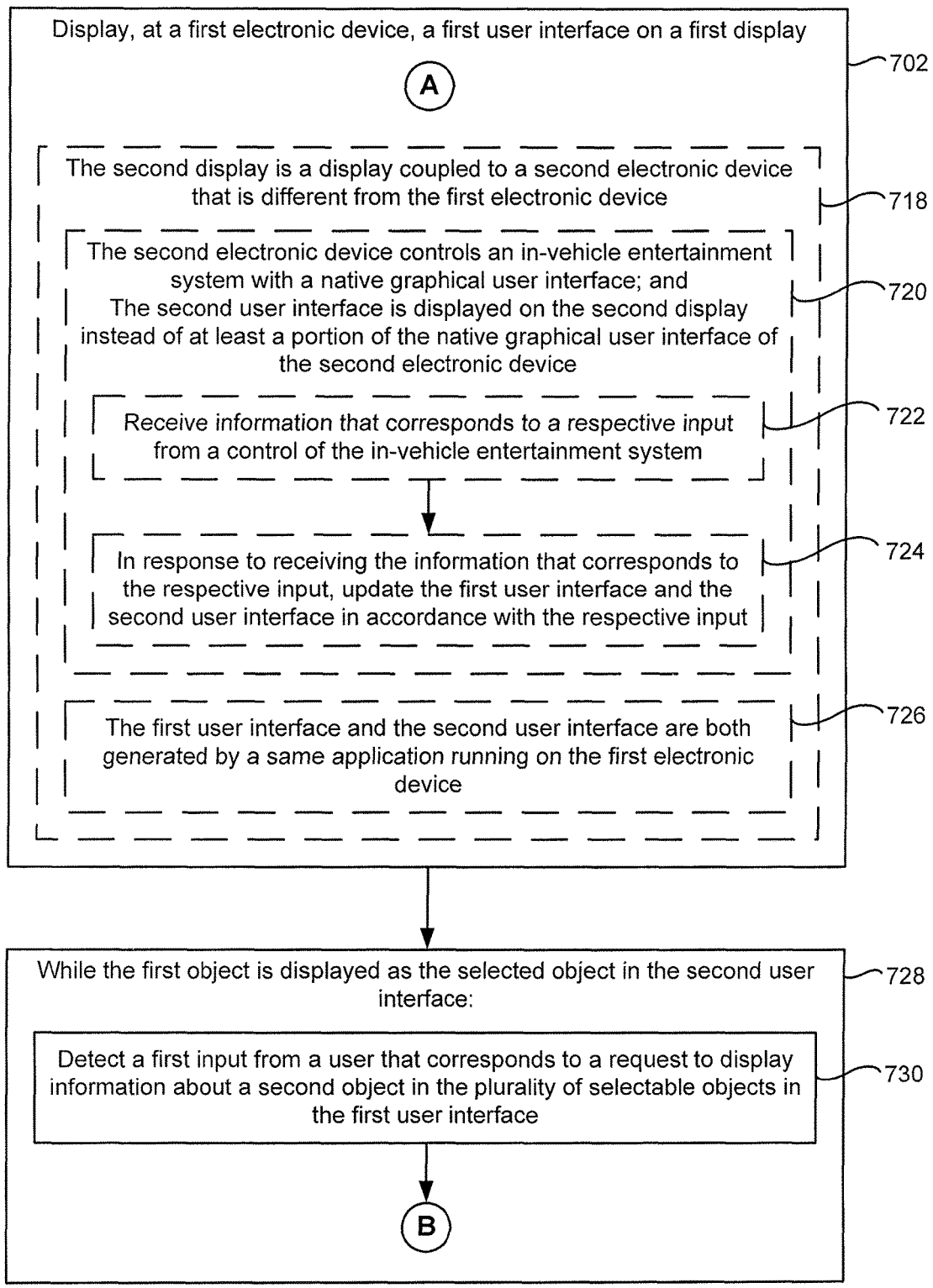
Figure 7C:
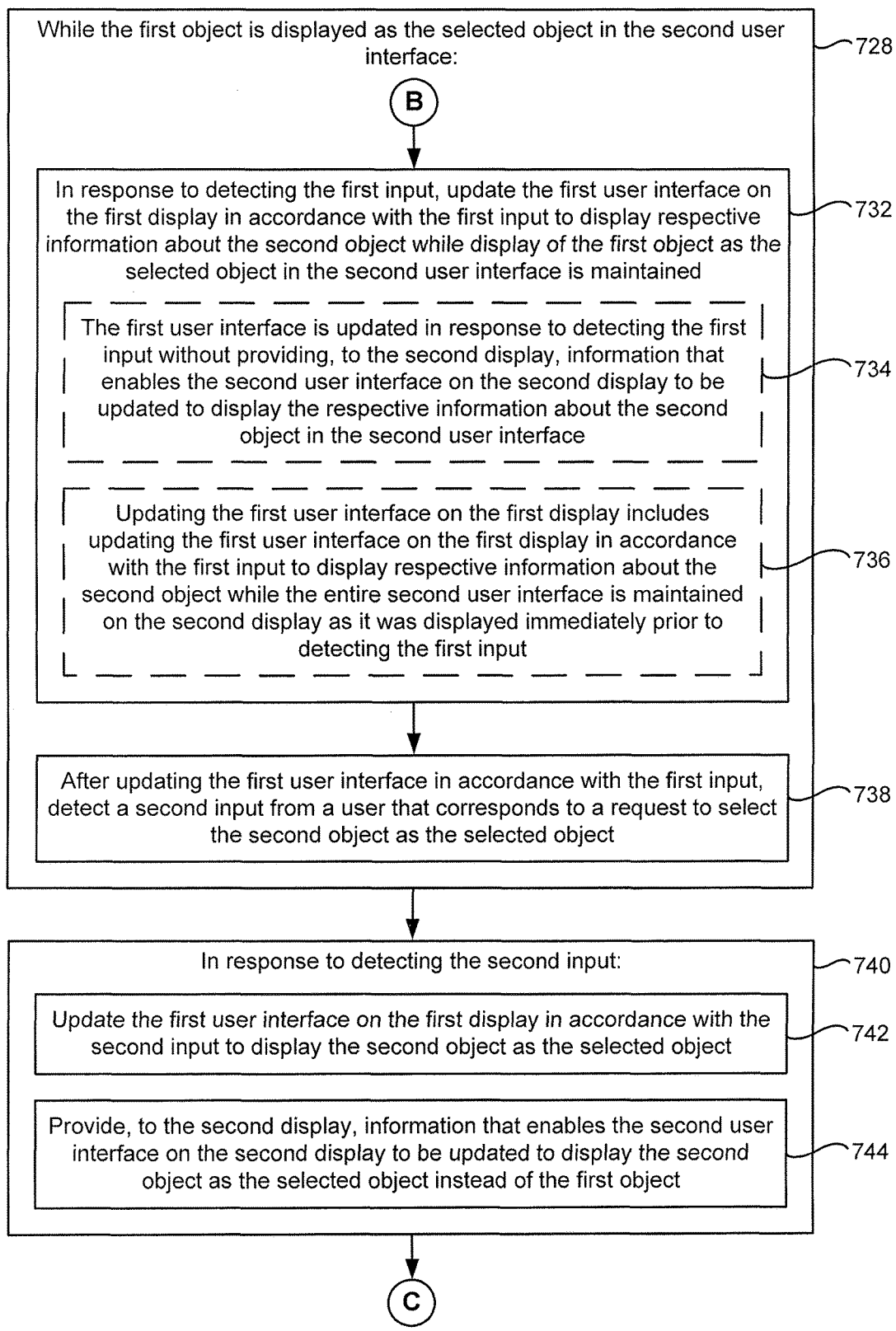
Figure 7D:
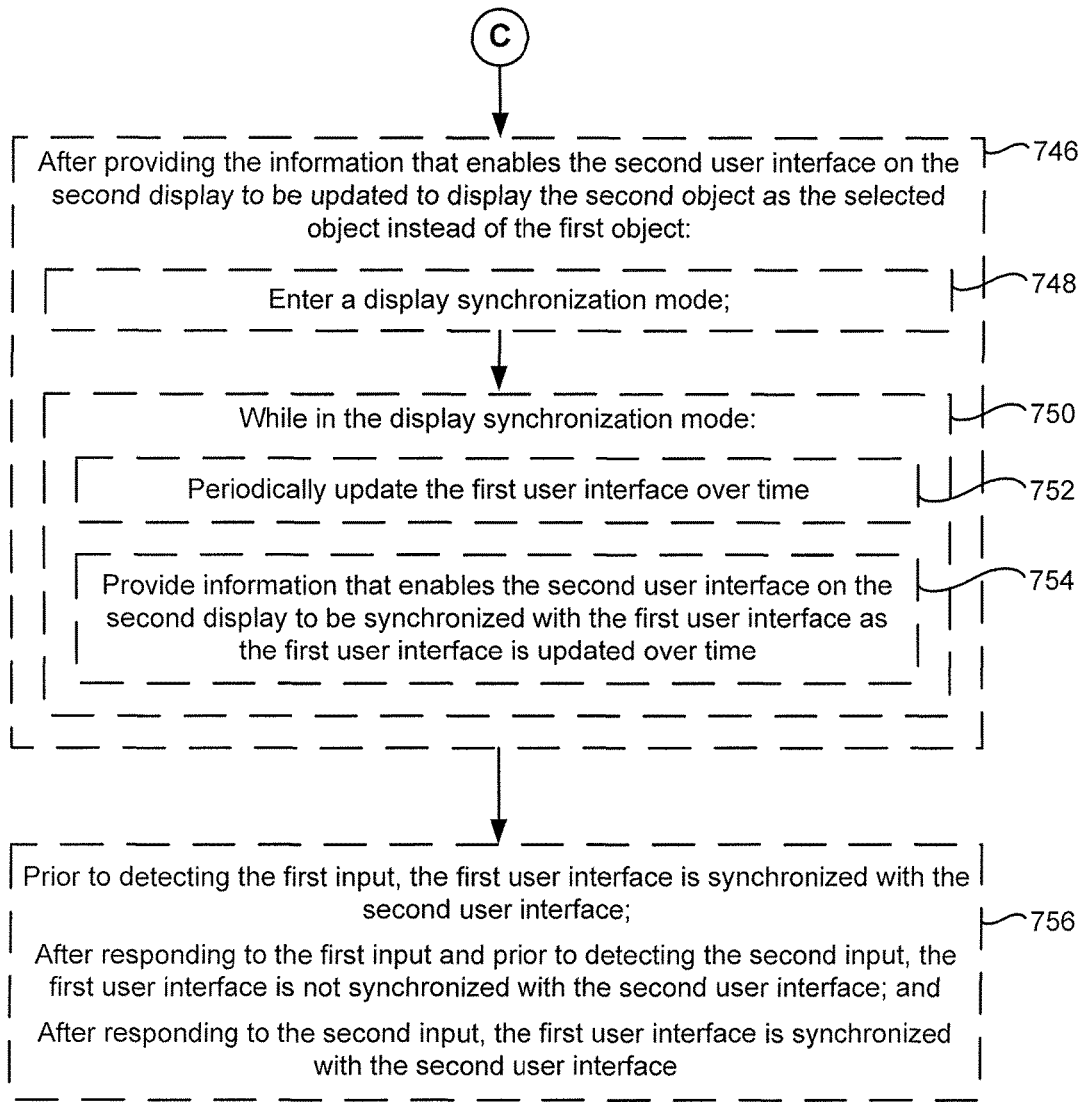

FIG. 6Z illustrates displaying destination information 684 corresponding to selected the dry cleaner represented by pin 614b (e.g., Mary Ann's Cleaners) in user interface 604 of display 546-1. In FIG. 6Z, display 546-1 displays destination information 684 corresponding to selected the dry cleaner represented by pin 614b in response to receiving update information from device 100 including an updated user interface corresponding to turn 683 detected by jog dial 675 in FIG. 6Y and the display state of user interface 604 in FIG. 6Y (e.g., the search results or destination selection mode). In FIG. 6Z, in response to detecting turn 683 (e.g., an 180 degree counter-clockwise turn) of jog dial 675 in FIG. 6Y, the dry cleaner represented by pin 614b is selected (or scrolled to) and destination information 684 corresponding to the dry cleaner represented by pin 614b (e.g., two dry cleaners to the north of the dry cleaner represented by pin 614*d* displayed in FIG. 6Y) is displayed in user interface 604.

FIG. 6Z also illustrates detecting a press on, or depression of, jog dial 675 with user touch input 685. In some embodiments, in response to detecting user touch input 685, jog dial 675 (or system 540) sends input information indicative of user touch input 685 to device 100. The input information includes an identifier associated with jog dial 675 (e.g., a unique identifier associated with jog dial 675) and input description information describing user touch input 685. For example, the input description information includes raw data describing user touch input 685 such as the force of the input and the amount of depression of jog dial 675. In response to receiving the input information associated with user touch input 685, device 100 determines that the identifier included in the input information is associated with display 546-1 (e.g., associating the press or depression event with jog dial 675 which is currently mapped to display 546-1) based on an input-source to display mapping. After determining that the depression event detected in FIG. 6Z is associated with display 546-1, device 100 also determines the display state of display 546-1 shown in FIG. 6Z (e.g., user interface 604 is in a search results or destination selection mode). FIG. 6Z further illustrates maintaining display of the list of songs 677 in user interface 676 from FIG. 6W on display 546-2.

FIG. 6AA illustrates displaying a turn-by-turn direction mode from marker 664 indicating the current location of device 100 to the dry cleaner represented by pin 614*b* (e.g., Mary Ann's Cleaners) in user interface 604 of display 546-1. In FIG. 6AA, display 546-1 displays the turn-by-turn direction mode in user interface 604 in response to receiving update information from device 100 including an updated user interface corresponding to user touch input 685 detected by jog dial 675 in FIG. 6Z and the display state of user interface 604 in FIG. 6Z (e.g., the search results or destination selection mode). In FIG. 6AA, in response to detecting user touch input 685 depressing jog dial 675 in FIG. 6Z, turn-by-turn directions from marker 664 indicating the current location of device 100 to the dry cleaner represented by pin 614*b* (e.g., selected with turn 683 of jog dial 675 in FIG. 6Y) on route 659*a* are displayed in turn-by-turn directions box 663 in user interface 604. FIG. 6AA also illustrates compass 611 indicating the orientation of the map displayed in user interface 604 (e.g., the map is oriented with the top of display 546-1 being east).

FIG. 6AA also illustrates detecting turn 686 (e.g., an approximately 90 degree counter-clockwise turn) of jog dial 675. In response to detecting turn 686, jog dial 675 (or system 540) sends input information indicative of turn 686 to device 100. The input information includes an identifier associated with jog dial 675 (e.g., a unique identifier associated with jog dial 675) and input description information describing turn 686. For example, the input description information includes raw data describing turn 686 such as the magnitude (90 degrees) and direction (counter-clockwise) of the turn. In response to receiving the input information associated with turn 681, device 100 determines that the identifier included in the input information is associated with display 546-1 (e.g., associating the turn event with jog dial 675 which is currently mapped to display 546-1) based on the input-source to display mapping. After determining that the turn event detected in FIG. 6AA is associated with display 546-1, device 100 also determines the display state of display 546-1 shown in FIG. 6AA (e.g., user interface 604 is in a turn-by-turn directions mode). FIG. 6AA further illustrates maintaining display of the list of songs 677 in user interface 676 from FIG. 6W on display 546-2.

FIG. 6BB illustrates displaying a turn-by-turn direction mode in user interface 604 of display 546-1. For example, the turn-by-turn direction mode displayed in user interface 604 in FIG. 6BB is a zoomed out version of the turn-by-turn direction mode displayed in user interface 604 in FIG. 6AA. In FIG. 6BB, display 546-1 displays the zoomed out turn-by-turn direction mode in user interface 604 in FIG. 6BB in response to receiving update information from device 100 including an updated user interface corresponding to turn 686 detected by jog dial 675 in FIG. 6AA and the display state of user interface 604 in FIG. 6AA (e.g., the turn-by-turn directions mode). FIG. 6BB further illustrates maintaining display of the list of songs 677 in user interface 676 from FIG. 6W on display 546-2.

FIG. 6CC illustrates displaying a vehicle backup mode in user interface 604 of display 546-1. For example, the vehicle backup mode displayed in user interface 604 includes a video feed from a backup camera implemented in the vehicle. In some embodiments, the vehicle backup mode occupies the entirety of display 546-1. When system 540 is implemented in a vehicle, display 646-1 displays a vehicle backup mode in user interface 604 while the vehicle is in reverse. In some embodiments, the vehicle backup mode supersedes all update information received by displays 546-1 and 546-2 from device 100. In some embodiments, the vehicle backup mode is displayed on one of the displays (e.g., display 546-1) but not on the other display (e.g., display 546-2).

Similarly, FIG. 6CC also illustrates displaying a vehicle backup mode in user interface 676 of display 546-2. For example, the vehicle backup mode displayed in user interface 676 includes a video feed from the backup camera implemented in the vehicle. In some embodiments, the vehicle backup mode occupies the entirety of display 546-2. When system 540 is implemented in a vehicle, display 646-2 displays a vehicle backup mode in user interface 676 while the vehicle is in reverse. In some other embodiments, display 646-2 does not display the vehicle backup mode in user interface 676 and maintains display of interface 676 while the vehicle is in reverse.

FIG. 6DD illustrates displaying a turn-by-turn direction mode in user interface 604 from 6BB on display 546-1 once the vehicle is no longer in reverse.

FIG. 6DD also illustrates detecting turn 688 (e.g., an approximately 90 degree clockwise turn) of jog dial 675. In response to detecting turn 688, jog dial 675 (or system 540) sends input information indicative of turn 688 to device 100. The input information includes an identifier associated with jog dial 675 (e.g., a unique identifier associated with jog dial 675) and input description information describing turn 688. For example, the input description information includes raw data describing turn 688 such as the magnitude (90 degrees) and direction (clockwise) of the turn.

Device 100 detects a change in the input-source to display mapping that maps jog dial 675 to display 546-2, instead of display 546-1. For example, device 100 changes the input-source to display mapping based on communications from external information presentation system 540 (e.g., taking control of a display to show an output of a backup camera) or input-source-mapping update request such as a user switching a respective control from a first-display mode in which the respective control controls a user interface in the first display to a second-display mode in which the respective control controls a user interface in the second display. In response to receiving the input information associated with turn 688, device 100 determines that the identifier included in the input information is associated with display 546-2 (e.g., associating the turn event with jog dial 675 which is currently mapped to display 546-2) based on the changed input-source to display mapping. After determining that the turn event detected in FIG. 6DD is associated with display 546-2, device 100 also determines the display state of display 546-2 shown in FIG. 6DD (e.g., user interface 676 is in an album song list mode).

FIG. 6DD further illustrates returning to display the list of songs 677 in user interface 676 from FIG. 6W on display 546-2 once the vehicle is no longer in reverse.

FIG. 6EE illustrates displaying the turn-by-turn direction mode in user interface 604 from 6BB on display 546-1. FIG. 6EE also illustrates displaying a scrolled downward list of songs 677 in user interface 676 of display 546-2. In FIG. 6EE, display 546-2 displays the scrolled downward list of songs 677 in user interface 676 in response to receiving update information from device 100 including an updated user interface corresponding to turn 688 detected by jog dial 675 in FIG. 6DD and the display state of user interface 676 in FIG. 6DD (e.g., the album song list mode). In FIG. 6EE, in response to detecting turn 688 (e.g., an approximately 90 degree clockwise turn) of jog dial 675 in FIG. 6DD, list of songs 677 is scrolled downward in user interface 604.

FIG. 6EE further illustrates detecting an upward swipe gesture (sometimes herein also called a "drag" gesture) with user touch input 689 moving from position 689a to position 689b on display 546-2. In response to detecting user touch input 689 (or the swipe gesture), display 546-2 (or system 540) sends input information indicative of touch input 689 (or the swipe gesture) to device 100. The input information includes an identifier associated with the touch-sensitive surface of display 546-2 (e.g., a unique identifier associated with the touch-sensitive surface of display 546-2) and input description information describing touch input 689 (or the swipe gesture). In response to receiving the input information associated with touch input 689 (or the swipe gesture), device 100 determines that the identifier included in the input information is associated with display 546-2 (e.g., associating the touch event (or the gesture) with the touch-sensitive surface of display 546-2) based on the input-source to display mapping. After determining that the touch event detected in FIG. 6EE is associated with display 546-2, device 100 also determines the display state of display 546-2 shown in FIG. 6EE (e.g., user interface 676 is in the album song list mode).

FIG. 6FF illustrates displaying the turn-by-turn direction mode in user interface 604 from 6BB on display 546-1. FIG. 6FF also illustrates displaying a scrolled upward list of songs 677 in user interface 676 of display 546-2. In FIG. 6FF, display 546-2 displays the scrolled upward list of songs 677 in user interface 604 in response to receiving update information from device 100 including an updated user interface corresponding to the swipe gesture detected on display 546-2 in FIG. 6EE and the display state of user interface 676 in FIG. 6EE (e.g., the album song list mode). In FIG. 6FF, in response to detecting the upward swipe gesture in FIG. 6EE, list of songs 677 is scrolled upward in user interface 604.

FIGS. 7A-7D are flow diagrams illustrating a method 700 of synchronizing two or more displays in accordance with some embodiments. Method 700 is performed at a first electronic device (e.g., device 300, FIG. 3, or portable multifunction device 100, FIG. 1A) with a first display and a touch-sensitive surface. In some embodiments, the first display is a touch screen display (e.g., touch screen 112) and the touch-sensitive surface is on the first display. In some embodiments, the first display is separate from the touch-sensitive surface. Some operations in method 700 are, optionally, combined and/or the order of some operations is, optionally, changed.

As described below, method 700 provides an intuitive way to synchronize two or more displays. The method reduces the cognitive burden on a user when displaying information on two or more displays, thereby creating a more efficient human-machine interface. For battery-operated electronic devices, enabling a user to use information displayed on two or more displays faster and more efficiently conserves power and increases the time between battery charges.

The first electronic device displays (702) a first user interface on the first display. In some embodiments, the first electronic device is a portable multifunction computing device such as a smart phone or tablet computer. FIGS. 6A-6V, for example, show portable multifunction device 100 (sometimes herein called "device 100") displaying user interface 602 (e.g., the first user interface) on touch screen 112.

The first user interface enables (704) selection between a plurality of selectable objects (e.g., search results that correspond to a previously performed search operation). FIG. 6D, for example, shows user interface objects (e.g., pins) corresponding to the dry cleaners represented by pins 614a and 614b displayed in user interface 602 of device 100. The dry cleaners represented by pins 614a and 614b are displayed in user interface 602 in FIG. 6D in response to a search query for "dry cleaning" nearby the current location 608 of device 100 in FIG. 6C.

The first user interface corresponds to a second user interface displayed on a second display different from the first display. In some embodiments, the first user interface and the second user interface are user interfaces for a same respective application (e.g., an application running on the first electronic device). User interface 602 (e.g., the first user interface) displayed on touch screen 112 of device 100 corresponds to user interface 604 (e.g., the second user interface) displayed on display 546-1 (e.g., a touch screen display) of external information presentation system 540 (sometimes herein called "system 540"). In some embodiments, display 546-1 is a primary display of a plurality of displays associated with system 540. In some embodiments, display 546-1 is implemented in the dashboard of the vehicle and is visually accessible to the driver and/or passenger of the vehicle.

A first object from the plurality of selectable objects is displayed as a selected object in the second user interface (e.g., the first user object is a currently selected object in the second user interface). FIG. 6D, for example, shows information box 613 corresponding to the dry cleaner represented by pin 614a displayed in user interface 602. Information box 613 is displayed in user interface 602 due to the fact that the dry cleaner represented by pin 614a is automatically selected based on predetermined criteria. FIG. 6D, for example, further shows route 616 from the current location 608 of device 100 to automatically selected the dry cleaner represented by pin 614a displayed in user interface 604 of display 546-1.

In some embodiments, the first object was automatically selected (706) as the selected object based on predefined object selection criteria (e.g., after initiating a search and receiving a set of one or more search results, a first object that corresponds to the most relevant search result was automatically, without user intervention, selected as the selected object). In FIG. 6D, for example, the dry cleaner represented by pin 614a is automatically selected based on proximity, the establishment's ratings, the amount of reviews, the amount of times the user has frequented the establishment, and/or other factors.

In some embodiments, the plurality of selectable objects correspond to (708) a plurality of search results produced in response to a search query (e.g., a typed or spoken search query), and the selected object corresponds to a currently selected search result. In FIG. 6D, for example, user interface objects (e.g., pins) corresponding to the dry cleaners represented by pins 614a and 614b are displayed in user interface 602 of device 100 in response to the search query "dry cleaning" input into search box 609 in FIG. 6C. In some embodiments, the search query is manually input into search box 609 by way of a virtual keyboard displayed in user interface 602 of touch screen 112. In some other embodiments, the search query is audibly input into search query box 609 by way of a speech input from the user of device 100. In FIG. 6D, for example, the dry cleaner represented by pin 614a is automatically selected from the plurality of search results including the dry cleaners represented by pins 614a and 614b. Also, in FIG. 6D, user interface 604 of system 540 displays route 616 from current location 608 of user device 100 to selected the dry cleaner represented by pin 614a.

In some embodiments, the plurality of selectable objects correspond to (710) a plurality of map locations, and the selected object corresponds to a currently selected destination. In FIG. 6D, for example, user interface objects (e.g., pins) corresponding to the dry cleaners represented by pins 614a and 614b are map locations relative to current location 608 of device 100. Also, in FIG. 6D, user interface 604 of system 540 displays route 616 from current location 608 of user device 100 to the map location for selected the dry cleaner represented by pin 614a.

In some embodiments, the plurality of selectable objects correspond to (712) a plurality of navigation routes, and the selected object corresponds to a currently selected navigation route. FIG. 6G, for example, shows a plurality of selectable user interface objects, including "route 1" affordance 631b and "route 2" affordance 632b, corresponding to routes 631a and 631b, respectively, from current location 608 of user device 100 to the dry cleaners represented by pins 614a and 614b. Also, in FIG. 6D, user interface 604 of system 540 displays route 616 corresponding to highlighted route 631a in user interface 602 from current location 608 of user device 100 to selected the dry cleaner represented by pin 614a.

In some embodiments, the plurality of selectable objects correspond to (714) a plurality of content items that can be played (or presented) with the device (e.g., the plurality of selectable objects are songs, playlists, audio books, radio stations, or the like), and the selected object corresponds to a currently selected content item. For example, a respective song in a list of songs is displayed as an automatically selected song on a user interface of touch screen 112 of device 100 based at least in part on the amount of plays of the respective song, the ordinal position of the respective song in an album, the last played song, and other factors. In this example, the respective automatically selected song is displayed as being currently played on a user interface of display 546-1.

In some embodiments, the plurality of selectable objects correspond to (716) a plurality of applications, and the selected object corresponds to a currently selected application.

In some embodiments, the second display is (718) a display coupled to a second electronic device that is different from the first electronic device (e.g., in place of a native GUI of the second electronic device). FIGS. 6A-6V, for example, show display 546-1 (e.g., the second display) coupled to system 540 (e.g., the second electronic device) that is different (and separate) from device 100.

In some embodiments, the second electronic device controls (720) an m-vehicle entertainment system with a native graphical user interface, and the second user interface is displayed on the second display instead of at least a portion of the native graphical user interface of the second electronic device (e.g., the second user interface is generated by an application running on the first electronic device and is displayed instead of some or all of the native graphical user interface of the in-vehicle entertainment system). In FIGS. 6A-6V, for example, system 540 controls an in-vehicle entertainment system including display 546-1. For example, user interface 604 in FIG. 6A, including climate controls for a vehicle, is the native graphical user interface of the in-vehicle entertainment system. FIGS. 6B-6V, for example, show user interface 604 including a map displayed on display 546-1 in place of the native graphical user interface (e.g., climate controls) as shown in FIG. 6A.

In some embodiments, the first electronic device receives (722) information that corresponds to a respective input from a control of the in-vehicle entertainment system (e.g., a tap or swipe gesture on a touch-sensitive surface associated with the second display, a button press operation for a button associated with the second display and/or a knob turn operation for a knob associated with the second display). FIG. 6U, for example, shows system 540 detecting user touch input 672 over "start directions" affordance 672 in user interface 604 of display 546-1. In this example, system 540 sends information to device 100 indicating that user touch input 672 was detected over "start directions" affordance 672 in user interface 604 of display 546-1.

In some embodiments, in response to receiving the information that corresponds to the respective input, the first electronic device updates (724) the first user interface and the second user interface in accordance with the respective input. FIG. 6V, for example, shows device 100 updating user interface 602 to display turn-by-turn directions box 673 on touch screen 112 and user interface 604 to display a turn-by-turn mode on display 546-1. In some embodiments, while user interface 604 is in a turn-by-turn mode, the map displayed on display 546-1 is further zoomed into in comparison to when user interface 604 is not in turn-by-turn mode.

In some embodiments, the first user interface and the second user interface are both generated (726) by a same application running on the first electronic device (e.g., an application running on a smart phone generates a user interface for the phone and a user interface for display on a display of an in-vehicle entertainment system of a vehicle). FIG. 6A, for example, shows user touch input 606 selecting maps application 436 in user interface 602. FIGS. 6B-6V, for example, show maps application 436 running on device 100 and generating both user interface 602 on touch screen 112 (e.g., the first user interface) and user interface 604 on display 546-1 (e.g., the second user interface).

While the first object is displayed (728) as the selected object in the second user interface, the first electronic device detects (730) a first input (e.g., a tap or swipe gesture on the first touch-sensitive surface of the first electronic device) from a user that corresponds to a request to display information about a second object in the plurality of selectable objects in the first user interface (e.g., without selecting the second object as the selected object). FIG. 6L, for example, shows device 100 detecting user touch input 643 over the user interface object (e.g., pin) corresponding to the dry cleaner represented by pin 614b on the map displayed in user interface 602 including the dry cleaners represented by pins 614a, 614b, 614c, 614e, and 614f. FIG. 6L, for example, also shows user system 540 displaying turn-by-turn directions mode including route 616 from marker 636 to the dry cleaner represented by pin 614a in user interface 604 of display 546-1 while device 100 detects user touch input 643.

While the first object is displayed (728) as the selected object in the second user interface, in response to detecting the first input, the first electronic device updates (732) the first user interface on the first display in accordance with the first input to display respective information about the second object while display of the first object as the selected object in the second user interface is maintained. FIG. 6M, for example, shows device 100 updating user interface 602 to display information box 644 corresponding to the dry cleaner represented by pin 614b in response to detecting user touch input 643 over the user interface object (e.g., pin) corresponding to the dry cleaner represented by pin 614b in FIG. 6L. While user interface 602 is updated in FIG. 6M, user interface 604 is maintained on display 546-1 in FIG. 6M as shown prior to detecting user touch input 643 in FIG. 6L.

In some embodiments, the first user interface is updated (734) in response to detecting the first input without providing, to the second display, information that enables the second user interface on the second display to be updated to display the respective information about the second object in the second user interface (e.g., the first electronic device does not send the respective information to the second electronic device or the second display in response to the first input). FIG. 6M, for example, shows device 100 updating user interface 602 on touch screen 112 in response to detecting user touch input 643 in FIG. 6L without providing information to display 546-1 (or system 540) that enables user interface 604 on display 546-1 to be updated. While user interface 602 is updated in FIG. 6M, user interface 604 is maintained on display 546-1 in FIG. 6M as shown prior to detecting user touch input 643 in FIG. 6L.

In some embodiments, updating the first user interface on the first display in accordance with the first input to display respective information about the second object while display of the first object as the selected object in the second user interface is maintained includes (736) updating the first user interface on the first display in accordance with the first input to display respective information about the second object while the entire second user interface is maintained on the second display as it was displayed immediately prior to detecting the first input (e.g., the second user interface is not updated in response to the first update). FIG. 6M, for example, shows device 100 updating user interface 602 on touch screen 112 to display information box 644 corresponding to the dry cleaner represented by pin 614b in response to detecting user touch input 643 in FIG. 6L. While user interface 602 is updated in FIG. 6M, user interface 604 is maintained on display 546-1 in FIG. 6M as shown prior to detecting user touch input 643 in FIG. 6L.

While the first object is displayed (728) as the selected object in the second user interface, after updating the first user interface in accordance with the first input, the first electronic device detects (738) a second input from a user that corresponds to a request to select the second object as the selected object. FIG. 6Q, for example, shows device 100 detecting user touch input 661 corresponding to a request to display turn-by-turn directions for route 659a from current location 608 of device 100 to the dry cleaner represented by pin 614b (e.g., Mary Ann's Cleaners).

In response to detecting (740) the second input, the first electronic device updates (742) the first user interface on the first display in accordance with the second input to display the second object as the selected object. FIG. 6R, for example, shows, device 100 updating user interface 602 to display turn-by-turn directions box 662 from current location 608 of device 100 to the dry cleaner represented by pin 614b (e.g., Mary Ann's Cleaners) in response to detecting user touch input 661 in FIG. 6Q.

In response to detecting (740) the second input, the first electronic device provides (744), to the second display, information that enables the second user interface on the second display to be updated to display the second object as the selected object instead of the first object. In response to detecting user touch input 661 in FIG. 6Q, device 100 sends system 540 information to enable system 540 to update user interface 604 on display 546-1. FIG. 6R, for example, shows updated user interface 604 where turn-by-turn directions mode (e.g., from current location 608 of device 100 to the dry cleaner represented by pin 614b) is displayed in user interface 604 of display 546-1 including marker 664 indicating the current location of device 100, route 659a to the dry cleaner represented by pin 614b (e.g., Mary Ann's Cleaners), and turn-by-turn directions box 663 indicating the user's first direction (or turn) on route 659a.

In some embodiments, after providing the information that enables (746) the second user interface on the second display to be updated to display the second object as the selected object instead of the first object, the first electronic device enters (748) a display synchronization mode (e.g., entering a playlist play mode or driving directions mode). FIG. 6R, for example, shows device 100 displaying turn-by-turn directions box 662 from current location 608 of device 100 to the dry cleaner represented by pin 614b in user interface 602 of touch screen 112 (e.g., a display synchronization mode). In some embodiments, while in the display synchronization mode (750): the first electronic device periodically updates (752) the first user interface over time (e.g., updating displayed cover art as the first electronic device plays through a sequence of songs in a playlist or updating a displayed map to indicate progress of a vehicle moving along a navigation route). For example, while device 100 displays turn-by-turn directions box 662 as shown in FIG. 6R, device 100 periodically updates user interface 602 to show the updated next direction (or turn) on route 659a and the updated mileage and time remaining in turn-by-turn directions box 662 as device 100 approaches the destination (e.g., the dry cleaner represented by pin 614b corresponding to Mary Ann's Cleaners). In some embodiments, while in the display synchronization mode (750): the first electronic device provides (754) information that enables the second user interface on the second display to be synchronized with the first user interface as the first user interface is updated over time (e.g., providing updated cover art or map images to the display as the first electronic device plays through the playlist or the vehicle moves along the navigation route). For example, while device 100 displays turn-by-turn directions box 662 as shown in FIG. 6R, device 100 provides information to system 540 that enables system 540 to display updated user interface 604 including the updated next direction (or turn) on route 659a, the updated mileage and time remaining in turn-by-turn directions box 663 and marker 664 (e.g., the current location of device 100) as device 100 approaches the destination (e.g., the dry cleaner represented by pin 614*b* corresponding to Mary Ann's Cleaners).

In some embodiments, prior to detecting the first input, the first user interface is synchronized (756) with the second user interface (e.g., the first object is displayed in both the first user interface and the second user interface as the selected object); after responding to the first input and prior to detecting the second input, the first user interface is not synchronized with the second user interface (e.g., a second object is displayed as the selected object in the first user interface while the first object remains displayed as the selected object in the second user interface); and after responding to the second input, the first user interface is synchronized with the second user interface (e.g., the second object is displayed as the selected object in both the first user interface and the second user interface).

In FIG. 6H, first user interface 602 and second user interface 604 are synchronized. FIG. 6H, for example, shows user interface 602 on touch screen 112 displaying turn-by-turn directions box 634 indicating the user's first direction (or turn) on route 631*a* from current location 608 of device 100 to the dry cleaner represented by pin 614*a* (e.g., the selected first object) and the name of the selected first object, or destination, (e.g., ABC Cleaners). FIG. 6H, for example, also shows user interface 604 on display 546-1 displaying a turn-by-turn directions mode with route 616 from the current location 608 of device 100 to the dry cleaner represented by pin 614*a* (e.g., the first selected object).

In FIG. 6M, first user interface 602 and second user interface 604 are not synchronized. FIG. 6M, for example, shows user interface 602 on touch screen 112 displaying information box 644 corresponding to the dry cleaner represented by pin 614*b* (e.g., the selected second object). FIG. 6M, for example, also shows user interface 604 on display 546-1 displaying route 616 from current location 608 of device 100 to the dry cleaner represented by pin 614*a* (e.g., the selected first object).

In FIG. 6R, first user interface 602 and second user interface 604 are synchronized. FIG. 6R, for example, shows user interface 602 on touch screen 112 displaying turn-by-turn directions box 662 indicating the user's first direction (or turn) on route 659*a* from current location 608 of device 100 to the dry cleaner represented by pin 614*b* (e.g., the selected second object) and the name of the selected second object, or destination, (e.g., Mary Ann's Cleaners). FIG. 6R, for example, also shows user interface 604 on display 546-1 displaying a turn-by-turn directions mode with route 659*a* from current location 608 of device 100 to the dry cleaner represented by pin 614*b* (e.g., the selected second object).

Thus, as described above, the user interface displayed on touch screen display 112 and display 546-1 are intermittently synchronized. Intermittently synchronizing the user interfaces displayed on touch screen display 112 and display 546-1 enables a passenger in a vehicle to browse through information displayed on touch screen display 112 (e.g., investigating different candidate destinations including contact information, reviews, descriptions, etc.) without the user interface that is displayed on the driver-visible display (e.g., display 546-1) updating constantly in response to the activity of the passenger. However, once the passenger has committed to an operation (e.g., selected a destination) in the user interface displayed on touch screen display 112, the user interfaces on the displays are synchronized, so that the driver can drive to the selected destination and the user can help to navigate to the selected destination. Similarly, if the driver selects a destination in the user interface that is displayed on the driver-visible display (e.g., display 546-1), the user interface displayed on touch screen display 112 is updated to reflect the driver's selection, so that the passenger can help the driver navigate to the selected destination. The intermittent synchronization of user interfaces described above is an improvement over a situation where the user interfaces displayed on two displays are continuously synchronized (e.g., because the passenger is able to view additional information without repeatedly changing the information displayed to the driver). Additionally, the intermittent synchronization of user interfaces describe above is an improvement over a situation where the user interfaces displayed on two displays are never synchronized (e.g., because the passenger does not need to take the additional step of updating a destination address in a car navigation system after looking up the address on device 100).

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 700 described above with respect to FIGS. 7A-7D. For example, the contacts, gestures, user interface objects described above with reference to method 700 optionally have one or more of the characteristics of the contacts, gestures, user interface objects described herein with reference to other methods described herein (e.g., methods 800 and 900). For brevity, these details are not repeated here.

Figure 8A:
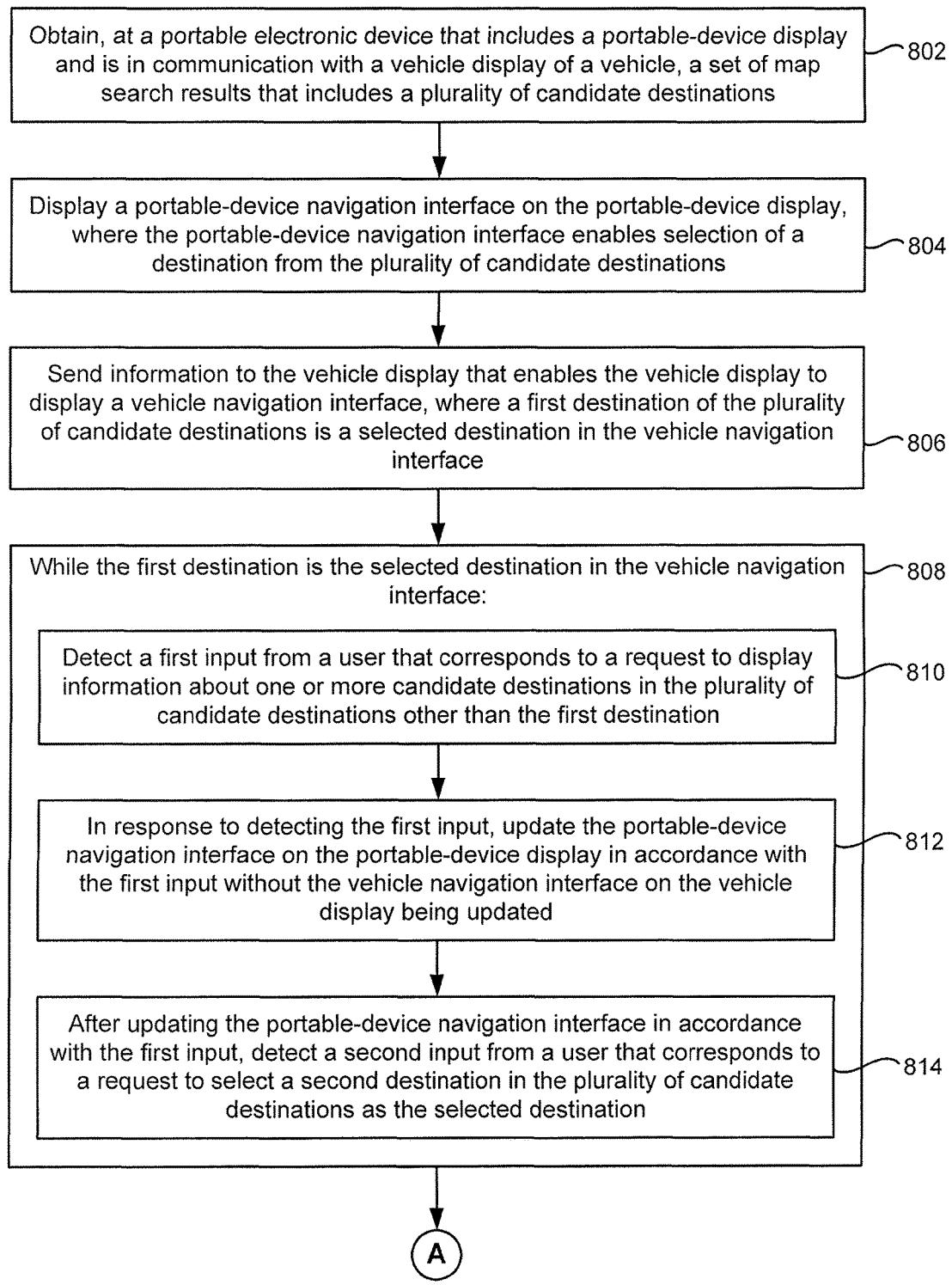
FIGS. 8A-8B are flow diagrams illustrating a method of synchronizing two or more displays in accordance with some embodiments.
Figure 8B:
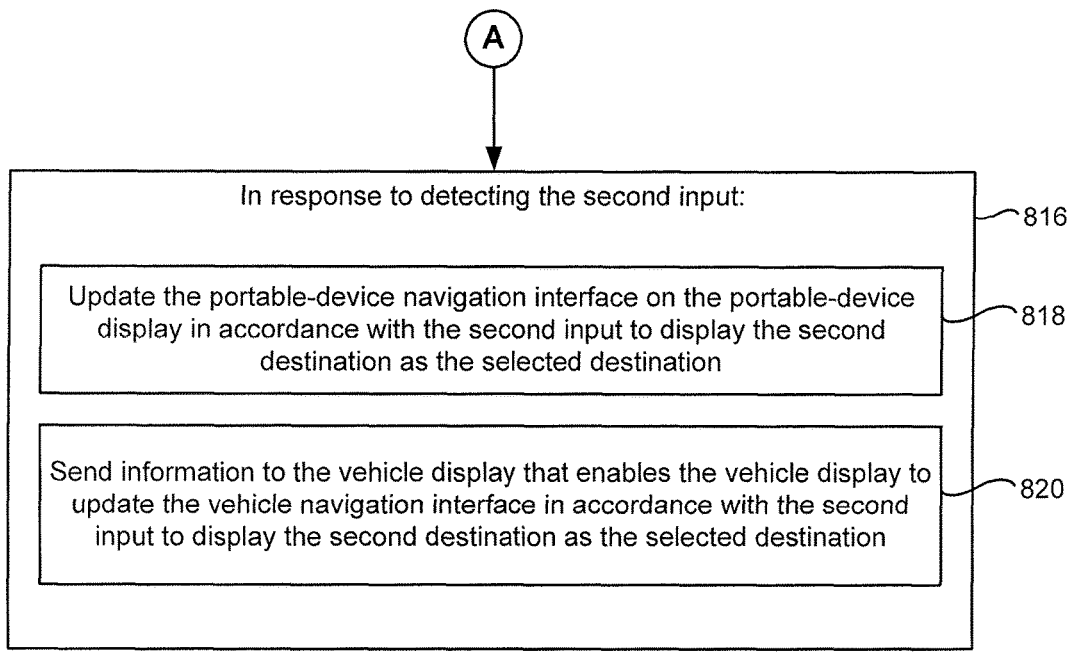
Figure 9B:
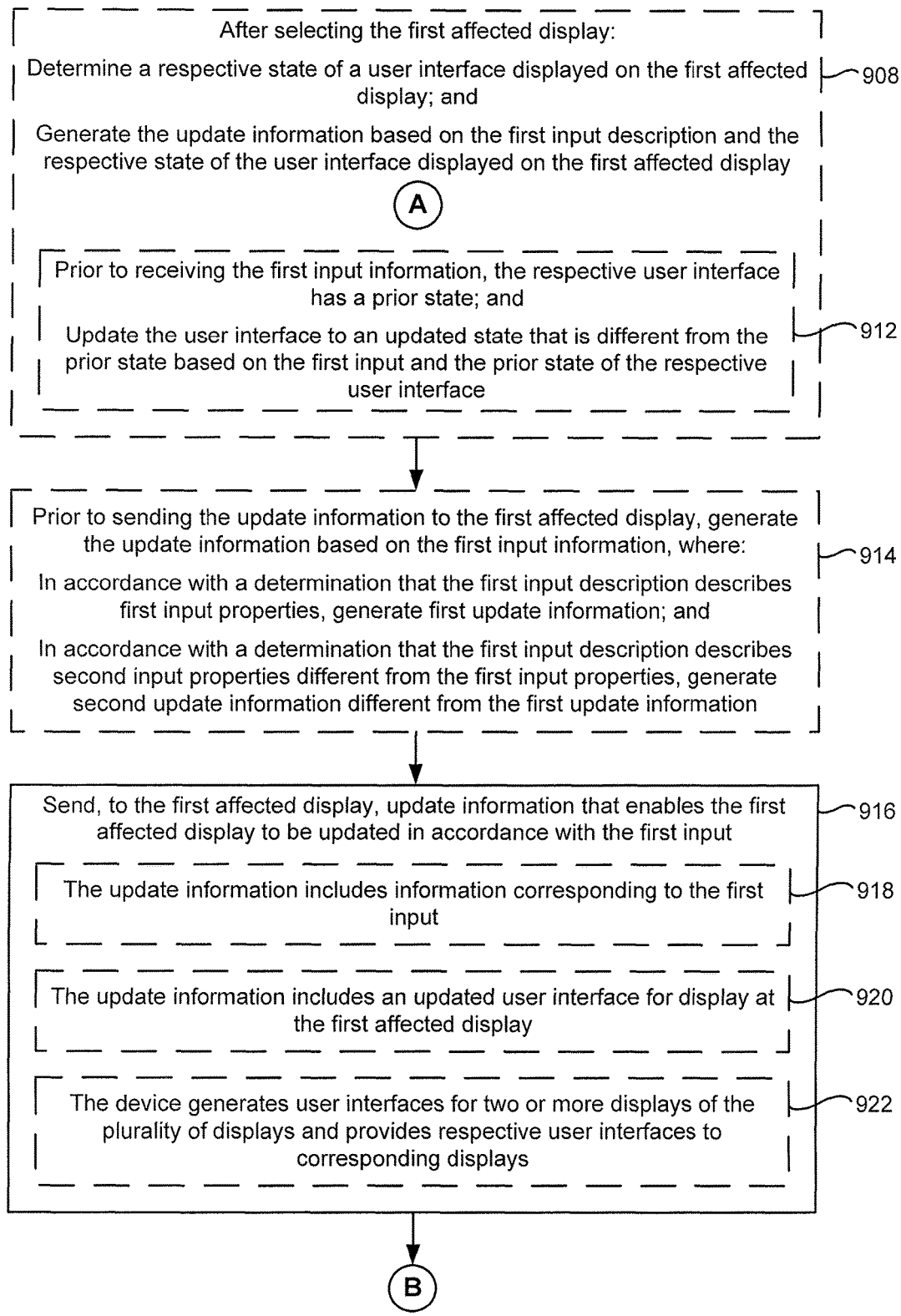
Figure 9C:
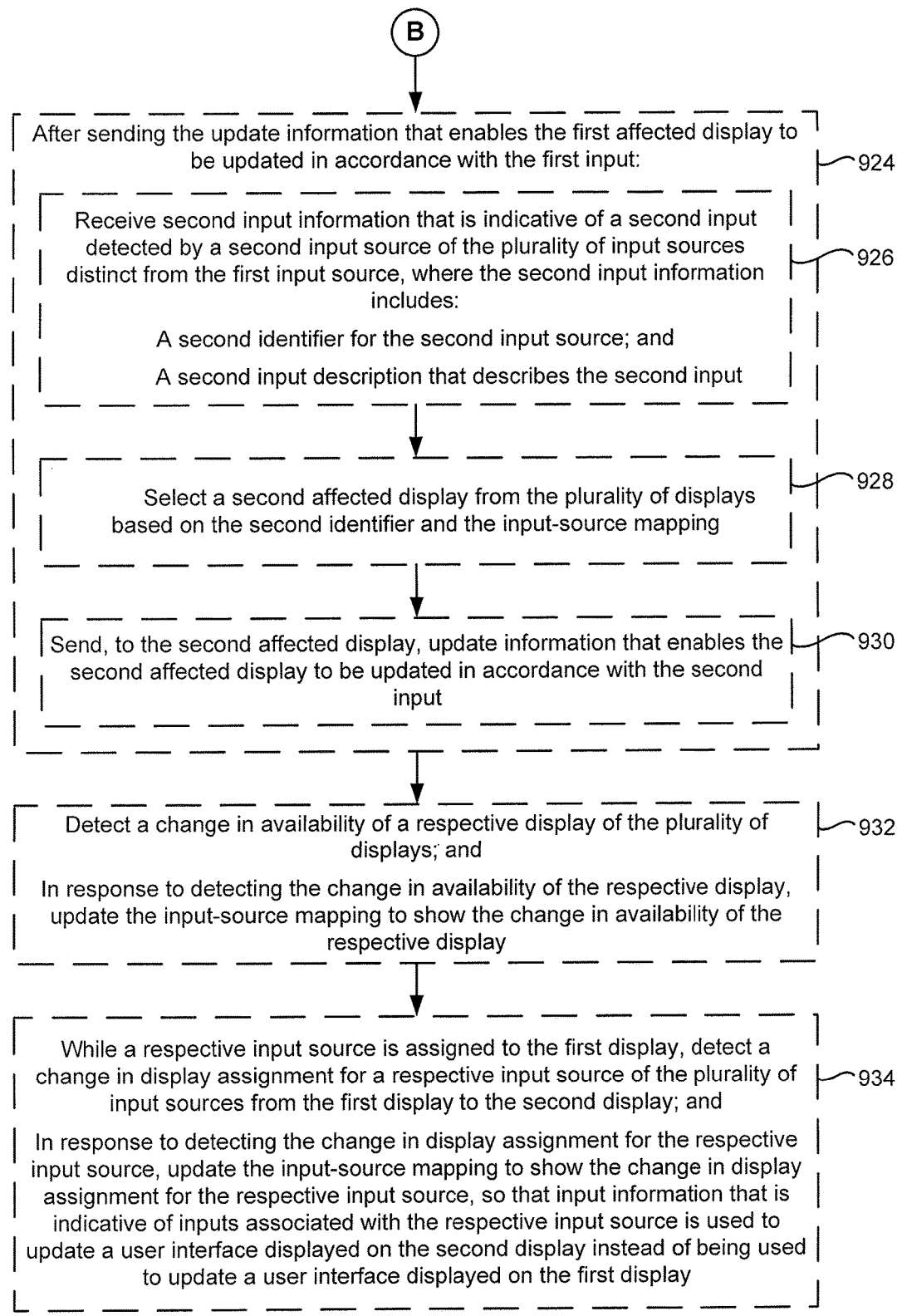

FIGS. 8A-8B are flow diagrams illustrating a method 800 of synchronizing two or more displays in accordance with some embodiments. Method 800 is performed at a portable electronic device (e.g., device 300, FIG. 3, or portable multifunction device 100, FIG. 1A) that is in communication with a vehicle display of a vehicle. The portable electronic device includes a portable-device display and a touch-sensitive surface. In some embodiments, the portable-device display is a touch screen display and the touch-sensitive surface is on the portable-device. In some embodiments, the portable-device is separate from the touch-sensitive surface. Some operations in method 800 are, optionally, combined and/or the order of some operations is, optionally, changed.

As described below, method 800 provides an intuitive way to synchronize two or more displays. The method reduces the cognitive burden on a user when using two or more displays, thereby creating a more efficient human-machine interface. For battery-operated electronic devices, enabling a user to synchronize two or more displays faster and more efficiently conserves power and increases the time between battery charges.

The portable electronic device obtains (802) a set of map search results that includes a plurality of candidate destinations. FIG. 6C, for example, shows a user search query (e.g., dry cleaning) displayed in search box 609 in user interface 602 of touch screen 112. In response to the search query, device 100 obtains a set of map search results that includes a plurality of candidate destinations by searching a memory local to device 100, a memory external to device 100, the Internet, or a combination thereof.

The portable electronic device displays (804) a portable-device navigation interface on the portable-device display, where the portable-device navigation interface enables selection of a destination from the plurality of candidate destinations (e.g., search results that correspond to a previously performed search operation). FIG. 6D, for example, shows a portable-device navigation interface (e.g., user interface 602) corresponding to the search query "dry cleaning" input into search query box 609 in FIG. 6C displayed on touch screen 112. In FIG. 6D, user interface 602 includes selectable user interface objects (e.g., pins), or affordances, corresponding to the dry cleaners represented by pins 614a and 614b nearby current location 608 of device 100.

The portable electronic device sends (806) information to the vehicle display that enables the vehicle display to display a vehicle navigation interface, where a first destination of the plurality of candidate destinations is a selected destination in the vehicle navigation interface. FIG. 6D, for example, shows a vehicle navigation interface (e.g., user interface 604) displayed on display 546-1 of system 540. In FIG. 6D, the dry cleaner represented by pin 614a (e.g., ABC Cleaners) is displayed as the selected destination in user interface 604 of display 546-1 and route 616 from current location 608 of device 100 to the dry cleaner represented by pin 614a is also displayed in user interface 604 of display 546-1. In some embodiments, display 546-1 is a touch screen display. In some embodiments, display 546-1 is a primary display of a plurality of displays associated with system 540. In some embodiments, display 546-1 is implemented in the dashboard of the vehicle and is visually accessible to the driver and/or passenger of the vehicle.

While the first destination is (808) the selected destination in the vehicle navigation interface, the portable electronic device detects (810) a first input (e.g., a tap or swipe gesture on a touch-sensitive surface of the first electronic device) from a user that corresponds to a request to display information about one or more candidate destinations in the plurality of candidate destinations other than the first destination (e.g., without selecting the second object as the selected object). FIG. 6L, for example, shows device 100 detecting user touch input 643 over the user interface object (e.g., pin) corresponding to the dry cleaner represented by pin 614b (e.g., Mary Ann's Cleaners) on the map displayed in user interface 602. In FIG. 6L, the map displayed in user interface includes the dry cleaners represented by pins 614a, 614b, 614c, 614e, and 614f. In FIG. 6L, for example, the dry cleaner represented by pin 614a (e.g., ABC Cleaners) is displayed as the selected destination in user interface 604 of display 546-1.

While the first destination is (808) the selected destination in the vehicle navigation interface, in response to detecting the first input, the portable electronic device updates (812) the portable-device navigation interface on the portable-device display in accordance with the first input without the vehicle navigation interface on the vehicle display being updated. FIG. 6M, for example, shows device 100 updating user interface 602 to display information box 644 corresponding to the dry cleaner represented by pin 614b in response to detecting user touch input 643 over the user interface object (e.g., pin) corresponding to the dry cleaner represented by pin 614b in FIG. 6L. In FIG. 6M, user interface 602 is updated without providing information to display 546-1 (or system 540) that enables user interface 604 on display 546-1 to be updated. In FIG. 6M, for example, the dry cleaner represented by pin 614a is displayed as the selected destination in user interface 604 of display 546-1.

While the first destination is (808) the selected destination in the vehicle navigation interface, after updating the portable-device navigation interface in accordance with the first input, the portable electronic device detects (814) a second input from a user that corresponds to a request to select a second destination in the plurality of candidate destinations as the selected destination. FIG. 6Q, for example, shows device 100 detecting user touch input 661 corresponding to a request to display turn-by-turn directions for route 659a from current location 608 of device 100 to the dry cleaner represented by pin 614b (e.g., Mary Ann's Cleaners).

In response to detecting (816) the second input, the portable electronic device updates (818) the portable-device navigation interface on the portable-device display in accordance with the second input to display the second destination as the selected destination. FIG. 6R, for example, shows, device 100 updating user interface 602 to display turn-by-turn directions box 662 with directions to the dry cleaner represented by pin 614b (e.g., Mary Ann's Cleaners) in response to detecting user touch input 661 in FIG. 6Q.

In response to detecting (816) the second input, the portable electronic device sends (820) information to the vehicle display that enables the vehicle display to update the vehicle navigation interface in accordance with the second input to display the second destination as the selected destination. In response to detecting user touch input 661 in FIG. 6Q, device 100 sends system 540 information to enable system 540 to update user interface 604 on display 546-1. FIG. 6R, for example, shows updated user interface 604 where turn-by-turn directions mode is displayed in user interface 604 of display 546-1 including marker 664 indicating the current location of device 100, route 659a from current location 608 of device 100 to the dry cleaner represented by pin 614b (e.g., Mary Ann's Cleaners), and turn-by-turn directions box 663 indicating the user's first direction (or turn) on route 659a.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 800 described above with respect to FIGS. 8A-8B. For example, the contacts, gestures, user interface objects described above with reference to method 800 optionally have one or more of the characteristics of the contacts, gestures, user interface objects described herein with reference to other methods described herein (e.g., methods 700 and 900). For brevity, these details are not repeated here.

FIGS. 9A-9C are flow diagrams illustrating a method 900 of sending update information to an affected display in accordance with some embodiments. Method 900 is performed at an electronic device (e.g., device 300, FIG. 3, or portable multifunction device 100, FIG. 1A) that is in communication with a plurality of displays that include a first display and a second display. In some embodiments, the electronic device, optionally, includes a display and a touch-sensitive surface. In some embodiments, the display is a touch screen display and the touch-sensitive surface is on the electronic device. In some embodiments, the electronic device is separate from the touch-sensitive surface. Some operations in method 900 are, optionally, combined and/or the order of some operations is, optionally, changed.

As described below, the method 900 provides an efficient way to send update information to an affected display.

An electronic device that is in communication with a plurality of displays that include a first display and a second display receives (902) first input information that is indicative of a first input detected by a first input source of a plurality of input sources, where the first input information includes: a first (unique) identifier for the first input source; and a first input description that describes the first input. For example, the first input source description is raw input data such as contact locations and movement amounts/directions detected on a touch-sensitive surface and/or gesture data describing a type of gesture that was performed on the touch-sensitive surface. In some embodiments, the device is in communication with a plurality of different input sources (e.g., one or more buttons, knobs, jog dials, and/or touch-sensitive surfaces) where a respective input source is mapped to work in conjunction with a particular display. In some embodiments, as described in greater detail below with reference to FIG. 6DD-6EE, the mapping is, optionally, updated so that the mapping of a respective input source is changed from being mapped to the first display to being mapped to the second display.

FIGS. 6W-6FF, for example, show device 100 in communication with display 546-1 and 546-2. For example, display 546-1 (e.g., a primary display) and 546-2 (e.g., an auxiliary display) are associated with system 540 which is implemented in a vehicle. For example, jog dial 675 is associated with system 540 and, when activated, causes the device to control one or both of display 546-1 and display 546-2. FIG. 6X, for example, shows jog dial 675 detecting turn 681 (e.g., an approximately 90 degree clockwise turn). In response to detecting turn 681, jog dial 675 (or system 540) sends input information indicative of turn 681 to device 100. The input information includes an identifier associated with jog dial 675 (e.g., a unique identifier associated with jog dial 675) and input description information describing turn 681. For example, the input description information includes raw data describing turn 681 such as the magnitude (90 degrees) and direction (clockwise) of the turn.

The device selects (904) a first affected display from the plurality of displays based on the first identifier and an input-source mapping that maps input sources to corresponding displays. For example, in response to receiving input information corresponding to turn 681 in FIG. 6X from jog dial 675, device 100 selects (or determines) an affected display by correlating the identifier (e.g., identifying the input source as jog dial 675) included in the input information with a display (e.g., display 546-1) based on an input-source mapping that maps input sources to displays.

In some embodiments, selecting the first affected display includes (906): in accordance with a determination that the first input source is assigned to the first display in the input-source mapping, selecting the first display as the first affected display that is affected by the first input; and in accordance with a determination that the first input source is assigned to the second display, different from the first display, in the input-source mapping, selecting the second display as the first affected display that is affected by the first input. For example, in response to receiving input information corresponding to the pinch gesture in FIG. 6W from the touch-sensitive surface associated with display 546-1, device 100 selects (or determines) an affected display by correlating the identifier (e.g., identifying the input source as the touch-sensitive surface associated with display 546-1) included in the input information with a display (e.g., display 546-1) based on the input-source mapping that maps input sources to displays. In another example, in response to receiving input information corresponding to the upward swipe gesture in FIG. 6EE from the touch-sensitive surface associated with display 546-2, device 100 selects (or determines) an affected display by correlating the identifier (e.g., identifying the input source as the touch-sensitive surface associated with display 546-2) included in the input information with a display (e.g., display 546-2) based on the input-source mapping that maps input sources to displays.

In some embodiments, after selecting the first affected display, the device (908): determines a respective state of a user interface displayed on the first affected display (e.g., a user interface displayed on the first affected display immediately prior to when the first input information was received); and generates the update information based on the first input description and the respective state of the user interface displayed on the first affected display. For example, in response to receiving input information corresponding to turn 681 in FIG. 6X from jog dial 675, device 100 selects (or determines) an affected display by correlating the identifier (e.g., identifying the input source as jog dial 675) included in the input information with a display (e.g., display 546-1) based on an input-source mapping that maps input sources to displays. In this example, after determining that the turn event detected in FIG. 6X is associated with display 546-1, device 100 also determines the display state of display 546-1 shown in FIG. 6X (e.g., user interface 604 is in a search results or destination selection mode). In this example, device 100 generates the update information (e.g., the updated user interface displayed on display 546-1 in FIG. 6Y) based on the input description information shown in FIG. 6X (e.g., an approximately 90 degree clockwise turn) and the display state of display 546-1 (e.g., user interface 604 is in a search results or destination selection mode).

In some embodiments, in accordance with a determination that the respective state of the user interface displayed on the first affected display is a first state, the update information corresponds to (910) performing a first operation for the respective state of the user interface displayed on the first affected display (e.g., the respective state is displaying a "now playing" interface for playing audio and the respective operation includes adjusting a volume level of audio playback associated with the user interface displayed on the first affected display in accordance with an amount of rotation of a knob); and in accordance with a determination that the respective state of the user interface displayed on the first affected display is a second state different from the first state, the update information corresponds to performing a second operation, different from the first operation, for the respective state of the user interface displayed on the first affected display (e.g., the respective state is displaying a list of selectable items such as audio content items and the respective operation includes navigating through the list of selectable items on the first affected display in accordance with an amount of rotation of a knob). FIGS. 6Y-6Z, for example, shows display 546-1 scrolling south-to-north through selected search results (e.g., dry cleaners) in user interface 604 in response to detecting turn 683 of jog dial 675 in FIG. 6Y (e.g., an approximately 180 degree counter-clockwise turn) and in accordance with the display state of user interface 604 in FIG. 6Y (e.g., a search results or destination selection mode). FIGS. 6AA-6BB, for example, show display 546-1 zooming out a turn-by-turn directions mode in user interface 604 in response to detecting turn 686 of jog dial 675 in FIG. 6AA (e.g., an approximately 90 degree counter-clockwise turn) and in accordance with the display state of user interface 604 in FIG. 6AA (e.g., a turn-by-turn directions mode).

In some embodiments, prior to receiving the first input information, the respective user interface has a prior state; and the device updates (912) the user interface to an updated state that is different from the prior state based on the first input and the prior state of the respective user interface (e.g., in response to a swipe gesture on a touch-sensitive surface or a rotation of a knob, a map user interface is scrolled in accordance with a magnitude and direction of the swipe gesture or the magnitude of the rotation of the knob). FIGS. 6EE-6FF, for example, show display 546-2 scrolling up a list of songs 677 in user interface 676 in response to detecting an upward swipe gesture with user touch input 689 on display 546-2 in FIG. 6EE and in accordance with the display state of user interface 676 in FIG. 6EE (e.g., an album song list mode).

In some embodiments, prior to sending the update information to the first affected display, the device generates (914) the update information based on the first input information, where: in accordance with a determination that the first input description describes first input properties, the device generates first update information; and in accordance with a determination that the first input description describes second input properties different from the first input properties, the device generates second update information different from the first update information. For example, when the first input information corresponds to rotation of a knob while a list is displayed on the first affected display, if the first input description indicates that the first input includes clockwise rotation of a knob, the device scrolls a list downward on the affected display; in contrast, if the first input description indicates that the first input includes counter-clockwise rotation of the knob, the device scrolls the list upward on the affected display.

In another example, when the search results or a destination selection mode is displayed, a 90 degree turn of jog dial 675 selects a next search result, a clockwise turn scrolls the search results north-to-south, and a counter-clockwise turn scrolls the search results south-to-north. FIGS. 6X-6Y, for example, show display 546-1 scrolling north-to-south through selected search results (e.g., dry cleaners) in user interface 604 in response to detecting turn 681 of jog dial 675 in FIG. 6X (e.g., an approximately 90 degree clockwise turn). In contrast, FIGS. 6Y-6Z, for example, shows display 546-1 scrolling south-to-north through selected search results (e.g., dry cleaners) in user interface 604 in response to detecting turn 683 of jog dial 675 in FIG. 6Y (e.g., an approximately 180 degree counter-clockwise turn).

The device sends (916), to the first affected display, update information that enables the first affected display to be updated in accordance with the first input. For example, in response to receiving input information corresponding to turn 681 in FIG. 6X from jog dial 675, device 100 selects display 546-1 as the affected display by correlating the identifier (e.g., identifying the input source as jog dial 675) included in the input information with display 546-1 based on the input-source mapping. After selecting display as the affected display, device 100 sends affected display 546-1 update information that enables affected display 546-1 to be updated.

In some embodiments, the update information includes (918) information corresponding to the first input (e.g., raw input data such as contact locations and movement amounts/directions detected on a touch-sensitive surface and/or gesture data describing a type of gesture that was performed on the touch-sensitive surface). In some embodiments, the update information includes the first input description. In some embodiments, the update information is generated based on the first input description (e.g., the first input description is raw touch input data and the update information includes a gesture that corresponds to the raw touch input data).

In some embodiments, the update information includes (920) an updated user interface for display at the first affected display (e.g., an image for display on the first display that includes a plurality of user interface objects). After selecting display 546-1 as the affected display corresponding to turn 681 in FIG. 6X, device 100 sends affected display 546-1 update information that enables affected display 546-1 to be updated in accordance with the magnitude (90 degrees) and direction (clockwise) of turn 681 of jog dial 675 in FIG. 6X. For example, the update information includes an updated user interface that scrolls the search results (e.g., dry cleaners) so that the next dry cleaner south (e.g., Suzie's Cleaners corresponding to the dry cleaner represented by pin 614*d*) from ABC Cleaners corresponding to the dry cleaner represented by pin 614*a* is displayed as the selected search result in user interface 604 in FIG. 6Y.

In some embodiments, the device generates (922) user interfaces for two or more displays of the plurality of displays and provides respective user interfaces to corresponding displays. For example, device 100 sends images that are representative of a first map/navigation user interface for display on a first display (e.g., primary display 546-1 or a dashboard navigation display) of a vehicle information display system (e.g., system 540), such as a vehicle entertainment or navigation system, and generates a second, different, map/navigation user interface for a second, different, display that is structurally integrated with the device (e.g., touch-screen 112 of device 100 or another portable electronic device). In some embodiments, the device sends images that are representative of a different user interface for display on a third display in the vehicle (e.g., auxiliary display 546-2 or a rear-seat entertainment display) of a vehicle information display system (e.g., system 540).

In some embodiments, after sending the update information that enables the first affected display to be updated in accordance with the first input (924), the device receives (926) second input information that is indicative of a second input detected by a second input source of the plurality of input sources distinct from the first input source, where the second input information includes: a second (unique) identifier for the second input source; and a second input description that describes the second input. For example, the second input description is raw input data such as contact locations and movement amounts/directions detected on a touch-sensitive surface and/or gesture data describing a type of gesture that was performed on the touch-sensitive surface. After selecting display 546-1 as the first affected display corresponding to turn 681 in FIG. 6X, device 100 sends first affected display 546-1 update information that enables first affected display 546-1 to be updated as shown in FIG. 6Y. Subsequently, FIG. 6EE, for example, shows the touch-sensitive surface associated with display 546-2 detecting an upward swipe gesture with user touch input 689. In response to detecting the upward swipe gesture, the touch-sensitive surface associated with display 546-2 (or system 540) sends input information indicative of user touch input 689 (or the upward swipe gesture) to device 100. The input information includes an identifier associated with the touch-sensitive surface associated with display 546-2 (e.g., a unique identifier associated with the touch-sensitive surface associated with display 546-2) and input description information describing user touch input 689 (or the upward swipe gesture).

In some embodiments, after sending the update information that enables the first affected display to be updated in accordance with the first input (924), the device selects (928)

a second affected display from the plurality of displays based on the second identifier and the input-source mapping. In response to receiving input information corresponding to the upward swipe gesture in FIG. 6EE from the touch-sensitive surface associated with display 546-2, device 100 selects display 546-2 as the second affected display by correlating the identifier (e.g., identifying the input source as the touch-sensitive surface associated with display 546-2) included in the input information with a display (e.g., display 546-2) based on the input-source mapping that maps input sources to displays.

In some embodiments, after sending the update information that enables the first affected display to be updated in accordance with the first input (924), the device sends (930), to the second affected display, update information that enables the second affected display to be updated in accordance with the second input. In some embodiments (e.g., where the first input source and the second input source are both mapped to a same display), the first affected display is the same as the second affected display. In some embodiments (e.g., where the first input source and the second input source are mapped to different displays), the first affected display is different from the second affected display. After selecting display 546-2 as the second affected display, device 100 sends second affected display 546-2 update information that enables affected display 546-2 to be updated. For example, in FIG. 6FF, the update information includes an updated user interface that enabled display 546-2 to display list 677 scrolled upward in user interface 676.

In some embodiments, the device detects (932) a change in availability of a respective display of the plurality of displays, and in response to detecting the change in availability of the respective display, the device updates the input-source mapping to show the change in availability of the respective display. In some embodiments, the change in availability of the respective display includes a computer system (e.g., a vehicle information display system such as a navigation or entertainment system) that is different from the electronic device taking control of the respective display. In some embodiments, the change in availability of the respective display includes a computer system that is different from the electronic device giving control of the respective display to (or back to) the electronic device (e.g., while the vehicle is backing up, a vehicle information display system displays a video feed from a back-up camera on a display of the vehicle information display system and after the vehicle has ceased to back up, the vehicle information display system enables the electronic device to again display a user interface provided by the electronic device on the display of the vehicle information display system).

FIGS. 6W-6FF, for example, show display 546-1 and display 546-2 associated with system 540 that is implemented in a vehicle. While the vehicle is in reverse, FIG. 6CC, for example, shows display 546-1 displaying a vehicle backup mode including a video feed from backup camera in user interface 604 and display 546-2 displaying a vehicle backup mode including a video feed from the backup camera in user interface 676. While the vehicle is in reverse, vehicle backup mode supersedes all update information received by displays 546-1 and 546-2 from device 100.

In some embodiments, while a respective input source is assigned to the first display, the device detects (934) a change in display assignment for a respective input source of the plurality of input sources from the first display to the second display, and in response to detecting the change in display assignment for the respective input source, the device updates the input-source mapping to show the change in display assignment for the respective input source, so that input information that is indicative of inputs associated with the respective input source is used to update a user interface displayed on the second display instead of being used to update a user interface displayed on the first display. For example, a passenger in a vehicle switches from using a first knob to control a user interface in a primary display of a vehicle information display system to using the first knob to control a user interface in an auxiliary display of the vehicle information display system (e.g., a rear-seat entertainment display) and input information that includes an identifier for the first knob is used to update a user interface displayed on the auxiliary display instead of being used to update a user interface displayed on the primary display.

In FIGS. 6W-6CC, jog dial 675, when activated, causes the device to control display 546-1. Thus, in FIGS. 6W-6CC, jog dial 675 is associated with display 546-1 in the input-source to display mapping. For example, FIGS. 6AA-6BB show display 546-1 zooming out a turn-by-turn directions mode in user interface 604 in response to detecting turn 686 of jog dial 675 (e.g., an approximately 90 degree counter-clockwise turn) in FIG. 6AA in accordance with a determination that jog dial 675 is mapped to display 546-1.

In contrast, in FIGS. 6DD-6EE, jog dial 675, when activated, causes the device to control display 546-2. Thus, in FIGS. 6DD-6EE, jog dial 675 is associated with display 546-2 in the changed input-source to display mapping. In another example, FIGS. 6DD-6EE show display 546-2 scrolling down list 677 in user interface 676 in response to detecting turn 688 of jog dial 675 (e.g., an approximately 90 degree clockwise turn) in FIG. 6DD in accordance with a determination that jog dial 675 is mapped to display 546-2.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 900 described above with respect to FIGS. 9A-9C. For example, the contacts, gestures, user interface objects described above with reference to method 900 optionally have one or more of the characteristics of the contacts, gestures, user interface objects described herein with reference to other methods described herein (e.g., methods 700 and 800). For brevity, these details are not repeated here.

Figure 10:
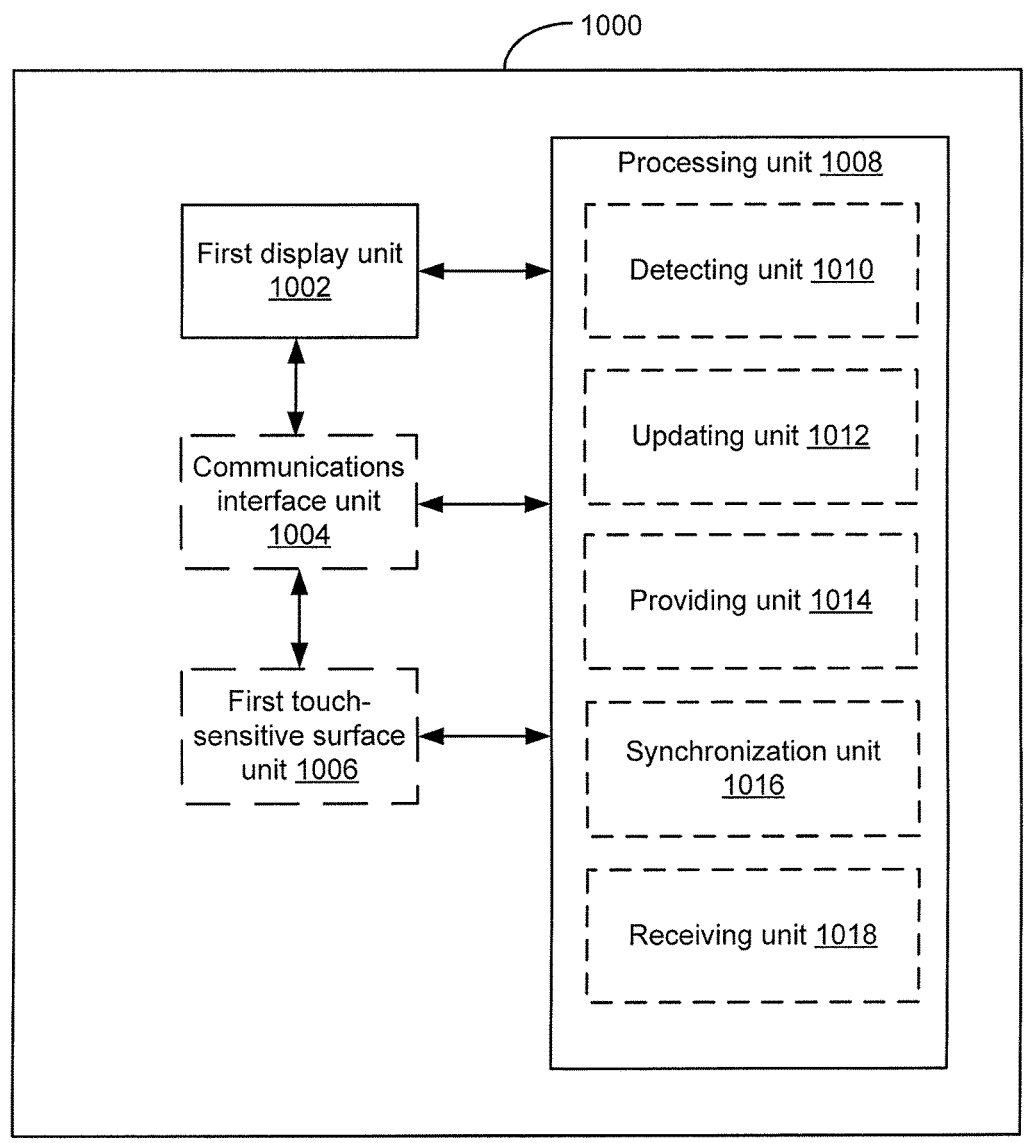
FIG. 10 is a functional block diagram of an electronic device in accordance with some embodiments.

In accordance with some embodiments, FIG. 10 shows a functional block diagram of a first electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, a first electronic device 1000 includes a first display unit 1002 configured to display a first user interface, where: the first user interface enables selection between a plurality of selectable objects; the first user interface corresponds to a second user interface displayed on a second display unit different from the first display unit; and a first object from the plurality of selectable objects is displayed as a selected object in the second user interface. Optionally, first electronic device 1000 also includes a communications interface unit 1004 configured to communicate with a second electronic device and a first touch-sensitive surface unit 1006 configured to receive one or more touch inputs. First electronic device 1000 further includes a processing unit 1008 coupled to first display unit 1002, and, optionally, coupled to communications interface unit 1004 and first touch-sensitive surface unit 1006. In some embodiments, processing unit 1008 includes a detecting unit 1010, an updating unit 1012, a providing unit 1014, a synchronization unit 1016, and a receiving unit 1018.

While the first object is displayed as the selected object in the second user interface, processing unit 1008 is configured to: detect (e.g., with detecting unit 1010) a first input from a user that corresponds to a request to enable display of information about a second object in the plurality of selectable objects in the first user interface; in response to detecting the first input, update (e.g., with updating unit 1012) the first user interface on first display unit 1002 in accordance with the first input to enable display of respective information about the second object while display of the first object as the selected object in the second user interface is maintained; and after updating the first user interface in accordance with the first input, detect (e.g., with detecting unit 1010) a second input from a user that corresponds to a request to select the second object as the selected object. In response to detecting the second input, processing unit 1008 is further configured to: update (e.g., with updating unit 1012) the first user interface on first display unit 1002 in accordance with the second input to enable display of the second object as the selected object; and provide (e.g., with providing unit 1014), to the second display unit, information that enables the second user interface on the second display unit to be updated to enable display of the second object as the selected object instead of the first object.

In some embodiments, the first user interface is updated in response to detecting the first input without providing, to the second display unit, information that enables the second user interface on the second display unit to be updated to enable display of the respective information about the second object in the second user interface.

In some embodiments, updating the first user interface on first display unit 1002 in accordance with the first input to enable display of respective information about the second object while display of the first object as the selected object in the second user interface is maintained includes updating the first user interface on first display unit 1002 in accordance with the first input to enable display of respective information about the second object while the entire second user interface is maintained on the second display unit as it was displayed immediately prior to detecting the first input.

In some embodiments, the plurality of selectable objects correspond to a plurality of map locations, and the selected object corresponds to a currently selected destination.

In some embodiments, the plurality of selectable objects correspond to a plurality of navigation routes, and the selected object corresponds to a currently selected navigation route.

In some embodiments, the plurality of selectable objects correspond to a plurality of content items that can be played with first electronic device 1000, and the selected object corresponds to a currently selected content item.

In some embodiments, the plurality of selectable objects correspond to a plurality of applications, and the selected object corresponds to a currently selected application.

In some embodiments, the plurality of selectable objects correspond to a plurality of search results produced in response to a search query, and the selected object corresponds to a currently selected search result.

In some embodiments, the first object was automatically selected as the selected object based on predefined object selection criteria.

In some embodiments, prior to detecting the first input, the first user interface is synchronized with the second user interface; after responding to the first input and prior to detecting the second input, the first user interface is not synchronized with the second user interface; and after responding to the second input, the first user interface is synchronized with the second user interface.

In some embodiments, processing unit 1008 is configured to: after providing the information that enables the second user interface on the second display unit to be updated to enable display of the second object as the selected object instead of the first object, enter (e.g., with synchronization unit 1016) a display synchronization mode; and while in the display synchronization mode: periodically update (e.g., with updating unit 1012) the first user interface over time; and provide (e.g., with providing unit 1014) information that enables the second user interface on the second display unit to be synchronized with the first user interface as the first user interface is updated over time.

In some embodiments, the second electronic device controls an in-vehicle entertainment system with a native graphical user interface, and the second user interface is displayed on the second display unit instead of at least a portion of the native graphical user interface of the second electronic device.

In some embodiments, processing unit 1008 is configured to: receive (e.g., with receiving unit 1018) information that corresponds to a respective input from a control of the in-vehicle entertainment system; and in response to receiving the information that corresponds to the respective input, update (e.g., with updating unit 1012) the first user interface and the second user interface in accordance with the respective input.

Figure 11:
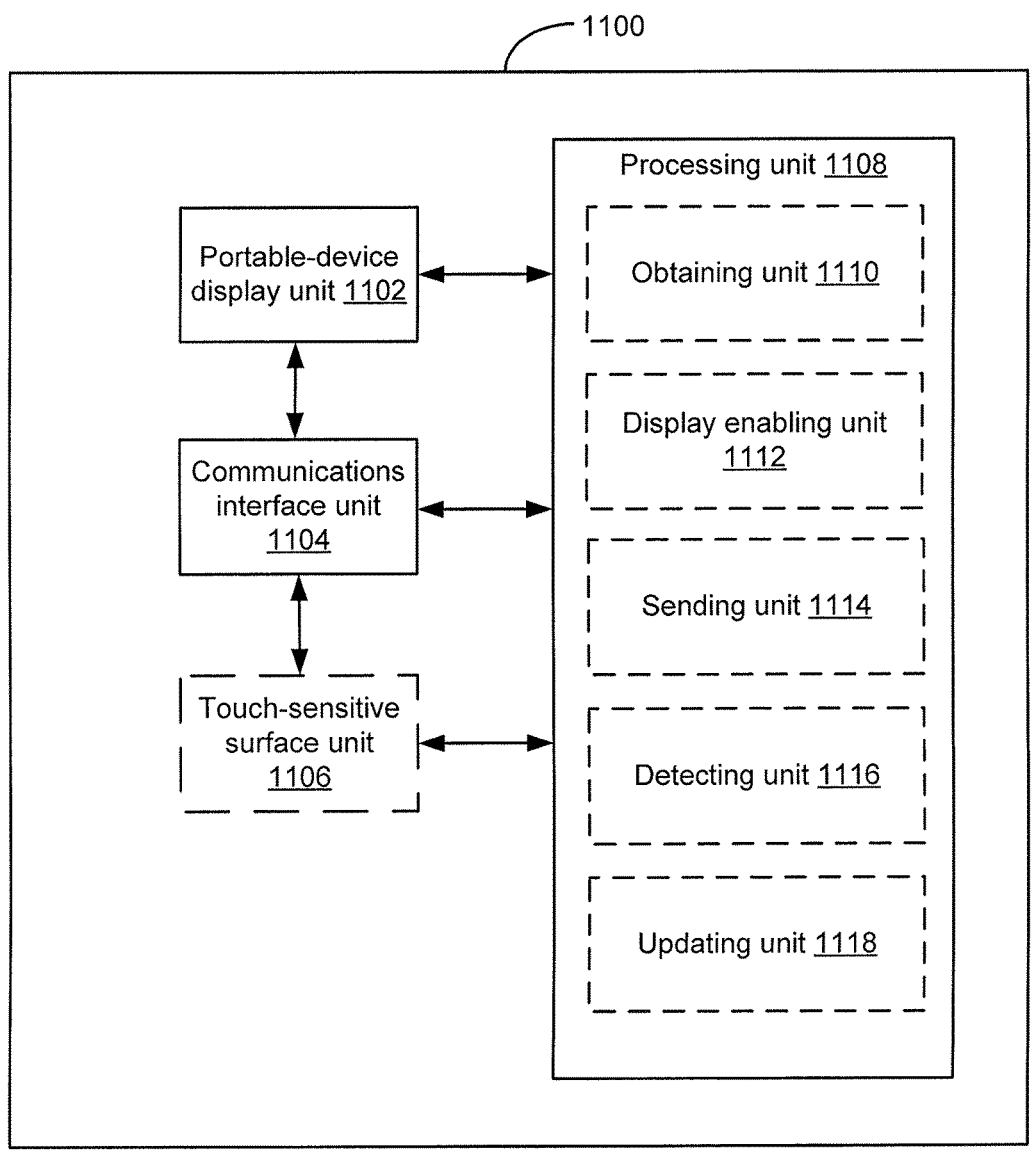
FIG. 11 is a functional block diagram of an electronic device in accordance with some embodiments.

In accordance with some embodiments, FIG. 11 shows a functional block diagram of a portable electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, a portable electronic device 1100 includes a portable-device display unit 1102 configured to display a portable-device navigation interface, a communications interface unit 1104 configured to communicate with a vehicle display unit of a vehicle, and, optionally, a touch-sensitive surface unit 1106 configured to receive one or more touch inputs; and a processing unit 1108 coupled to portable-device display unit 1102, communications interface unit 1104, and, optionally, touch-sensitive surface unit 1106. In some embodiments, processing unit 1108 includes an obtaining unit 1110, a display enabling unit 1112, a sending unit 1114, a detecting unit 1116, and an updating unit 1118.

Processing unit 1108 is configured to: obtain (e.g., with obtaining unit 1110) a set of map search results that includes a plurality of candidate destinations; enable display (e.g., with display enabling unit 1112) of the portable-device navigation interface on portable-device display unit 1102, where the portable-device navigation interface enables selection of a destination from the plurality of candidate destinations; and send (e.g., with sending unit 1114) information to the vehicle display unit that enables the vehicle display unit to enable display of the vehicle navigation interface, where a first destination of the plurality of candidate destinations is a selected destination in the vehicle navigation interface. While the first destination is the selected destination in the vehicle navigation interface, processing unit 1108 is also configured to: detect (e.g., with detecting unit 1116) a first input from a user that corresponds to a request to enable display of information about one or more candidate destinations in the plurality of candidate destinations other than the first destination; in response to detecting the first input, update (e.g., with updating unit 1118) the portable-device navigation interface on portable-device display unit 1102 in accordance with the first input without the vehicle navigation interface on the vehicle display unit being updated; and after updating the portable-device navigation interface in accordance with the first input, detect (e.g., with detecting unit 1116) a second input from a user that corresponds to a request to select a second destination in the plurality of candidate destinations as the selected destination.

Figure 12:
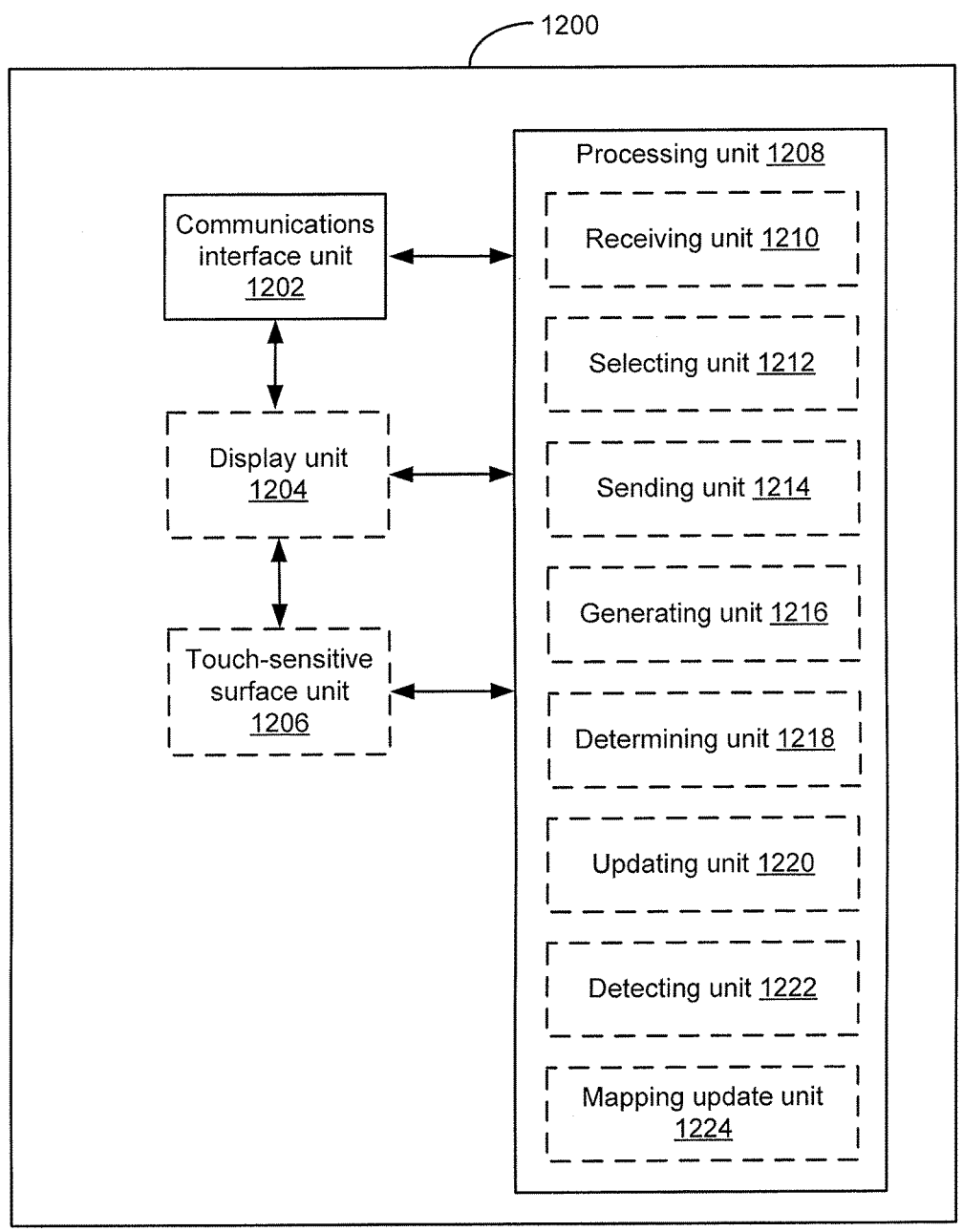
FIG. 12 is a functional block diagram of an electronic device in accordance with some embodiments.

In accordance with some embodiments, FIG. 12 shows a functional block diagram of a portable electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a communications interface unit 1202 configured to communicate with a plurality of displays that include a first display and a second display. In some embodiments, electronic device 1200 also, optionally, includes a display unit 1204 configured to display a user interface and a touch-sensitive surface unit 1206 configured to one or more receive touch inputs. Electronic device 1200 further includes a processing unit 1208 coupled to communications interface unit 1202, and, optionally, coupled to display unit 1204 and touch-sensitive surface unit 1206. In some embodiments, processing unit 1208 includes a receiving unit 1210, an selecting unit 1212, a sending unit 1214, a generating unit 1216, a determining unit 1218, an updating unit 1220, a detecting unit 1222, and a mapping update unit 1224.

Processing unit 1208 is configured to receive (e.g., with receiving unit 1210) a first input information that is indicative of a first input detected by a first input source of a plurality of input sources, where the first input information includes: a first identifier for the first input source; and a first input description that describes the first input. Processing unit 1208 is also configured to select (e.g., with selecting unit 1212) a first affected display from the plurality of displays based on the first identifier and an input-source mapping that maps input sources to corresponding displays. Processing unit 1208 is further configured to send (e.g., with sending unit 1214), to the first affected display, update information that enables the first affected display to be updated in accordance with the first input.

In some embodiments, selecting the first affected display includes: in accordance with a determination that the first input source is assigned to the first display in the input-source mapping, selecting (e.g., with selecting unit 1212) the first display as the first affected display that is affected by the first input; and in accordance with a determination that the first input source is assigned to the second display, different from the first display, in the input-source mapping, selecting (e.g., with selecting unit 1212) the second display as the first affected display that is affected by the first input.

In some embodiments, the update information includes information corresponding to the first input.

In some embodiments, the update information includes an updated user interface for display at the first affected display.

In some embodiments, the device generates user interfaces for two or more displays of the plurality of displays and provides respective user interfaces to corresponding displays.

In some embodiments, prior to sending the update information to the first affected display, processing unit 1208 is configured to generate (e.g., with generating unit 1216) the update information based on the first input information, where: in accordance with a determination that the first input description describes first input properties, processing unit 1208 is configured to generate (e.g., with generating unit 1216) first update information; and in accordance with a determination that the first input description describes second input properties different from the first input properties, processing unit 1208 is configured to generate (e.g., with generating unit 1216) second update information different from the first update information.

In some embodiments, after selecting the first affected display, processing unit 1208 is configured to: determine (e.g., with determining unit 1218) a respective state of a user interface displayed on the first affected display; and generate (e.g., with generating unit 1216) the update information based on the first input description and the respective state of the user interface displayed on the first affected display.

In some embodiments, in accordance with a determination that the respective state of the user interface displayed on the first affected display is a first state, the update information corresponds to performing a first operation for the respective state of the user interface displayed on the first affected display; and in accordance with a determination that the respective state of the user interface displayed on the first affected display is a second state different from the first state, the update information corresponds to performing a second operation, different from the first operation, for the respective state of the user interface displayed on the first affected display.

In some embodiments, prior to receiving the first input information, the respective user interface has a prior state; and processing unit 1208 is configured to update (e.g., with updating unit 1220) the user interface to an updated state that is different from the prior state based on the first input and the prior state of the respective user interface.

In some embodiments, processing unit 1208 is configured to: detect (e.g., with detecting unit 1222) a change in availability of a respective display of the plurality of displays; and in response to detecting the change in availability of the respective display, update (e.g., with mapping update unit 1224) the input-source mapping to show the change in availability of the respective display.

In some embodiments, while a respective input source is assigned to the first display, processing unit 1208 is configured to detect (e.g., with detecting unit 1222) a change in display assignment for a respective input source of the plurality of input sources from the first display to the second display. And, in response to detecting the change in display assignment for the respective input source, processing unit 1208 is configured to update (e.g., with mapping update unit 1224) the input-source mapping to show the change in display assignment for the respective input source, so that input information that is indicative of inputs associated with the respective input source is used to update a user interface displayed on the second display instead of being used to update a user interface displayed on the first display.

In some embodiments, after sending the update information that enables the first affected display to be updated in accordance with the first input, processing unit 1208 is configured to receive (e.g., with receiving unit 1210) second input information that is indicative of a second input detected by a second input source of the plurality of input sources distinct from the first input source, where the second input information includes: a second identifier for the second input source; and a second input description that describes the second input. Processing unit 1208 is also configured to: select (e.g., with selecting unit 1212) a second affected display from the plurality of displays based on the second identifier and the input-source mapping; and send (e.g., with sending unit 1214), to the second affected display, update information that enables the second affected display to be updated in accordance with the second input.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 7A-7D, 8A-8B, and 9A-9C are, optionally, implemented by components depicted in FIGS. 1A-1B or FIGS. 10-12. For example, displaying operation 702, receiving operation 722, detecting operations 730 and 738, updating operation 742, obtaining operation 802, sending operations 806 and 820, detecting operations 810 and 814, updating operations 812 and 818, receiving operations 902 and 928, identifying operations 904 and 930, sending operations 918 and 932, and/or detecting operations 934 and 936 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by a portable electronic device that includes a portable-device display, and is in communication with a vehicle display of a vehicle, cause the portable electronic device to:

obtain a set of map search results that includes a plurality of candidate destinations;

display a portable-device navigation interface on the portable-device display, wherein the portable-device navigation interface enables selection of a destination from the plurality of candidate destinations;

select a first destination of the plurality of candidate destinations included in the set of map search results;

send information to the vehicle display that enables the vehicle display to display a vehicle navigation interface, wherein the first destination of the plurality of candidate destinations is a selected destination in the vehicle navigation interface;

while the first destination of the plurality of candidate destinations included in the set of map search results is the selected destination in the vehicle navigation interface:

detect a first input from a user that corresponds to a request to display information about one or more candidate destinations in the plurality of candidate destinations other than the first destination;

in response to detecting the first input, update the portable-device navigation interface on the portable-device display in accordance with the first input without the vehicle navigation interface on the vehicle display being updated; and after updating the portable-device navigation interface in accordance with the first input, detect a second input from a user that corresponds to a request to select a second destination in the plurality of candidate destinations as the selected destination;

in response to detecting the second input:

update the portable-device navigation interface on the portable-device display in accordance with the second input to display the second destination as the selected destination; and send information to the vehicle display that enables the vehicle display to update the vehicle navigation interface in accordance with the second input to display the second destination as the selected destination; and after sending the information that enables the vehicle navigation interface on the vehicle display to be updated to display the second destination as the selected destination instead of the first destination:

enter a display synchronization mode; and
while in the display synchronization mode:
periodically update the portable-device navigation interface over time; and
provide information that enables the vehicle navigation interface on the vehicle display to be synchronized with the portable-device navigation interface as the portable-device navigation interface is updated over time.

2. The medium of claim 1, wherein the portable-device navigation interface is updated in response to detecting the first input without providing, to the vehicle display, information that enables the vehicle navigation interface on the vehicle display to be updated to display information about one or more candidate destinations in the plurality of candidate destinations other than the first destination.

3. The medium of claim 1, wherein updating the portable-device navigation interface on the portable-device display in accordance with the first input without the vehicle navigation interface on the vehicle display being updated includes updating the portable-device navigation interface on the portable-device display in accordance with the first input to display information about the second destination while the entire vehicle navigation interface is maintained on the vehicle display as it was displayed immediately prior to detecting the first input.

4. The medium of claim 1, wherein the first destination is automatically selected as the selected destination based on predefined destination selection criteria.

5. The medium of claim 1, wherein:
prior to detecting the first input, the portable-device navigation interface is synchronized with the vehicle navigation interface;
after responding to the first input and prior to detecting the second input, the portable-device navigation interface is not synchronized with the vehicle navigation interface; and
after responding to the second input, the portable-device navigation interface is synchronized with the vehicle navigation interface.

6. The medium of claim 1, wherein the vehicle display is a display coupled to a second electronic device that is different from the portable electronic device.

7. The medium of claim 6, wherein:
the second electronic device controls an in-vehicle entertainment system with a native graphical user interface; and
the vehicle navigation interface is displayed on the vehicle display instead of at least a portion of the native graphical user interface of the second electronic device.

8. The medium of claim 6, wherein the portable-device navigation interface and the vehicle navigation interface are both generated by a same application running on the portable electronic device.

9. A portable electronic device, comprising:
a portable-device display;
one or more processors;
memory; and
one or more programs, wherein the portable electronic device is in communication with a vehicle display of a vehicle and wherein the one or more programs are stored in the memory and configured to be executed by the one or more processors, the one or more programs including instructions for:
obtaining a set of map search results that includes a plurality of candidate destinations;
displaying a portable-device navigation interface on the portable-device display, wherein the portable-device navigation interface enables selection of a destination from the plurality of candidate destinations;
selecting a first destination of the plurality of candidate destinations included in the set of map search results;
sending information to the vehicle display that enables the vehicle display to display a vehicle navigation interface, wherein the first destination of the plurality of candidate destinations is a selected destination in the vehicle navigation interface;
while the first destination of the plurality of candidate destinations included in the set of map search results is the selected destination in the vehicle navigation interface:
detecting a first input from a user that corresponds to a request to display information about one or more candidate destinations in the plurality of candidate destinations other than the first destination;
in response to detecting the first input, updating the portable-device navigation interface on the portable-device display in accordance with the first input without the vehicle navigation interface on the vehicle display being updated; and
after updating the portable-device navigation interface in accordance with the first input, detecting a second input from a user that corresponds to a request to select a second destination in the plurality of candidate destinations as the selected destination;
in response to detecting the second input:
updating the portable-device navigation interface on the portable-device display in accordance with the second input to display the second destination as the selected destination; and
sending information to the vehicle display that enables the vehicle display to update the vehicle navigation interface in accordance with the second input to display the second destination as the selected destination; and
after sending the information that enables the vehicle navigation interface on the vehicle display to be updated to display the second destination as the selected destination instead of the first destination:
entering a display synchronization mode; and
while in the display synchronization mode:
periodically updating the portable-device navigation interface over time; and
providing information that enables the vehicle navigation interface on the vehicle display to be synchronized with the portable-device navigation interface as the portable-device navigation interface is updated over time.

10. The device of claim 9, wherein the portable-device navigation interface is updated in response to detecting the first input without providing, to the vehicle display, information that enables the vehicle navigation interface on the vehicle display to be updated to display information about one or more candidate destinations in the plurality of candidate destinations other than the first destination.

11. The device of claim 9, wherein updating the portable-device navigation interface on the portable-device display in accordance with the first input without the vehicle navigation interface on the vehicle display being updated includes updating the portable-device navigation interface on the portable-device display in accordance with the first input to display information about the second destination while the entire vehicle navigation interface is maintained on the vehicle display as it was displayed immediately prior to detecting the first input.

12. The device of claim 9, wherein the first destination is automatically selected as the selected destination based on predefined destination selection criteria.

13. The device of claim 9, wherein:
prior to detecting the first input, the portable-device navigation interface is synchronized with the vehicle navigation interface;
after responding to the first input and prior to detecting the second input, the portable-device navigation interface is not synchronized with the vehicle navigation interface; and
after responding to the second input, the portable-device navigation interface is synchronized with the vehicle navigation interface.

14. The device of claim 9, wherein the vehicle display is a display coupled to a second electronic device that is different from the portable electronic device.

15. The device of claim 14, wherein:
the second electronic device controls an in-vehicle entertainment system with a native graphical user interface; and
the vehicle navigation interface is displayed on the vehicle display instead of at least a portion of the native graphical user interface of the second electronic device.

16. The device of claim 14, wherein the portable-device navigation interface and the vehicle navigation interface are both generated by a same application running on the portable electronic device.

17. A method comprising:
at a portable electronic device that includes a portable-device display, and that is in communication with a vehicle display of a vehicle:
obtaining a set of map search results that includes a plurality of candidate destinations;
displaying a portable-device navigation interface on the portable-device display, wherein the portable-device navigation interface enables selection of a destination from the plurality of candidate destinations;
selecting a first destination of the plurality of candidate destinations included in the set of map search results;
sending information to the vehicle display that enables the vehicle display to display a vehicle navigation interface, wherein the first destination of the plurality of candidate destinations is a selected destination in the vehicle navigation interface;
while the first destination of the plurality of candidate destinations included in the set of map search results is the selected destination in the vehicle navigation interface:
detecting a first input from a user that corresponds to a request to display information about one or more candidate destinations in the plurality of candidate destinations other than the first destination;
in response to detecting the first input, updating the portable-device navigation interface on the portable-device display in accordance with the first input without the vehicle navigation interface on the vehicle display being updated; and
after updating the portable-device navigation interface in accordance with the first input, detecting a second input from a user that corresponds to a request to select a second destination in the plurality of candidate destinations as the selected destination; and, in response to detecting the second input:
updating the portable-device navigation interface on the portable-device display in accordance with the second input to display the second destination as the selected destination;
sending information to the vehicle display that enables the vehicle display to update the vehicle navigation interface in accordance with the second input to display the second destination as the selected destination; and
after sending the information that enables the vehicle navigation interface on the vehicle display to be updated to display the second destination as the selected destination instead of the first destination:
entering a display synchronization mode; and
while in the display synchronization mode:
periodically updating the portable-device navigation interface over time; and
providing information that enables the vehicle navigation interface on the vehicle display to be synchronized with the portable-device navigation interface as the portable-device navigation interface is updated over time.

18. The method of claim 17, wherein the portable-device navigation interface is updated in response to detecting the first input without providing, to the vehicle display, information that enables the vehicle navigation interface on the vehicle display to be updated to display information about one or more candidate destinations in the plurality of candidate destinations other than the first destination.

19. The method of claim 17, wherein updating the portable-device navigation interface on the portable-device display in accordance with the first input without the vehicle navigation interface on the vehicle display being updated includes updating the portable-device navigation interface on the portable-device display in accordance with the first input to display information about the second destination while the entire vehicle navigation interface is maintained on the vehicle display as it was displayed immediately prior to detecting the first input.

20. The method of claim 17, wherein the first destination is automatically selected as the selected destination based on predefined destination selection criteria.

21. The method of claim 17, wherein:
prior to detecting the first input, the portable-device navigation interface is synchronized with the vehicle navigation interface;
after responding to the first input and prior to detecting the second input, the portable-device navigation interface is not synchronized with the vehicle navigation interface; and
after responding to the second input, the portable-device navigation interface is synchronized with the vehicle navigation interface.

22. The method of claim 17, wherein the vehicle display is a display coupled to a second electronic device that is different from the portable electronic device.

23. The method of claim 22, wherein:
the second electronic device controls an in-vehicle entertainment system with a native graphical user interface; and
the vehicle navigation interface is displayed on the vehicle display instead of at least a portion of the native graphical user interface of the second electronic device.

24. The method of claim 22, wherein the portable-device navigation interface and the vehicle navigation interface are both generated by a same application running on the portable electronic device.

\* \* \* \* \*